US012436394B2

(12) United States Patent
Connor

(10) Patent No.: US 12,436,394 B2
(45) Date of Patent: Oct. 7, 2025

(54) AUGMENTED REALITY (OR MIXED REALITY) EYEWEAR WITH SEE-THROUGH OPTICAL ELEMENTS HAVING INDIVIDUALLY-ADJUSTABLE OPACITY/REFLECTIVITY LEVELS

(71) Applicant: Robert A. Connor, Wyoming, MN (US)

(72) Inventor: Robert A. Connor, Wyoming, MN (US)

(73) Assignee: Holovisions, Ham Lake, MN (US)

( * ) Notice: Subject to any disclaimer, the term of this patent is extended or adjusted under 35 U.S.C. 154(b) by 0 days.

(21) Appl. No.: 18/827,703

(22) Filed: Sep. 7, 2024

(65) Prior Publication Data
US 2024/0427157 A1  Dec. 26, 2024

Related U.S. Application Data

(63) Continuation-in-part of application No. 18/800,091, filed on Aug. 11, 2024, which is a continuation-in-part of application No. 18/586,439, filed on Feb. 24, 2024, now Pat. No. 12,205,231, application No. 18/827,703 is a continuation-in-part of application No. 18/586,439, filed on Feb. 24, 2024, now Pat. No. 12,205,231, which is a continuation-in-part of application No. 18/088,548, filed on Dec. 24, 2022, now Pat. No. 12,013,538, which is a continuation-in-part of application No. 17/722,354, filed on Apr. 17, 2022, now Pat. No. 11,754,843, which is a continuation-in-part of application No. 17/501,495, filed on Oct. 14, 2021, now Pat. No. 11,307,420, which is a continuation-in-part of application No. 16/686,170, filed on Nov. 17, 2019, now Pat. No. 11,163,163, which is a continuation-in-part of application No. 16/175,924, filed on Oct. 31, 2018, now Pat. No. 10,859,834, which is a continuation-in-part of
(Continued)

(51) Int. Cl.
*G02B 27/01* (2006.01)
*G02B 26/08* (2006.01)

(52) U.S. Cl.
CPC ..... *G02B 27/0172* (2013.01); *G02B 26/0816* (2013.01)

(58) Field of Classification Search
CPC ............ G02B 27/0172; G02B 26/0816; G02B 2027/0178
See application file for complete search history.

(56) References Cited

U.S. PATENT DOCUMENTS

| 10,215,698 B2 | 2/2019 | Han et al. |
| 10,690,986 B2 | 6/2020 | Firka et al. |

(Continued)

*Primary Examiner* — Collin X Beatty

(57) ABSTRACT

This invention is an optical structure with a plurality of movable reflective elements. These reflective elements have first configurations which allow transmission of environmental light. These reflective elements have second configurations which block (or reduce) transmission of environmental light and which reflect light from a virtual-object display toward a person's eye. This enables display of a relatively-opaque virtual object in an area of a person's field of view, while providing the person with a relatively-clear view of their environment in the rest of their field of view.

20 Claims, 22 Drawing Sheets

Related U.S. Application Data application No. 15/942,498, filed on Mar. 31, 2018, now Pat. No. 10,338,400.

(60) Provisional application No. 63/212,054, filed on Jun. 17, 2021, provisional application No. 63/192,664, filed on May 25, 2021, provisional application No. 62/791,359, filed on Jan. 11, 2019, provisional application No. 62/751,076, filed on Oct. 26, 2018, provisional application No. 62/749,775, filed on Oct. 24, 2018, provisional application No. 62/746,487, filed on Oct. 16, 2018, provisional application No. 62/720,171, filed on Aug. 21, 2018, provisional application No. 62/716,507, filed on Aug. 9, 2018, provisional application No. 62/714,684, filed on Aug. 4, 2018, provisional application No. 62/703,025, filed on Jul. 25, 2018, provisional application No. 62/699,800, filed on Jul. 18, 2018, provisional application No. 62/695,124, filed on Jul. 8, 2018, provisional application No. 62/646,856, filed on Mar. 22, 2018, provisional application No. 62/638,087, filed on Mar. 3, 2018, provisional application No. 62/624,699, filed on Jan. 31, 2018, provisional application No. 62/572,328, filed on Oct. 13, 2017, provisional application No. 62/563,798, filed on Sep. 27, 2017, provisional application No. 62/561,834, filed on Sep. 22, 2017, provisional application No. 62/528,331, filed on Jul. 3, 2017.

(56) References Cited

U.S. PATENT DOCUMENTS

| | | | |
|---|---|---|---|
| 10,754,156 B2 * | 8/2020 | Harrison | G02B 27/0172 |
| 10,768,451 B1 | 9/2020 | Carlson | |
| 10,962,783 B2 | 3/2021 | Wilson et al. | |
| 11,086,143 B1 | 8/2021 | Gill et al. | |
| 11,215,829 B2 | 1/2022 | Topliss et al. | |
| 11,467,407 B2 | 10/2022 | DeLapp et al. | |
| 11,885,968 B2 | 1/2024 | Hua et al. | |
| 2013/0021658 A1 | 1/2013 | Miao et al. | |
| 2013/0077175 A1 | 3/2013 | Hotta et al. | |
| 2013/0314759 A1 | 11/2013 | Miao et al. | |
| 2014/0003762 A1 | 1/2014 | Macnamara | |
| 2014/0036361 A1 | 2/2014 | Woodgate et al. | |
| 2015/0036223 A1 | 2/2015 | Dobschal et al. | |
| 2016/0161740 A1 | 6/2016 | Bar-Zeev et al. | |
| 2016/0178910 A1 | 6/2016 | Giudicelli et al. | |
| 2016/0189432 A1 | 6/2016 | Bar-Zeev et al. | |
| 2016/0335806 A1 | 11/2016 | Chan et al. | |
| 2017/0139110 A1 | 5/2017 | Woodgate et al. | |
| 2017/0285347 A1 | 10/2017 | Cai et al. | |
| 2017/0299869 A1 | 10/2017 | Urey et al. | |
| 2017/0299870 A1 | 10/2017 | Urey et al. | |
| 2017/0345217 A1 | 11/2017 | Chan et al. | |
| 2018/0003962 A1 | 1/2018 | Urey et al. | |
| 2018/0003981 A1 | 1/2018 | Urey | |
| 2018/0074248 A1 | 3/2018 | Shani et al. | |
| 2018/0074318 A1 | 3/2018 | Wheelwright et al. | |
| 2018/0074319 A1 | 3/2018 | Wheelwright et al. | |
| 2018/0074320 A1 | 3/2018 | Wheelwright et al. | |
| 2018/0074323 A1 | 3/2018 | Wheelwright et al. | |
| 2018/0074324 A1 | 3/2018 | Wheelwright et al. | |
| 2018/0074325 A1 | 3/2018 | Wheelwright et al. | |
| 2018/0100959 A1 | 4/2018 | Vasylyev | |
| 2018/0143427 A1 | 5/2018 | Griffin et al. | |
| 2018/0164882 A1 | 6/2018 | Johnson et al. | |
| 2018/0172995 A1 | 6/2018 | Lee et al. | |
| 2018/0172999 A1 | 6/2018 | Sulai et al. | |
| 2018/0182150 A1 | 6/2018 | Benishti et al. | |
| 2018/0231784 A1 | 8/2018 | Koudsi et al. | |
| 2018/0252917 A1 | 9/2018 | Takahashi et al. | |
| 2018/0252918 A1 | 9/2018 | Takahashi et al. | |
| 2018/0284441 A1 | 10/2018 | Cobb | |
| 2018/0348524 A1 | 12/2018 | Blum et al. | |
| 2019/0025602 A1 | 1/2019 | Qin et al. | |
| 2019/0041232 A1 | 2/2019 | Maruyama et al. | |
| 2019/0043238 A1 | 2/2019 | Benishti et al. | |
| 2019/0090766 A1 | 3/2019 | Block et al. | |
| 2019/0094537 A1 | 3/2019 | Choi et al. | |
| 2019/0094550 A1 | 3/2019 | Takagi et al. | |
| 2019/0101764 A1 | 4/2019 | Cakmakci | |
| 2019/0101767 A1 | 4/2019 | Geng et al. | |
| 2019/0107719 A1 | 4/2019 | Edwin et al. | |
| 2019/0107723 A1 | 4/2019 | Lee et al. | |
| 2019/0129213 A1 | 5/2019 | Cho et al. | |
| 2019/0158810 A1 | 5/2019 | Cho et al. | |
| 2019/0162950 A1 | 5/2019 | Lapstun | |
| 2019/0165052 A1 | 5/2019 | Son et al. | |
| 2019/0187472 A1 | 6/2019 | Choi et al. | |
| 2019/0227305 A1 | 7/2019 | Fortin-Deschênes et al. | |
| 2019/0227315 A1 | 7/2019 | Sun et al. | |
| 2019/0228586 A1 | 7/2019 | Bar-Zeev et al. | |
| 2019/0235252 A1 | 8/2019 | Freedman et al. | |
| 2019/0235281 A1 | 8/2019 | Etzkorn et al. | |
| 2019/0265476 A1 | 8/2019 | Blum et al. | |
| 2019/0265515 A1 | 8/2019 | Lee et al. | |
| 2019/0273916 A1 | 9/2019 | Benishti et al. | |
| 2019/0278092 A1 | 9/2019 | Kuo et al. | |
| 2019/0282399 A1 | 9/2019 | Goetz | |
| 2019/0285960 A1 | 9/2019 | Sasa et al. | |
| 2019/0289284 A1 | 9/2019 | Smith et al. | |
| 2019/0293938 A1 | 9/2019 | Le Saux et al. | |
| 2019/0294019 A1 | 9/2019 | Park et al. | |
| 2019/0294109 A1 | 9/2019 | Lee et al. | |
| 2019/0331918 A1 | 10/2019 | Hong | |
| 2019/0331923 A1 | 10/2019 | Cai et al. | |
| 2019/0331924 A1 | 10/2019 | Cai et al. | |
| 2019/0339528 A1 | 11/2019 | Freeman et al. | |
| 2019/0348460 A1 | 11/2019 | Chen et al. | |
| 2019/0352808 A1 | 11/2019 | Yoon et al. | |
| 2019/0353906 A1 | 11/2019 | Gollier et al. | |
| 2019/0361245 A1 | 11/2019 | Lanman et al. | |
| 2019/0371065 A1 | 12/2019 | Anders et al. | |
| 2019/0377182 A1 | 12/2019 | Sharp | |
| 2019/0377183 A1 | 12/2019 | Sharp | |
| 2019/0377184 A1 | 12/2019 | Sharp et al. | |
| 2019/0377186 A1 | 12/2019 | Collins | |
| 2019/0378338 A1 | 12/2019 | Bar-Zeev et al. | |
| 2019/0378872 A1 | 12/2019 | Chen et al. | |
| 2019/0385342 A1 | 12/2019 | Freeman et al. | |
| 2019/0391396 A1 | 12/2019 | Saarikko | |
| 2020/0012110 A1 | 1/2020 | Blum et al. | |
| 2020/0026076 A1 | 1/2020 | Beckman | |
| 2020/0033693 A1 | 1/2020 | Lu et al. | |
| 2020/0041798 A1 | 2/2020 | Kress et al. | |
| 2020/0064627 A1 | 2/2020 | Ouderkirk et al. | |
| 2020/0081252 A1 | 3/2020 | Jamali et al. | |
| 2020/0110268 A1 | 4/2020 | Robbins et al. | |
| 2020/0117005 A1 | 4/2020 | Chi et al. | |
| 2020/0124858 A1 | 4/2020 | Cakmakci | |
| 2020/0132919 A1 | 4/2020 | Cakmakci | |
| 2020/0142109 A1 | 5/2020 | Olkkonen et al. | |
| 2020/0142202 A1 | 5/2020 | Lee et al. | |
| 2020/0159026 A1 | 5/2020 | Waldern et al. | |
| 2020/0166691 A1 | 5/2020 | Vartiainen et al. | |
| 2020/0166756 A1 | 5/2020 | DeLapp et al. | |
| 2020/0174255 A1 | 6/2020 | Hollands et al. | |
| 2020/0192095 A1 | 6/2020 | Puetz et al. | |
| 2020/0192152 A1 | 6/2020 | Jamali et al. | |
| 2020/0209626 A1 | 7/2020 | Huang et al. | |
| 2020/0225479 A1 | 7/2020 | Chi et al. | |
| 2020/0249480 A1 | 8/2020 | Martinez et al. | |
| 2020/0257065 A1 | 8/2020 | Chi et al. | |
| 2020/0259307 A1 | 8/2020 | Sharma et al. | |
| 2020/0271936 A1 | 8/2020 | Leibovici et al. | |
| 2020/0271938 A1 | 8/2020 | Taylor et al. | |
| 2020/0281457 A1 | 9/2020 | Zimanyi | |
| 2020/0281458 A1 | 9/2020 | Zimanyi | |
| 2020/0301151 A1 | 9/2020 | Freedman et al. | |
| 2020/0301153 A1 | 9/2020 | Toleno et al. | |
| 2020/0301239 A1 | 9/2020 | Akkaya et al. | |

(56) References Cited

U.S. PATENT DOCUMENTS

| | | |
|---|---|---|
| 2020/0303151 A1 | 9/2020 | Du et al. |
| 2020/0333596 A1 | 10/2020 | Yoon et al. |
| 2020/0334907 A1 | 10/2020 | Bender et al. |
| 2020/0336731 A1 | 10/2020 | Welch et al. |
| 2020/0345293 A1 | 11/2020 | Ras et al. |
| 2020/0348514 A1 | 11/2020 | Chi et al. |
| 2020/0348518 A1 | 11/2020 | Georgiou et al. |
| 2020/0348522 A1 | 11/2020 | Xiao et al. |
| 2020/0355929 A1 | 11/2020 | Zhang et al. |
| 2020/0371280 A1 | 11/2020 | Geng et al. |
| 2020/0371362 A1 | 11/2020 | Xiao et al. |
| 2020/0371371 A1 | 11/2020 | Liang et al. |
| 2020/0371387 A1 | 11/2020 | Gollier et al. |
| 2020/0371388 A1 | 11/2020 | Geng et al. |
| 2020/0393736 A1 | 12/2020 | Hu |
| 2020/0393910 A1 | 12/2020 | Gribetz et al. |
| 2020/0396431 A1 | 12/2020 | Stafford |
| 2020/0400955 A1 | 12/2020 | Messer et al. |
| 2020/0408981 A1 | 12/2020 | Curtis et al. |
| 2021/0003848 A1 | 1/2021 | Choi et al. |
| 2021/0011290 A1 | 1/2021 | Maimone et al. |
| 2021/0018657 A1 | 1/2021 | Tsai et al. |
| 2021/0026138 A1 | 1/2021 | Alasaarela et al. |
| 2021/0033790 A1 | 2/2021 | Ward et al. |
| 2021/0041704 A1 | 2/2021 | Bhargava et al. |
| 2021/0051315 A1 | 2/2021 | Shamir et al. |
| 2021/0055466 A1 | 2/2021 | Eisenfeld |
| 2021/0055546 A1 | 2/2021 | Shin et al. |
| 2021/0055548 A1 | 2/2021 | Rao et al. |
| 2021/0055551 A1 | 2/2021 | Chi et al. |
| 2021/0055552 A1 | 2/2021 | Chi et al. |
| 2021/0055560 A1 | 2/2021 | Ben Tez et al. |
| 2021/0055561 A1 | 2/2021 | Danziger et al. |
| 2021/0055563 A1 | 2/2021 | Bouchier et al. |
| 2021/0055580 A1 | 2/2021 | Wells et al. |
| 2021/0063606 A1 | 3/2021 | Glik et al. |
| 2021/0063733 A1 | 3/2021 | Ronen |
| 2021/0063774 A1 | 3/2021 | Wang et al. |
| 2021/0065427 A1 | 3/2021 | Wade |
| 2021/0066402 A1 | 3/2021 | Pu et al. |
| 2021/0066574 A1 | 3/2021 | Diest et al. |
| 2021/0072437 A1 | 3/2021 | Singh et al. |
| 2021/0072453 A1 | 3/2021 | Peng et al. |
| 2021/0072541 A1 | 3/2021 | Kim et al. |
| 2021/0072559 A1 | 3/2021 | Wang et al. |
| 2021/0072585 A1 | 3/2021 | Shipton et al. |
| 2021/0072821 A1 | 3/2021 | Von Und Zu Liechtenstein |
| 2021/0074067 A1 | 3/2021 | Kwon et al. |
| 2021/0080635 A1 | 3/2021 | Menezes et al. |
| 2021/0080721 A1 | 3/2021 | Geng et al. |
| 2021/0080722 A1 | 3/2021 | Geng et al. |
| 2021/0080724 A1 | 3/2021 | Sulai et al. |
| 2021/0080725 A1 | 3/2021 | Sulai et al. |
| 2021/0080726 A1 | 3/2021 | Geng et al. |
| 2021/0080730 A1 | 3/2021 | Morrison et al. |
| 2021/0080739 A1 | 3/2021 | Geng et al. |
| 2021/0080763 A1 | 3/2021 | Sulai et al. |
| 2021/0080906 A1 | 3/2021 | Jolly et al. |
| 2021/0088700 A1 | 3/2021 | Wang et al. |
| 2021/0088794 A1 | 3/2021 | Melville |
| 2021/0088795 A1 | 3/2021 | Cheng et al. |
| 2021/0089129 A1 | 3/2021 | Osterhout et al. |
| 2021/0096380 A1 | 4/2021 | Osmanis et al. |
| 2021/0096391 A1 | 4/2021 | Ma et al. |
| 2021/0096453 A1 | 4/2021 | Wheelwright et al. |
| 2021/0103145 A1 | 4/2021 | You et al. |
| 2021/0103180 A1 | 4/2021 | Sears et al. |
| 2021/0103182 A1 | 4/2021 | Tan et al. |
| 2021/0109278 A1 | 4/2021 | Peroz et al. |
| 2021/0109352 A1 | 4/2021 | Lee et al. |
| 2021/0109433 A1 | 4/2021 | Trisnadi et al. |
| 2021/0112647 A1 | 4/2021 | Coleman |
| 2021/0191125 A1 | 6/2021 | Li et al. |
| 2021/0215938 A1 | 7/2021 | Maimone et al. |
| 2021/0240036 A1 | 8/2021 | Jamali et al. |
| 2021/0255490 A1 | 8/2021 | Parsons et al. |
| 2022/0006987 A1 | 1/2022 | Seiler et al. |
| 2022/0043323 A1 | 2/2022 | Skirlo et al. |
| 2023/0014448 A1 | 1/2023 | Morin et al. |
| 2023/0288707 A1 | 9/2023 | Guan |
| 2023/0333358 A1 | 10/2023 | Ha |
| 2023/0360567 A1 | 11/2023 | Yang |
| 2023/0367073 A1 | 11/2023 | Landig et al. |
| 2023/0367123 A1 | 11/2023 | Amirsolaimani |
| 2023/0367128 A1 | 11/2023 | Ha |
| 2023/0368477 A1 | 11/2023 | Moskalev |
| 2023/0393309 A1 | 12/2023 | Rao et al. |
| 2023/0400690 A1 | 12/2023 | Marsh et al. |
| 2023/0400748 A1 | 12/2023 | Valentine et al. |
| 2023/0408826 A1 | 12/2023 | Oh et al. |

\* cited by examiner

AUGMENTED REALITY (OR MIXED REALITY) EYEWEAR WITH SEE-THROUGH OPTICAL ELEMENTS HAVING INDIVIDUALLY-ADJUSTABLE OPACITY/REFLECTIVITY LEVELS

CROSS-REFERENCE TO RELATED APPLICATIONS

This application is a continuation-in-part of U.S. patent application Ser. No. 18/800,091 filed on 2024 Aug. 11. This application is a continuation-in-part of U.S. patent application Ser. No. 18/586,439 filed on 2024 Feb. 24.

U.S. patent application Ser. No. 18/800,091 was a continuation-in-part of U.S. patent application Ser. No. 18/586,439 filed on 2024 Feb. 24. U.S. patent application Ser. No. 18/586,439 was a continuation-in-part of U.S. patent application Ser. No. 18/088,548 filed on 2022 Dec. 24. U.S. patent application Ser. No. 18/088,548 was a continuation-in-part of U.S. patent application Ser. No. 17/722,354 filed on 2022 Apr. 17. U.S. patent application Ser. No. 17/722,354 was a continuation-in-part of U.S. patent application Ser. No. 17/501,495 filed on 2021 Oct. 14.

U.S. patent application Ser. No. 17/501,495 was a continuation-in-part of U.S. patent application Ser. No. 16/686,170 filed on 2019 Nov. 17. U.S. patent application Ser. No. 17/501,495 claimed the priority benefit of U.S. provisional patent application 63/192,664 filed on 2021 May 25. U.S. patent application Ser. No. 17/501,495 claimed the priority benefit of U.S. provisional patent application 63/212,054 filed on 2021 Jun. 17. U.S. patent application Ser. No. 16/686,170 claimed the priority benefit of U.S. provisional patent application 62/791,359 filed on 2019 Jan. 11. U.S. patent application Ser. No. 16/686,170 was a continuation-in-part of U.S. patent application Ser. No. 16/175,924 filed on 2018 Oct. 31 which issued as U.S. Pat. No. 10,859,834 on 2020 Dec. 8.

U.S. patent application Ser. No. 16/175,924 claimed the priority benefit of U.S. provisional patent application 62/751,076 filed on 2018 Oct. 26. U.S. patent application Ser. No. 16/175,924 claimed the priority benefit of U.S. provisional patent application 62/749,775 filed on 2018 Oct. 24. U.S. patent application Ser. No. 16/175,924 claimed the priority benefit of U.S. provisional patent application 62/746,487 filed on 2018 Oct. 16. U.S. patent application Ser. No. 16/175,924 claimed the priority benefit of U.S. provisional patent application 62/720,171 filed on 2018 Aug. 21. U.S. patent application Ser. No. 16/175,924 claimed the priority benefit of U.S. provisional patent application 62/716,507 filed on 2018 Aug. 9. U.S. patent application Ser. No. 16/175,924 claimed the priority benefit of U.S. provisional patent application 62/714,684 filed on 2018 Aug. 4. U.S. patent application Ser. No. 16/175,924 claimed the priority benefit of U.S. provisional patent application 62/703,025 filed on 2018 Jul. 25. U.S. patent application Ser. No. 16/175,924 claimed the priority benefit of U.S. provisional patent application 62/699,800 filed on 2018 Jul. 18. U.S. patent application Ser. No. 16/175,924 claimed the priority benefit of U.S. provisional patent application 62/695,124 filed on 2018 Jul. 8. U.S. patent application Ser. No. 16/175,924 was a continuation-in-part of U.S. patent application Ser. No. 15/942,498 filed on 2018 Mar. 31 which issued as U.S. patent 1085983410338400 on 2019 Jul. 2. U.S. patent application Ser. No. 16/175,924 claimed the priority benefit of U.S. provisional patent application 62/646,856 filed on 2018 Mar. 22. U.S. patent application Ser. No. 16/175,924 claimed the priority benefit of U.S. provisional patent application 62/638,087 filed on 2018 Mar. 3. U.S. patent application Ser. No. 16/175,924 claimed the priority benefit of U.S. provisional patent application 62/624,699 filed on 2018 Jan. 31.

U.S. patent application Ser. No. 15/942,498 claimed the priority benefit of U.S. provisional patent application 62/646,856 filed on 2018 Mar. 22. U.S. patent application Ser. No. 15/942,498 claimed the priority benefit of U.S. provisional patent application 62/638,087 filed on 2018 Mar. 3. U.S. patent application Ser. No. 15/942,498 claimed the priority benefit of U.S. provisional patent application 62/624,699 filed on 2018 Jan. 31. U.S. patent application Ser. No. 15/942,498 claimed the priority benefit of U.S. provisional patent application 62/572,328 filed on 2017 Oct. 13. U.S. patent application Ser. No. 15/942,498 claimed the priority benefit of U.S. provisional patent application 62/563,798 filed on 2017 Sep. 27. U.S. patent application Ser. No. 15/942,498 claimed the priority benefit of U.S. provisional patent application 62/561,834 filed on 2017 Sep. 22. U.S. patent application Ser. No. 15/942,498 claimed the priority benefit of U.S. provisional patent application 62/528,331 filed on 2017 Jul. 3.

The entire contents of these related applications are incorporated herein by reference.

FEDERALLY SPONSORED RESEARCH

Not Applicable

SEQUENCE LISTING OR PROGRAM

Not Applicable

BACKGROUND—FIELD OF INVENTION

This invention relates to augmented reality eyewear.

INTRODUCTION

Augmented reality (or mixed reality) eyewear superimposes images of virtual objects on a person's view of the real world. Augmented reality eyewear can be embodied in specialized eyeglasses or a head mounted display. With current technology, there is a tradeoff between augmented reality eyewear designs which provide the best view (e.g. clear, bright, and wide-angle) of the real world and designs which provide the best view (e.g. clear, bright, and opaque) of virtual objects. There is a need for see-through optical structures for use in augmented reality eyewear which can optimize, or entirely avoid, this trade off. Ideally, augmented reality eyewear should be able to provide a clear, bright, opaque view of virtual objects and also maintain a clear, bright, wide-angle view of the real world.

REVIEW OF THE RELEVANT ART

U.S. patent application 20130021658 (Miao et al., Jan. 24, 2013, "Compact See-Through Display System") discloses an optical system with a display panel, an image former, a viewing window, a proximal beam splitter, and a distal beam splitter. U.S. patent application 20130077175 (Hotta et al., Mar. 28, 2013, "Display Device") discloses a display device with an image projection unit, an optical unit, and a mounting unit. U.S. patent application 20130314759 (Miao et al., Nov. 28, 2013, "Compact See-Through Display System")

discloses an optical system with a display panel, an image former, a viewing window, a proximal beam splitter, and a distal beam splitter.

U.S. patent application 20140003762 (Macnamara, Jan. 2, 2014, "Multiple Depth Plane Three-Dimensional Display Using a Wave Guide Reflector Array Projector") discloses a two-dimensional array of linear wave guides and 2D planar wave guide assemblies. U.S. patent applications 20140036361 (Woodgate et al., Feb. 6, 2014, "Directionally Illuminated Waveguide Arrangement") and 20170139110 (Woodgate et al., May 18, 2017, "Directionally Illuminated Waveguide Arrangement") disclose a light-guiding valve apparatus comprising an optical valve, a two dimensional light source array, and a focusing optic for providing large area collimated illumination from localized light sources. U.S. patent application 20150036223 (Dobschal et al., Feb. 5, 2015, "Display Device Comprising Multifunction Glass, Production Method and Optical Element Having a Fresnel Structure") discloses a multifunction optical element with a Fresnel structure for out coupling.

U.S. patent application 20160161740 (Bar-Zeev et al., Jun. 9, 2016, "Automatic Variable Virtual Focus for Augmented Reality Displays") discloses an augmented reality display wherein a user's focal region is tracked and a virtual object is displayed in that region. U.S. patent application 20160178910 (Giudicelli et al., Jun. 23, 2016, "Optical Projection Device for Display Means Such as Augmented Reality Glasses") discloses augmented reality glasses with a planar optical guide, at least two input optics, and at least two collimation elements. U.S. patent application 20160189432 (Bar-Zeev et al., Jun. 30, 2016, "Automatic Focus Improvement for Augmented Reality Displays") discloses a see-through display with a variable focus lens.

U.S. patent applications 20160335806 (Chan et al., Nov. 17, 2016, "Reprojection OLED Display for Augmented Reality Experiences") and 20170345217 (Chan et al., Nov. 30, 2017, "Reprojection OLED Display for Augmented Reality Experiences") disclose methods for displaying virtual images in an augmented reality environment at a frame rate that is greater than a rendering frame rate. U.S. patent applications 20170285347 (Cai et al., Oct. 5, 2017, "Augmented/Virtual Reality Near-Eye Displays with Edge Imaging Lens Comprising A Plurality of Display Devices"), 20190331923 (Cai et al., Oct. 31, 2019, "Augmented/Virtual Reality Near-Eye Displays with Edge Imaging Lens Comprising a Plurality of Display Devices"), and 20190331924 (Cai et al., Oct. 31, 2019. "Augmented/Virtual Reality Near-Eye Displays with Edge Imaging Lens Comprising a Plurality of Display Devices") disclose a lens with a beam-splitting interface which is horizontal along the width of the lens.

U.S. patent application 20170299869 (Urey et al., Oct. 19, 2017, "Near-to-Eye Display Device") discloses a near-to-eye display device with a spatial light modulator which modulates an illumination wave to create a virtual-scene wave that is steered to an exit pupil plane. U.S. patent application 20170299870 (Urey et al., Oct. 19, 2017, "Apparatus for Generating a Coherent Beam Illumination") discloses an apparatus which generates a coherent illumination beam. U.S. patent application 20180003962 (Urey et al., Jan. 4, 2018, "Near-to-Eye Display Device with Variable Resolution") discloses a near-to-eye display device with a spatial light modulator and a microdisplay.

U.S. patent application 20180003981 (Urey, Jan. 4, 2018, "Near-to-Eye Display Device with Spatial Light Modulator and Pupil Tracker") discloses a near-to-eye display device with a spatial light modulator, a rotatable reflective optical element, and a pupil-tracking device. U.S. patent application 20180074318 (Wheelwright et al., Mar. 15, 2018, "Hybrid Fresnel Lens with Reduced Artifacts") discloses a lens wherein a first portion of a first lens surface is defined by a smooth surface profile function and a second portion of the first lens surface is defined by a Fresnel surface profile function. U.S. patent application 20180074319 (Wheelwright et al., Mar. 15, 2018, "Hybrid Fresnel Lens with Increased Field of View") discloses a lens portion with a Fresnel surface profile. U.S. patent application 20180074324 (Wheelwright et al., Mar. 15, 2018, "Fresnel Lens with Dynamic Draft for Variable Gaze") discloses a lens configured for transmitting light in a first medium to a first reference pupil including an optically transparent substrate having a plurality of Fresnel structures.

U.S. patent application 20180074248 (Shani et al., Mar. 15, 2018, "Slim Waveguide Coupling Apparatus and Method") discloses an illumination structure with a discrete light source near a bottom surface of a waveguide and below a depression in a top surface thereof. U.S. patent applications 20180074320 (Wheelwright et al., Mar. 15, 2018, "Dynamic Draft for Fresnel Lenses"), 20180074323 (Wheelwright et al., Mar. 15, 2018, "Fresnel Lens with Dynamic Draft for Reduced Optical Artifacts"), and 20180074325 (Wheelwright et al., Mar. 15, 2018, "Fresnel Lens with Dynamic Pitch") disclose lenses with a plurality of Fresnel structures. U.S. patent application 20180100959 (Vasylyev, Apr. 12, 2018, "Illumination System Using Edge-Lit Waveguide and Microstructured Surfaces") discloses an apparatus for distributing light from a planar waveguide through an array of elongated surface relief features formed in a major surface of the waveguide.

U.S. patent application 20180143427 (Griffin et al., May 24, 2018, "Optical System for a Display with an Off Axis Projector") discloses an optical projection system that presents a displayed virtual image at a predetermined distance in front of a viewing position. U.S. patent application 20180164882 (Johnson et al., Jun. 14, 2018, "Electronic Device with Adjustable Reflective Display") discloses a tracking system that gathers point-of-gaze information, vergence information, and head position information. U.S. patent application 20180172999 (Sulai et al., Jun. 21, 2018, "Multifocal System with Polarizing Elements") discloses a head-mounted display (HMD) with a multifocal block having one or more possible focal distances.

U.S. patent applications 20180172995 (Lee et al., Jun. 21, 2018, "Waveguide Display with a Small Form Factor, a Large Field of View, and a Large Eyebox"), 20190107723 (Lee et al., Apr. 11, 2019, "Waveguide Display with a Small Form Factor, a Large Field of View, and a Large Eyebox"), and 20200142202 (Lee et al., May 7, 2020, "Waveguide Display with a Small Form Factor, a Large Field of View, and a Large Eyebox") disclose a device with a waveguide display and one or more projectors which project an image light at least along one dimension. U.S. patent applications 20180182150 (Benishti et al., Jun. 28, 2018, "Combining Video-Based and Optic-Based Augmented Reality in a Near Eye Display"). 20190043238 (Benishti et al., Feb. 7, 2019, "Combining Video-Based and Optic-Based Augmented Reality in a Near Eye Display"), and 20190273916 (Benishti et al., Sep. 5, 2019, "Combining Video-Based and Optic-Based Augmented Reality in a Near Eye Display") disclose an array of variably-transparent pixels.

U.S. patent application 20180231784 (Koudsi et al., Aug. 16, 2018, "Optical Display System for Augmented Reality and Virtual Reality") discloses optical display systems and methods for providing three-dimensional and two-dimensional convergence corrected images to a user. U.S. patent application 20180252917 (Takahashi et al., Sep. 6, 2018, "Display Image Projection Apparatus and Display Image Projection System") discloses a free-curved surface Fresnel mirror inside an HUD unit. U.S. patent application 20180252918 (Takahashi et al., Sep. 6, 2018, "Display Image Projection System") discloses an aspherical mirror or a free-curved surface mirror inside an HUD unit.

U.S. patent application 20180284441 (Cobb, Oct. 4, 2018, "Wide Field Head Mounted Display") discloses an optical apparatus with a concave spherical mirror that has a center of curvature at the viewer's pupil. U.S. patent application 20180348524 (Blum et al., Dec. 6, 2018, "Releasably Attachable Augmented Reality System for Eyewear") discloses an Augmented Reality apparatus which uses existing eyewear as an attachment platform. U.S. patent application 20190025602 (Qin et al., Jan. 24, 2019, "Compact Near-Eye Display Optics for Augmented Reality") discloses an optical system with three filter stacks which convert light via circular polarization. U.S. patent application 20190041232 (Maruyama et al., Feb. 7, 2019, "Vehicular Display Device") discloses a vehicular display device which displays a guide route.

U.S. Pat. No. 10,215,698 (Han et al., Feb. 29, 2019, "Multiple Light Paths Architecture and Obscuration Methods for Signal and Perfusion Index Optimization") disclose a photoplethysmographic device with one or more light emitters and one or more light sensors. U.S. patent application 20190090766 (Block et al., Mar. 28, 2019, "Concentric Architecture for Optical Sensing") discloses an electronic device with optical sensing and a concentric architecture. U.S. patent application 20190094537 (Choi et al., Mar. 28, 2019, "Display Device") discloses a display device with a plurality of diffractive optical elements which are each configured to emit light guided through a light guide plate to a user. U.S. patent application 20190094550 (Takagi et al., Mar. 28, 2019, "Virtual Image Display Device") discloses a non-telecentric optical system with an image display unit.

U.S. patent application 20190101764 (Cakmakci, Apr. 4, 2019, "Head-Worn Augmented Reality Display") discloses a combiner and a microdisplay device, wherein the combiner has a curved transparent structure and a reflective surface. U.S. patent application 20190101767 (Geng et al., Apr. 4, 2019, "Fresnel Assembly for Light Redirection in Eye Tracking Systems") discloses a head-mounted device with a display element, a Fresnel assembly, an illumination source, and a camera assembly. U.S. patent application 20190107719 (Edwin et al., Apr. 11, 2019, "Augmented Reality Display Comprising Eyepiece Having a Transparent Emissive Display") discloses an augmented reality head-mounted display system with a transparent emissive display.

U.S. patent application 20190129213 (Cho et al., May 2, 2019, "Display Apparatus") discloses a display apparatus with a liquid crystal panel and a shutter panel. U.S. patent application 20190158810 (Cho et al., May 23, 2019, "Multi-Lens Based Capturing Apparatus and Method") discloses a multi-lens capturing apparatus. U.S. patent application 20190162950 (Lapstun, May 30, 2019, "Head-Mounted Light Field Display") by the genius from down under discloses a head-mounted light field display device with at least one multiplexed light field display module adapted to face an eye of a viewer wearing the device, the multiplexed light field display module comprising a light field view image generator and a waveguide with a set of shutters. U.S. patent application 20190165052 (Son et al., May 30, 2019, "Display Device and Eyeglasses-Like Augmented Reality Device Using the Same") discloses a display with a lower substrate, an upper substrate, an insulating layer over the lower substrate, and an organic light-emitting diode on the insulating layer.

U.S. patent application 20190187472 (Choi et al., Jun. 20, 2019, "Optical System and Wearable Display Apparatus Having the Same") discloses an optical system with a first waveguide, a transmissive reflective layer on the first waveguide, a second waveguide on the transmissive reflective layer, an in-coupler, and an out-coupler. U.S. patent application 20190227315 (Sun et al., Jul. 25, 2019. "Systems and Methods of Attenuating Light in a Display") discloses a display with a first light source, a second light source, a movable mirror, and an attenuator.

U.S. patent applications 20190228586 (Bar-Zeev et al., Jul. 25, 2019, "Opacity Filter for Display Device") and 20190378338 (Bar-Zeev et al., Dec. 12, 2019, "Opacity Filter for Display Device") disclose an optical see-through head-mounted display with a see-through lens and an opacity filter is used to selectively block portions of the real-world scene. U.S. patent application 20190227305 (Fortin-Desch Nes et al., Jul. 25, 2019, "Optical Arrangements Including Fresnel Lens Elements") discloses an optical lens arrangement with a first Fresnel lens element and a second lens element.

U.S. patent application 20190235252 (Freedman et al., Aug. 1, 2019, "Method and System for Large Field of View Display with Scanning Mirror Having Optical Power") discloses an image display system with light sources which are configured to emit uncollimated light and also an eyepiece waveguide having an input port which receives beams of light at differing angles. U.S. patent application 20190235281 (Etzkorn et al., Aug. 1, 2019, "Eye-Mountable Device to Provide Automatic Accommodation and Method of Making Same") discloses an eye-mountable device with a lens enclosure, liquid crystal material, first and second electrodes, a substrate, and a controller. U.S. patent application 20190265476 (Blum et al., Aug. 29, 2019, "See-Through Near Eye Optical Module") discloses a semi-transparent near eye optical module with a transparent sparsely populated near eye display comprising a plurality of pixels or pixel patches and a sparsely populated micro-lens array.

U.S. patent application 20190265515 (Lee et al., Aug. 29, 2019, "Failsafe Operation of Eye-Mountable Device") discloses an eye-mountable device with an optical lens, an accommodation actuator to provide vision accommodation for the optical lens, and a controller including an accommodation logic to select one of a plurality of vision accommodation states for the device. U.S. patent application 20190278092 (Kuo et al., Sep. 12, 2019, "Augmented Reality Display System and Display Method Thereof") discloses an augmented reality display system with an input unit, an operation processing unit, and an output unit. U.S. patent application 20190282399 (Goetz, Sep. 19, 2019. "Ultrasonic Ophthalmic Device") discloses an ophthalmic device with an ultrasonic transducer, an accommodation actuator, and a controller.

U.S. patent application 20190285960 (Sasa et al., Sep. 19, 2019, "Electrochromic Device, Electronic Dimming Eyeglasses, Augmented Reality Eyeglasses, and Camera") discloses an electrochromic device which is reversibly and controllably colored and decolored by electricity. U.S. patent application 20190289284 (Smith et al., Sep. 19, 2019, "Light Field Capture and Rendering for Head-Mounted Displays") discloses systems and methods for capturing and rendering light fields for head-mounted displays. U.S. patent application 20190293938 (Le Saux et al., Sep. 26, 2019, "Method for Providing a Display Unit for an Electronic Information Device") discloses a display device with an optical element having a nonzero optical power.

U.S. patent application 20190294019 (Park et al., Sep. 26, 2019, "Beam Scanning Apparatus and Optical Apparatus Including the Same") discloses a beam scanning apparatus with a reflective phased array device. U.S. patent application 20190294109 (Lee et al., Sep. 26, 2019, "Holographic Display Device") discloses a holographic display with a backlight unit for emitting light and a spatial light modulator. U.S. patent application 20190331918 (Hong, Oct. 31, 2019, "Display System and Image Display Method") discloses a display, a waveguide, an image acquisition device, and a calibration device. U.S. patent application 20190339528 (Freeman et al., Nov. 7, 2019, "Wearable Image Manipulation and Control System with High Resolution Micro-Displays and Dynamic Opacity Augmentation in Augmented Reality Glasses") discloses a mixed reality display with dynamic opacity.

U.S. patent applications 20190348460 (Chen et al., Nov. 14, 2019, "Multi-Photodiode Pixel Cell") and 20190378872 (Chen et al., Dec. 12, 2019, "Multi-Photodiode Pixel Cell") disclose a semiconductor substrate including first and second photodiodes and a barrier layer between the photodiodes, wherein the photodiodes and the barrier layer form a stack. U.S. patent application 20190352808 (Yoon et al., Nov. 21, 2019, "Electronically Functional Yarn and Textile") discloses integrating electronic functionality into textiles. U.S. patent application 20190353906 (Gollier et al., Nov. 21, 2019, "Optical Assembly with Polarization Volume Holographic Element") discloses an optical assembly with a partial reflector that is optically coupled with a first polarization volume holographic element. U.S. patent application 20190361245 (Lanman et al., Nov. 28, 2019, "Augmented Reality Head-Mounted Display with a Fresnel Combiner and Pupil Steering") discloses a head-mounted display with a light projector and a Fresnel combiner.

U.S. patent application 20190371065 (Anders et al., Dec. 5, 2019, "Augmented Reality Masking") discloses masks for the portion of a scene which is not processed for viewing via augmented reality. U.S. patent application 20190377182 (Sharp, Dec. 12, 2019, "Reverse-Order Crossed Pancake Lens with Azimuthal Compensation") discloses a pancake lens block with azimuthal compensation. U.S. patent application 20190377183 (Sharp, Dec. 12, 2019, "Reverse-Order Crossed Pancake Lens with a Shaped Polarizer") discloses a pancake lens block with a shaped reflective polarizer. U.S. patent application 20190377184 (Sharp et al., Dec. 12, 2019, "Reverse-Order Crossed Pancake Lens with Index Gradient Structure") discloses a reverse-order crossed pancake lens block having an index gradient structure.

U.S. patent application 20190377186 (Collins, Dec. 12, 2019, "Systems and Methods for Augmented Reality Display") discloses an augmented reality system with a power source, a sensor array, a lens, and a projector. U.S. patent application 20190385342 (Freeman et al., Dec. 19, 2019, "Wearable Image Manipulation and Control System with Micro-Displays and Augmentation of Vision and Sensing in Augmented Reality Glasses") discloses a wearable mixed reality system comprising a camera and an image projection system. U.S. patent application 20190391396 (Saarikko, Dec. 26, 2019, "Tiled Waveguide Display with a Wide Field-Of-View") discloses a waveguide display with light sources, a source waveguide, an output waveguide, and a controller.

U.S. patent application No. 20200012110 (Blum et al., Jan. 9, 2020, "Augmented Reality or Mixed Reality System for Eyewear") discloses a see-through display with a microlens array. U.S. patent application No. 20200026076 (Beckman, Jan. 23, 2020, "Augmented Reality Display Systems with Variable, Directional Light Transmission Enhancing Virtual Images at an Observation Point") discloses a matrix of light-augmenting pixels in a variable-transmission semi-transparent screen. U.S. patent application No. 20200033693 (Lu et al., Jan. 30, 2020, "Varifocal System Using Hybrid Tunable Liquid Crystal Lenses") discloses a varifocal system with a stacked first-type liquid crystal lens and a stacked second-type LC lens in series.

U.S. patent application No. 20200041798 (Kress et al., Feb. 6, 2020, "Head Wearable Display Using Powerless Optical Combiner") discloses a lightguide with internal optical elements that redirect the light with an expanded cross-section size that is larger than the initial cross-section size. U.S. patent application No. 20200064627 (Ouderkirk et al., Feb. 27, 2020, "Illumination Assembly with In-Field Micro Devices") discloses a transparent substrate and a plurality of micro devices coupled to conductive pathways. U.S. patent application No. 20200081252 (Jamali et al., Mar. 12, 2020, "Polarization-Sensitive Components in Optical Systems for Large Pupil Acceptance Angles") discloses an eye tracking module and optical elements combined to allow changes in the positions of one or both eyes.

U.S. patent application No. 20200110268 (Robbins et al., Apr. 9, 2020, "Compact Optical System with MEMS Scanners for Image Generation and Object Tracking") discloses an optical system with micro electro mechanical system (MEMS) scanners to generate images and to scan the real world. U.S. patent application No. 20200117005 (Chi et al., Apr. 16, 2020, "Waveguide for Conveying Multiple Portions of Field of View") discloses a waveguide for conveying light carrying an image. U.S. patent application No. 20200124858 (Cakmakci, Apr. 23, 2020, "Freeform Head Mounted Display") discloses lenses having a combined optical power to form a curved intermediate image.

U.S. patent application No. 20200132919 (Cakmakci, Apr. 30, 2020, "Curved Optical See-Through Thin Freeform Lightguide with Large Field of View in Eyewear Formfactor") discloses a lightguide, a microdisplay, and a field lens positioned therebetween that directs light from the microdisplay into a top surface of the lightguide. U.S. patent application No. 20200142109 (Olkkonen et al., May 7, 2020, "Display Element, Personal Display Device, Method of Producing an Image on a Personal Display and Use") discloses a lightguide that guides light by total internal reflection, a diffractive in-coupling grating, and a diffractive out-coupling grating.

U.S. patent application No. 20200159026 (Waldern et al., May 21, 2020, "Wearable Heads Up Displays") discloses a display with a first waveguide, an input grating, a fold grating, an output grating, an image input image node assembly, and prismatic relay optics. U.S. patent application 20200166691 (Vartiainen et al., May 28, 2020, "Diffractive Grating with Variable Diffraction Efficiency and Method for Displaying an Image") discloses an optical grating with a first zone and a second zone, each having a two-dimensionally periodic grating structure. U.S. patent application 20200166756 (DeLapp et al., May 28, 2020, "Displays with Volume Phase Gratings") and U.S. Pat. No. 11,467,407 (DeLapp et al., Oct. 11, 2022. "Displays with Volume Phase Gratings") discloses input and output couplers made from volume phase holographic gratings.

U.S. patent application No. 20200174255 (Hollands et al., Jun. 4, 2020, "Optical Systems with Multi-Layer Holographic Combiners") discloses first hologram structures that replicate light over multiple output angles onto second hologram structures. U.S. patent application No. 20200192095 (Puetz et al., Jun. 18, 2020, "Eyeglass Lens for an Optical Imaging Element, and Augmented Reality Glasses") discloses a lens with a main body and at least one complementary element mounted on the main body. U.S. patent applications 20200192152 (Jamali et al., Jun. 18, 2020, "Optical System Using Segmented Phase Profile Liquid Crystal Lenses") and 20210240036 (Jamali et al., Aug. 5, 2021, "Optical System Using Segmented Phase Profile Liquid Crystal Lenses") disclose an adaptive lens which is coupled to an electronic display between an electronic display and a user's eyes.

U.S. Pat. No. 10,690,986 (Firka et al., Jun. 23, 2020, "Electronic Devices Having Electrically Adjustable Optical Shutters") discloses an electrically adjustable shutter. U.S. patent application 20200209626 (Huang et al., Jul. 2, 2020, "Near-Eye Augmented Reality Device") discloses a near-eye augmented reality device with imaging unit portions having birefringence and positive diopter, a lighting unit, and a polarization-control unit. U.S. patent application No. 20200225479 (Chi et al., Jul. 16, 2020, "Volume Bragg Gratings for Near-Eye Waveguide Display") discloses a waveguide display with a substrate which is transparent to visible light, a coupler configured to couple display light into the substrate such that the display light propagates within the substrate through total internal reflection, a first multiplexed volume Bragg grating (VBG) on the substrate, and a second multiplexed VBG on the substrate.

U.S. patent application No. 20200249480 (Martinez et al., Aug. 6, 2020, "Multi-Focal Catadioptric Head Mounted Display with LC Switch") discloses a beam splitter with a polarization beam splitting film and a mirror coating to generate two orthogonal polarization states with different optical paths. U.S. patent application No. 20200257065 (Chi et al., Aug. 13, 2020, "Dispersion Compensation for Light Coupling Through Slanted Facet of Optical Waveguide") discloses a pupil expander with a waveguide having a slanted facet. U.S. patent application No. 20200259307 (Sharma et al., Aug. 13, 2020, "Optical Elements for Beam-Shaping and Illumination") discloses a device with a light source, an optical element, and an encapsulant layer.

U.S. patent application No. 20200271936 (Leibovici et al., Aug. 27, 2020, "Near-Eye Display System Having Optical Combiner") discloses a device with an optical waveguide and a plurality of grating structures having variable grating periods or slant angles. U.S. patent application 20200271938 (Taylor et al., Aug. 27, 2020, "Super-Resolution Scanning Display for Near-Eye Displays") discloses a super-resolution scanning display with a light source, a conditioning assembly, and a scanning mirror assembly. U.S. Pat. No. 10,768,451 (Carlson, Sep. 8, 2020, "Diffusers in Wearable Devices") discloses a diffuser that diffuses light in a radial anisotropic diffusion pattern or a prism-like diffusion pattern.

U.S. patent applications 20200281458 (Zimanyi, Sep. 10, 2020, "Guided Lens Design Exploration Method for a Progressive Lens Simulator") and 20200281457 (Zimanyi, Sep. 10, 2020, "Guided Lens Design Exploration System for a Progressive Lens Simulator") disclose a progressive lens simulator with an eye tracker. U.S. patent application No. 20200301151 (Freedman et al., Sep. 24, 2020, "Method and System for Large Field of View Display with Scanning Mirror Having Optical Power") discloses a display system with a plurality of light sources and a waveguide having an input port configured to receive beams of light at differing angles. U.S. patent application 20200301153 (Toleno et al., Sep. 24, 2020, "Near Eye Display (NED) Device Housing Shell Integrated with Molded Boss Clusters for Precision Mounting of Hardware Components") discloses a near-eye display device with a housing shell which is integrated with molded boss clusters.

U.S. patent application No. 20200301239 (Akkaya et al., Sep. 24, 2020, "Varifocal Display with Fixed-Focus Lens") discloses a display with a projector, an optical waveguide, a fixed-focus lens, and a variable-focus lens. U.S. patent application No. 20200303151 (Du et al., Sep. 24, 2020, "Method and System for Adjusting Focal Point Position") discloses ways to adjust a focal point position of an X-ray tube. U.S. patent application No. 20200333596 (Yoon et al., Oct. 22, 2020, "Reflective Polarizer for Augmented Reality and Virtual Reality Display") discloses a head-mounted display with a first reflective polarizer having a first optical surface and a second optical surface that is opposite to the first optical surface.

U.S. patent application No. 20200334907 (Bender et al., Oct. 22, 2020, "Dynamic Partition of Augmented Reality Region") discloses boundary dimension values for different areas relative to a reference geographic location. U.S. patent application No. 20200336731 (Welch et al., Oct. 22, 2020, "Light Projector Using an Acousto-Optical Control Device") discloses using surface acoustic waves along a substrate to guide image light to different areas. U.S. patent application No. 20200345293 (Ras et al., Nov. 5, 2020, "Device for Imaging Skin") discloses a skin imaging device. U.S. patent application No. 20200348514 (Chi et al., Nov. 5, 2020, "Waveguide Including Volume Bragg Gratings") discloses a waveguide with Volume Bragg Gratings (VBGs).

U.S. patent application No. 20200348518 (Georgiou et al., Nov. 5, 2020, "Near-Eye Peripheral Display Device") discloses a head-mounted, near-eye display device with a central display and a peripheral display. U.S. patent applications 20200348522 (Xiao et al., Nov. 5, 2020, "Wearable AR System, AR Display Device and Its Projection Source Module") and 20200371371 (Liang et al., Nov. 26, 2020, "Wearable AR System, AR Display Device and Its Projection Source Module") disclose an augmented reality display comprising a projection source with a curved light outgoing surface. U.S. patent application No. 20200355929 (Zhang et al., Nov. 12, 2020, "Holographic Optical Elements for Eye-Tracking Illumination") discloses eye-tracking with a substrate transparent to visible light, an array of light sources in the substrate, and a holographic optical element coupled to the substrate.

U.S. patent application No. 20200371280 (Geng et al., Nov. 26, 2020, "Optical Waveguide Beam Splitter with Polarization Volume Gratings for Display") discloses an optical device for providing illumination light with a waveguide and a plurality of polarization selective elements. U.S. patent application No. 20200371362 (Xiao et al., Nov. 26, 2020, "Wearable AR System and AR Display Device") discloses a projector, a first optical path having a first beamsplitter and a first reflector, and a second optical path having a second beamsplitter and a second reflector. U.S. patent application 20200371387 (Gollier et al., Nov. 26, 2020, "Optical Waveguide Beam Splitter with Reflective Polarizers for Display") discloses an optical device with a waveguide and a plurality of reflective polarizers.

U.S. patent application No. 20200371388 (Geng et al., Nov. 26, 2020, "Optical Waveguide Beam Splitter with Extraction Features for Display") discloses an optical device with a spatial light modulator and an optical waveguide. U.S. patent application No. 20200393736 (Hu, Dec. 17, 2020, "Display Glasses Using Meta-Surface Planar Lens Integrated with Liquid Lens") discloses an integrated lens with a planar lens and a liquid lens. U.S. patent application No. 20200393910 (Gribetz et al., Dec. 17, 2020, "Extramissive Spatial Imaging Digital Eye Glass Apparatuses, Methods and Systems for Virtual or Augmediated Vision, Manipulation, Creation, or Interaction with Objects, Materials, or Other Entities") discloses a first phenomenon interface a first augmediated-reality space, a second phenomenon interface, and a second augmediated-reality space, implemented as an extramissive spatial imaging digital eye glass.

U.S. patent application No. 20200396431 (Stafford, Dec. 17, 2020, "Foveated Near to Eye Display System Using a Computational Freeform Lens via Spatial Light Modulation of a Laser Projected Image onto an Emissive Film") discloses a projection system wherein light is projected through a spatial light modulator that contains a phase-only image of a Freeform Fourier Lens that is a combination of a Fresnel lens, an X-phase grating, a Y-phase grating, and a radial grating. U.S. patent application No. 20200400955 (Messer et al., Dec. 24, 2020, "Eyepieces for Augmented Reality Display System") discloses an augmented reality display with an eyepiece waveguide with an input coupling grating region. U.S. patent application No. 20200408981 (Curtis et al., Dec. 31, 2020, "Display System Having a Plurality of Light Pipes for a Plurality of Light Emitters") discloses a display system with a plurality of light pipes and light sources which send light into the light pipes.

U.S. patent application No. 20210003848 (Choi et al., Jan. 7, 2021, "Electronic Device and Method for Displaying Augmented Reality") discloses an optical engine; a first polarizer, a polarization converter, a waveguide, a focus tunable lens, and a second polarizer. U.S. patent applications 20210011290 (Maimone et al., Jan. 14, 2021, "Method to Reduce Diffraction Artifacts in a Waveguide Display and Display Using the Same") and 20210215938 (Maimone et al., Jul. 15, 2021, "Method to Reduce Diffraction Artifacts in a Waveguide Display and Display Using the Same") disclose a waveguide with at least one switchable grating configured to: during a virtual-world subframe of a display frame, decouple the image light out of the waveguide via diffraction, and during a real-world subframe of the display frame, transmit a light from a real-world environment to the eyebox.

U.S. patent application No. 20210018657 (Tsai et al., Jan. 21, 2021, "Optical Module Comprising Lens Assembly") discloses a lens assembly with polymer layers, each layer with a lens portion and an extension portion and an image sensor positioned below the lens assembly. U.S. patent application No. 20210026138 (Alasaarela et al., Jan. 28, 2021, "Projection Device and Projection Method for Head Mounted Display Based on Rotary MEMS Fast Scanner") discloses a microelectromechanical system (MEMS) coupled to a microscopic mirror. U.S. patent application 20210033790 (Ward et al., Feb. 4, 2021, "MEMS-Driven Optical Package with Micro-Led Array") discloses an optical output lens, an optical filter between the output lens and LEDS, a tray of LEDs arrayed on a stage.

U.S. patent application No. 20210041704 (Bhargava et al., Feb. 11, 2021, "Eyepieces for Augmented Reality Display System") discloses a waveguide, an optically transmissive substrate, an input coupling grating, a multi-directional pupil expander, and an exit pupil expander. U.S. patent application No. 20210051315 (Shamir et al., Feb. 18, 2021, "Optical Display, Image Capturing Device and Methods with Variable Depth of Field") discloses a pixelated illumination array and a fiber bundle. U.S. patent application No. 20210055466 (Eisenfeld, Feb. 25, 2021, "Projector Configuration with Subdivided Optical Aperture for Near-Eye Displays, and Corresponding Optical Systems") discloses a system for displaying a projected image with a light-guide optical element having two major parallel surfaces and a projected image collimated to infinity.

U.S. patent application No. 20210055546 (Shin et al., Feb. 25, 2021, "Image Display Device Capable of Multi-Depth Expression") discloses an display configured to modulate light to form an image, a light transmitting unit that transmits the image formed by the display device to eyes of a viewer and with a focusing member, and a driving unit. U.S. patent application No. 20210055548 (Rao et al., Feb. 25, 2021, "Reconfigurable Optics for Multi-Plane Heads-Up Displays") discloses a display, a moveable optic, an optical element positioned between the display and the moveable optic, a lens actuator, and a display controller. U.S. patent application No. 20210055551 (Chi et al., Feb. 25, 2021, "Dispersion Compensation in Volume Bragg Grating-Based Waveguide Display") discloses a waveguide with a substrate transparent to visible light, a coupler configured to couple display light into the substrate as a guided wave in the substrate, a first VBG, and a second VBG.

U.S. patent application No. 20210055552 (Chi et al., Feb. 25, 2021, "Multiple Projector Field-Of-View Stitched Waveguide Display") discloses a waveguide display with two light projectors. U.S. patent application No. 20210055560 (Ben Tez et al., Feb. 25, 2021, "Compact Optics in Crossed Configuration for Virtual and Mixed Reality") discloses an optical system with channels which generate immersive virtual images. U.S. patent application No. 20210055561 (Danziger et al., Feb. 25, 2021. "Near-Eye Display Having Overlapping Projector Assemblies") discloses a display with at least two projectors. U.S. patent application No. 20210055563 (Bouchier et al., Feb. 25, 2021, "Methods and Systems for Augmented Reality") discloses a see-through tunable holographic mirror or tunable LCD array mirror.

U.S. patent application No. 20210055580 (Wells et al., Feb. 25, 2021, "Transparent Phase Change Actuator") discloses a transparent optical element with electroactive ceramic between transparent electrodes. U.S. patent application No. 20210063606 (Glik et al., Mar. 4, 2021, "Meta-surface Optical Coupling Elements for a Display Waveguide") discloses a waveguide display with a light-transmissive substrate and an optical coupling element configured to input light rays to the substrate or output light rays from the substrate. U.S. patent application No. 20210063733 (Ronen, Mar. 4, 2021, "Optical System Including Light-Guide Optical Element with Partially-Reflective Internal Surfaces") discloses a light-guide optical element having a pair of parallel external surfaces and a set of mutually-parallel reflector surfaces.

U.S. patent application No. 20210063774 (Wang et al., Mar. 4, 2021, "Eyeglasses") discloses eyeglasses with a rim, a temple, a control circuit or battery, and a rotating shaft connecting the rim and temple. U.S. patent application No. 20210065427 (Wade, Mar. 4, 2021, "Virtual and Augmented Reality Using Light Fields") discloses communicating light field data to a user device, wherein the light field data comprises content greater than a display field of view of the user device. U.S. patent application No. 20210066402 (Pu et al., Mar. 4, 2021, "Display Substrate, Display Panel, and Manufacturing Method of Display Substrate") discloses a display with a base substrate, a first electrode, a light-emitting functional layer, and a second electrode.

U.S. patent application No. 20210066574 (Diest et al., Mar. 4, 2021, "Structured Actuators: Shaped Electroactive Polymers") discloses an electroactive polymer layer with a non-axisymmetric shape. U.S. patent application No. 20210072821 (Von Und Zu Liechtenstein, Mar. 11, 2021, "Apparatus and Method for Rendering a Virtual Monitor on Smart Ophthalmic Devices in Augmented Reality Environments") discloses a liquid lens, an optical phased array, and a dimmable occlusion matrix. U.S. patent application No. 20210072437 (Singh et al., Mar. 11, 2021, "Display Device with Diffraction Grating Having Reduced Polarization Sensitivity") discloses diffraction gratings which incouple or outcouple light of different polarizations. U.S. patent application No. 20210072453 (Peng et al., Mar. 11, 2021, "Display with Switchable Retarder Array") discloses a waveguide, an array of tunable retarders, and a polarization selective optical element.

U.S. patent application No. 20210072541 (Kim et al., Mar. 11, 2021, "Electronic Device and Method for Controlling Electronic Device") discloses a display, a speaker, and a communication module. U.S. patent application No. 20210072559 (Wang et al., Mar. 11, 2021, "Eyeglasses") discloses an eyeglass frame and two speakers. U.S. patent application No. 20210072585 (Shipton et al., Mar. 11, 2021, "Magnetic Field Driven Liquid Crystal Patterning Control System") discloses liquid crystal patterning control systems in which liquid crystals are aligned by magnetic fields.

U.S. patent application No. 20210074067 (Kwon et al., Mar. 11, 2021, "Electronic Device for Displaying Object for Augmented Reality and Operation Method Therefor") discloses selecting an augmented reality (AR) object based on received music. U.S. patent application No. 20210080635 (Menezes et al., Mar. 18, 2021, "Waveguides Having Reflective Layers Formed by Reflective Flowable Materials") discloses a surface of a waveguide that is contacted with a reflective flowable material. U.S. patent application No. 20210080725 (Sulai et al., Mar. 18, 2021, "Display Device with Holographic Diffuser Display and See-Through Lens Assembly") discloses an optical diffuser which outputs diffused image light having a same polarization as image light.

U.S. patent application No. 20210080726 (Geng et al., Mar. 18, 2021, "Display Device with Diffusive Display and See-Through Lens Assembly") discloses a display which is configured to output diffused image light from a first surface and to transmit ambient light from a second surface to the first surface. U.S. patent application No. 20210080730 (Morrison et al., Mar. 18, 2021, "Transparent Optical Module Using Pixel Patches and Associated Lenslets") discloses a transparent optical device comprising an optical architecture hierarchy. U.S. patent application No. 20210080739 (Geng et al., Mar. 18, 2021, "Short Distance Illumination of a Spatial Light Modulator Using a Pancake Lens Assembly") discloses a light source, a spatial light modulator (SLM), a first reflective surface, and a second reflective surface that is opposite to the first reflective surface.

U.S. patent application No. 20210080763 (Sulai et al., Mar. 18, 2021, "Display Device with Switchable Diffusive Display and See-Through Lens Assembly") discloses a display having optically anisotropic molecules between a front surface and a back surface. U.S. patent application 20210080906 (Jolly et al., Mar. 18, 2021, "Near-To-Eye and See-Through Holographic Displays") discloses a holographic display with space-multiplexed elemental modulators, each of which consists of a surface acoustic wave transducer atop an anisotropic waveguide.

U.S. patent applications 20210080721 (Geng et al., Mar. 18, 2021, "Thin See-Through Pancake Lens Assembly and Display Device Including the Same") and 20210080722 (Geng et al., Mar. 18, 2021, "Curved See-Through Pancake Lens Assembly and Display Device Including the Same") disclose an optical assembly which transmits image light received at a first surface in an optical path that includes reflection at each of a reflector and a beam splitter before the image light is output from a second surface. U.S. patent applications 20210080724 (Sulai et al., Mar. 18, 2021, "Display Device with Transparent Emissive Display and See-Through Lens Assembly") and 20210080763 (Sulai et al., Mar. 18, 2021, "Display Device with Switchable Diffusive Display and See-Through Lens Assembly") disclose a display which outputs image light from a front surface and transmits ambient light from a back surface to the front surface.

U.S. patent application No. 20210088700 (Wang et al., Mar. 25, 2021, "Varifocal Polarization Sensitive Diffusive Display") discloses a variofocal display with an image source and a display. U.S. patent application No. 20210088794 (Melville, Mar. 25, 2021, "Waveguide Display with Cantilevered Light Scanner") discloses glasses with an optical scanning system that protrudes through an opening in an eyepiece. U.S. patent application No. 20210088795 (Cheng et al., Mar. 25, 2021, "Wide Angle and High Resolution Tiled Head-Mounted Display Device") discloses a tiled head-mounted display with a plurality of prisms with free-form surfaces. U.S. patent application No. 20210089129 (Osterhout et al., Mar. 25, 2021, "See-Through Computer Display Systems") discloses designs for see-through computer displays. U.S. Pat. No. 10,962,783 (Wilson et al., Mar. 30, 2021, "Electronic Devices Having Electrically Adjustable Optical Layers") discloses an electrically-adjustable optical layer.

U.S. patent application No. 20210096380 (Osmanis et al., Apr. 1, 2021, "Near-Eye Display Apparatus and Method of Displaying Three-Dimensional Images") discloses projecting pairs of images associated with different cross-sectional planes of a three-dimensional image. U.S. patent application No. 20210096391 (Ma et al., Apr. 1, 2021, "Holographic Display, Holographic Display Device and Display Method Thereof") discloses a holographic display with a central display area and at least one annular tiled display area around the central display area. U.S. patent application 20210096453 (Wheelwright et al., Apr. 1, 2021, "Optical Assemblies Having Polarization Volume Gratings for Projecting Augmented Reality Content") discloses a display with an optical waveguide, a reflective optical element, and an in-coupler.

U.S. patent application No. 20210103145 (You et al., Apr. 8, 2021, "Augmented Reality Device Including Flat Combiner and Electronic Device Including the Same") discloses a light source, a display comprising a plurality of pixels, and an optical combiner. U.S. patent application 20210103180 (Sears et al., Apr. 8, 2021, "Photochromic Optical Element") discloses an optical element with a first boundary layer, a second boundary layer, and liquid crystals co-mingled with oblong photochromic dye molecules. U.S. patent application No. 20210103182 (Tan et al., Apr. 8, 2021, "Display Apparatus and Driving Method Thereof") discloses display panels which are substantially parallel to each other and spaced apart from each other along a depth direction.

U.S. patent application No. 20210109278 (Peroz et al., Apr. 15, 2021, "Waveguides Having Integrated Spacers, Waveguides Having Edge Absorbers, and Methods for Making the Same") discloses a near-eye display comprising a stack of waveguides having integral spacers separating the waveguides. U.S. patent application No. 20210109352 (Lee et al., Apr. 15, 2021, "See-Through Type Display Device and Glasses Type Augmented Reality Device Including the Same") discloses a see-through display with a light coupling lens with an aspherical surface. U.S. patent application 20210109433 (Trisnadi et al., Apr. 15, 2021, "Low-Profile Beam Splitter") discloses an optical device having a first surface, a second surface normal to the first surface, and a third surface at an angle to the second surface.

U.S. patent application No. 20210112647 (Coleman, Apr. 15, 2021, "Angularly Varying Light Emitting Device with an Imager") discloses an angularly varying light emitting device (AVLED). U.S. patent application No. 20210191125 (Li et al., Jun. 24, 2021, "Display with Holographic Relay and Holographic Image Combiner") discloses a device with an image source, a holographic relay, and a holographic image combiner in an off-axis configuration. U.S. Pat. No. 11,086,143 (Gill et al., Aug. 10, 2021. "Tunable and Foveated Lens Systems") discloses eyeglasses with adjustable lenses that align with a user's eye. U.S. patent application No. 20210255490 (Parsons et al., Aug. 19, 2021, "Resonant Liquid Crystal Devices") discloses a tunable liquid crystal device with a liquid crystal layer between a pair of reflectors.

U.S. Pat. No. 11,215,829 (Topliss et al., Jan. 4, 2022, "Display Device with a Holographic Combiner") discloses an augmented reality headset with a reflective holographic combiner which directs light from a light engine into a user's eye while also transmitting light from the environment. U.S. patent application No. 20220006987 (Seiler et al., Jan. 6, 2022, "Multi-Projector Display Architecture") discloses a headset display with multiple projector integrated circuits each coupled to a central processor. U.S. patent application No. 20220043323 (Skirlo et al., Feb. 10, 2022, "Methods and Systems for Optical Beam Steering") discloses an optical beam steering device with a planar dielectric lens that collimates beams from different inputs in different directions. U.S. patent application No. 20230014448 (Morin et al., Jan. 19, 2023, "Methods for Handling Occlusion in Augmented Reality Applications Using Memory and Device Tracking and Related Apparatus") discloses devices which handle optical occlusion in augmented reality.

U.S. patent application No. 20230288707 (Guan, Sep. 14, 2023, "Near-To-Eye Display Device") discloses eyewear with an electronic display and a collimating device with a microlens array. U.S. patent application No. 20230333358 (Ha, Oct. 19, 2023, "Optical Device for Augmented Reality Having Optical Structure Arranged in Straight Line and Method for Manufacturing Optical Means") discloses an optical device for augmented reality having an optical structure which is arranged in a straight line. U.S. patent application No. 20230360567 (Yang, Nov. 9, 2023, "Virtual Reality Display System") discloses a near-eye display device with a camera to track the location of an eye pupil, a projection light source to provide a collimated beam, and a micromirror array with adjustable micromirror pixels.

U.S. patent application No. 20230367073 (Landig et al., Nov. 16, 2023, "Waveguide with Tunable Bulk Reflectors") discloses a waveguide, an input coupler for propagating image light along a zigzag light path, and a plurality of slanted bulk mirrors along the light path. U.S. patent application 20230367123 (Amirsolaimani, Nov. 16, 2023, "Field of View Expansion by Image Light Redirection") discloses a beam redirector which is downstream of a lightguide for controllably redirecting the image light in coordination with displaying different field of view portions by an image projector. U.S. patent application No. 20230367128 (Ha, Nov. 16, 2023, "Compact Optical Device for Augmented Reality Having Straightly-Arranged Optical Structure, and Method for Manufacturing Optical Means") discloses a compact optical device with an optical means to transmit at least part of real object image light therethrough toward the pupil of a user's eye, a first reflective means, and a second reflective means with a plurality of reflective units.

U.S. patent application No. 20230368477 (Moskalev, Nov. 16, 2023, "Augmented and Mixed Reality Screen") discloses reusing image rays incoupled into a waveguide from projectors from different directions around the perimeter of an outcoupling diffractive element. U.S. patent application No. 20230393309 (Rao et al., Dec. 7, 2023, "Fresnel Lens with Organic Solid Crystals") discloses a Fresnel lens with a lens body having a structured surface with a plurality of facets, wherein the lens body includes an organic solid crystal having mutually-orthogonal refractive indices. U.S. patent application No. 20230400690 (Marsh et al., Dec. 14, 2023, "Mixed Reality Eyewear with Deformable Beam Combiner") discloses eyewear with a frame, a lens, a display panel which renders an image not aligned with an eye of the wearer, and a deformable beam combiner.

U.S. patent application No. 20230400748 (Valentine et al., Dec. 14, 2023, "Display System with Tunable Wavelength Conversion in a Nanophotonic Periodically Poled Lithium Niobate Waveguide") discloses a tunable light source with a periodically-poled lithium niobate waveguide and a control mechanism. U.S. patent application No. 20230408826 (Oh et al., Dec. 21, 2023, "Near-Eye Display Architectures") discloses kaleidoscopic waveguide display architectures, geometrical waveguide displays with improved pupil replication density, liquid crystal displays with improved brightness uniformity, tiled display panels for field of view expansion, and display modules including over-molded frame with integrated heat sink fins. U.S. Pat. No. 11,885,968 (Hua et al., Jan. 30, 2024, "Pupil Matched Occlusion-Capable Optical See-Through Head-Mounted Display") discloses see-through head mounted displays with a double-wrapped path which can render per-pixel mutual occlusion.

SUMMARY OF THE INVENTION

This invention is an optical structure for use in augmented reality eyewear which enables display of a relatively-opaque virtual object in an area of a person's field of view, while providing the person with a relatively-clear view of their environment in the rest of the person's field of view. This is accomplished by a selectively-reflective component comprising a plurality of movable reflective elements (e.g. micromirrors). These reflective elements have first configurations which allow transmission of environmental light. These reflective elements have second configurations which block (or reduce) transmission of environmental light and which reflect light from a virtual-object display toward a person's eye.

In an example, reflective elements (e.g. micromirrors) are rotated or pivoted from their first configurations to their second configurations by transmission of electrical energy through an adjacent plurality of transparent or translucent electroconductive pathways (e.g. microwires). In an example, transmission of electrical energy through the electroconductive pathways creates an electromagnetic field which rotates or pivots the reflective elements. In an example, a selected subset of reflective elements can be rotated or pivoted from their first configurations to their second configurations, while the rest of the reflective elements remain in their first configurations. This enables display of a relatively-opaque virtual object in an area of a person's field of view, while providing the person with a relatively-clear view of their environment in the rest of the person's field of view.

BRIEF INTRODUCTION TO THE FIGURES

FIG. 1 shows this structure when all reflective elements are in a first configuration which allows the transmission of environmental light.

FIG. 2 shows this structure when all reflective elements are in a second configuration which blocks environmental light and reflects light from the virtual-object display toward a person's eye.

FIG. 3 shows this structure when only a subset of reflective elements are in a second configuration which blocks environmental light and reflects light from the virtual-object display toward a person's eye.

FIG. 4 shows this structure when all reflective elements are in a first configuration which allows the transmission of environmental light.

FIG. 5 shows this structure when all reflective elements are in a second configuration which blocks environmental light and reflects light from the virtual-object display toward a person's eye.

FIG. 6 shows this structure when only a subset of reflective elements are in a second configuration which blocks environmental light and reflects light from the virtual-object display toward a person's eye.

FIG. 26 shows this structure when all reflective elements are in a first configuration which allows the transmission of environmental light.

FIG. 27 shows this structure when all reflective elements are in a second configuration which blocks environmental light and reflects light from the virtual-object display toward a person's eye.

FIG. 28 shows this structure when only a subset of reflective elements are in a second configuration which blocks environmental light and reflects light from the virtual-object display toward a person's eye.

FIG. 29 shows this structure when all reflective elements are in a first configuration which allows the transmission of environmental light.

FIG. 30 shows this structure when all reflective elements are in a second configuration which blocks environmental light and reflects light from the virtual-object display toward a person's eye.

FIG. 31 shows this structure when only a subset of reflective elements are in a second configuration which blocks environmental light and reflects light from the virtual-object display toward a person's eye.

FIG. 32 shows this structure when all reflective elements are in a first configuration which allows the transmission of environmental light.

FIG. 33 shows this structure when all reflective elements are in a second configuration which blocks environmental light and reflects light from the virtual-object display toward a person's eye.

FIG. 33 shows this structure when only a subset of reflective elements are in a second configuration which blocks environmental light and reflects light from the virtual-object display toward a person's eye.

DETAILED DESCRIPTION OF THE FIGURES

Figure 1:
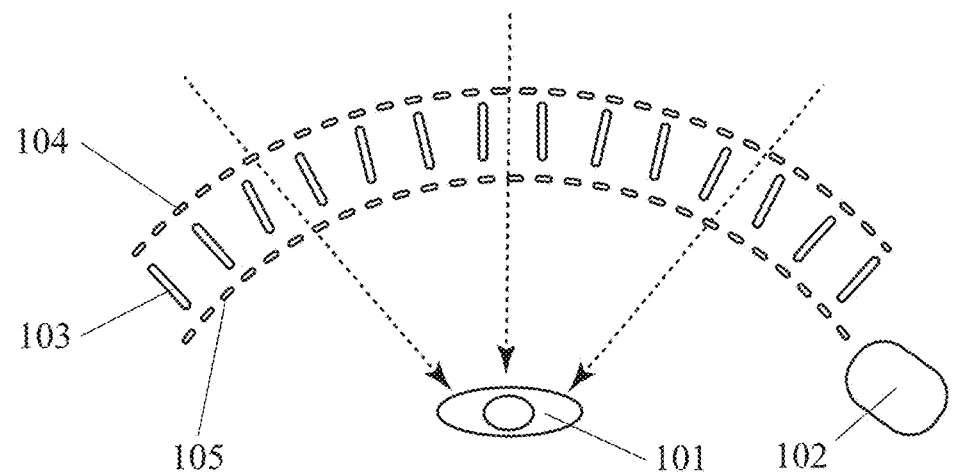
FIGS. 1 through 3 show an optical structure with two electroconductive layers, a selectively-transparent layer comprising reflective elements, and a virtual-object display.

In an example, an optical structure for use in augmented reality eyewear can comprise: an electroconductive component which further comprises a plurality of transparent or translucent electroconductive pathways; a selectively-reflective component which further comprises a plurality of movable reflective elements, wherein a selected subset of reflective elements can be moved from a first configuration to a second configuration, wherein the first configuration allows a first amount of light from the environment to pass through a selected area of the selectively-reflective component, wherein the second configuration allows a second amount of light from the environment to pass through the selected area of the selectively-reflective component, wherein the second amount is less than the first amount, and wherein the selected subset of individual reflective elements is moved from the first configuration to the second configuration by transmission of electrical energy through the electroconductive component; and a virtual-object display, wherein reflective elements in the first configuration reflect from the selected area a first amount of light from the virtual-object display toward the person's eye, wherein reflective elements in the second configuration reflect from the selected area a second amount of light from the virtual-object display toward the person's eye, wherein the second amount is greater than the first amount, and wherein reflection of light from the virtual-object display causes a virtual object to be displayed in the person's field of view.

In an example, the transparent or translucent electroconductive pathways can be wires. In an example, the plurality of transparent or translucent electroconductive pathways can be an orthogonal grid, mesh, or array of electroconductive pathways. In an example, the plurality of transparent or translucent electroconductive pathways can be a polar, hub-and-spoke, and/or radial grid, mesh, or array of electroconductive pathways. In an example, the electroconductive component can be distal to the selectively-reflective component. In an example, transmission of electrical energy through the electroconductive component can create or modify an electromagnetic field which moves one or more reflective elements from first configurations to second configurations. In an example, the reflective elements can be mirrors. In an example, the reflective elements can be rotated and/or pivoted from first configurations to second configurations.

In an example, a longitudinal axis of a reflective element in the first configuration can be parallel to a vector spanning from the reflective element to the person's eye. In an example, a longitudinal axis of a reflective element in the second configuration can be orthogonal to a third vector which bisects an angle between a first vector spanning from the reflective element to the person's eye and a second vector spanning from the reflective element to the virtual-object display. In an example, reflective elements in the second configurations can collectively comprise a portion of a Fresnel reflector. In an example, reflective elements in front of a person's right eye can collectively comprise a portion of the left side of a Fresnel reflector and reflective elements in front of a person's left eye can collectively comprise a portion of the right side of a Fresnel reflector.

In an example, an optical structure for use in augmented reality can comprise: a virtual-object display; a beam splitter; and an array of movable reflective elements, wherein reflective elements in the array each have a first configuration in which they allow transmission of environment light to a person's eye, wherein reflective elements in the array each have a second configuration in which they block or reduce transmission of environment light to the person's eye, wherein light from the virtual-object display is reflected by the beam splitter in a distal direction toward the array of rotatable reflective elements, wherein reflective elements in the array in their second configurations reflect the light in a proximal direction to the person's eye, and wherein a selected subset of reflective elements in a selected area of the person's field of view are moved from first configurations to second configurations in order to display a virtual object in that area of the person's field of view. In an example, reflective elements can be mirrors. In an example, reflective elements can be rotated and/or pivoted from first configurations to second configurations.

In an example, an optical structure for use in augmented reality eyewear can comprise: an electroconductive component which further comprises a plurality of transparent or translucent electroconductive pathways; a selectively-reflective component which further comprises a plurality of reflective elements, wherein a selected subset of reflective elements can be moved from a first configuration to a second configuration, wherein the first configuration allows a first amount of light from the environment to pass through a selected area of the selectively-reflective component, wherein the second configuration allows a second amount of light from the environment to pass through the selected area of the selectively-reflective component, wherein the second amount is less than the first amount, and wherein the selected subset of individual reflective elements is moved from the first configuration to the second configuration by transmission of electrical energy through the electroconductive component; a virtual-object display; a waveguide; and an optical coupler which directs light from the virtual-object display into the waveguide. In an example, the transparent or translucent electroconductive pathways can be wires. In an example, transmission of electrical energy through the electroconductive component can create or modify an electromagnetic field which moves one or more reflective elements from first configurations to second configurations. In an example, the reflective elements can be mirrors. In an example, the reflective elements can be rotated and/or pivoted from first configurations to second configurations.

Figure 2:
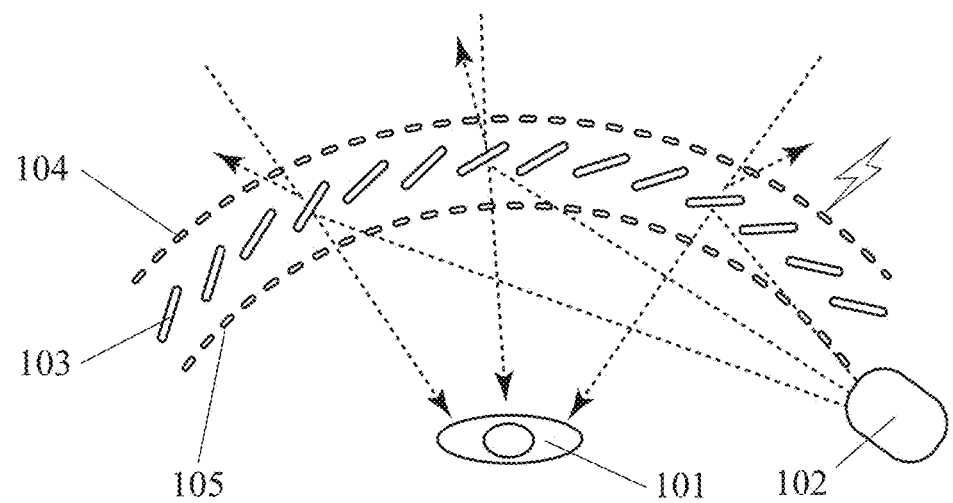
Figure 3:
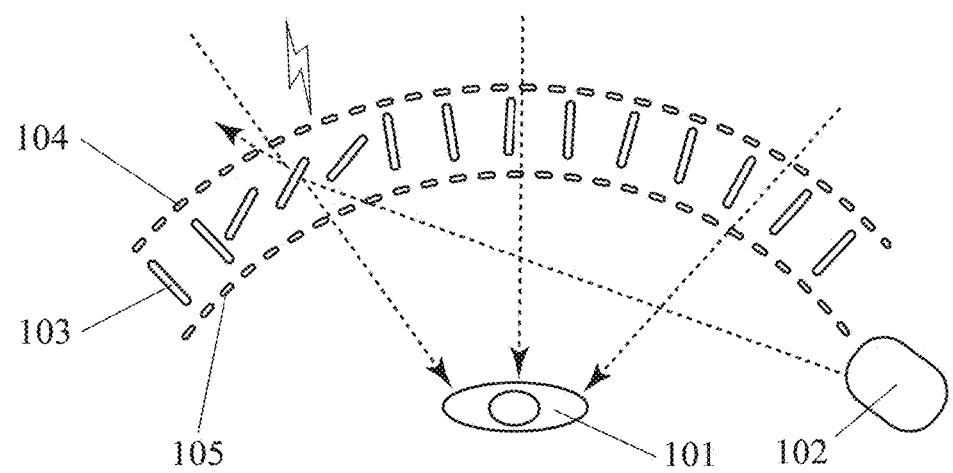

FIGS. 1 through 3 show three (top-down, cross-sectional) views, at three different times, of an optical structure for use in augmented reality (and/or mixed reality) eyewear comprising: a proximal electroconductive component (or layer) 105 which is a first average distance from a person's eye 101, wherein the proximal electroconductive component further comprises a plurality of electroconductive pathways (e.g. microwires), and wherein the proximal electroconductive component is substantially-transparent (e.g. transparent or translucent); a distal electroconductive component (or layer) 104 which is a second average distance from the person's eye, wherein the proximal electroconductive component further comprises a plurality (e.g. array, grid, mesh, or matrix) of electroconductive pathways (e.g. microwires), wherein the proximal electroconductive component is substantially-transparent (e.g. transparent or translucent), and wherein the second distance is greater than the first distance; a selectively-reflective component (or layer) 103 which is between the proximal electroconductive component and the distal electroconductive component, wherein the selectively-reflective component further comprises a plurality (e.g. array, grid, mesh, or matrix) of reflective elements (e.g. micromirrors), wherein a selected subset of individual reflective elements (e.g. micromirrors) can be moved (e.g. rotated or pivoted) between a first configuration and a second configuration, wherein the first configuration allows a first amount of light from the environment to pass through a selected area of the selectively-reflective component, wherein the second configuration allows a second amount of light from the environment to pass through the selected area of the selectively-reflective component, wherein the second amount is less than the first amount, and wherein individual reflective elements (e.g. micromirrors) are moved (e.g. rotated or pivoted) between the first configuration and the second configuration by the transmission of electrical energy through the proximal electroconductive component and/or the distal electroconductive component; and a virtual-object display 102, wherein individual reflective elements (e.g. micromirrors) in the first configuration reflect from the selected area a first amount of light from the virtual-object display toward the person's eye, wherein individual reflective elements (e.g. micromirrors) in the second configuration reflect from the selected area a second amount of light from the virtual-object display toward the person's eye, wherein the second amount is greater than the first amount, and wherein reflection of light from the virtual-object display causes a virtual object to be displayed in this area in the person's field of view.

FIG. 1 shows this structure at a first time when all of the reflective elements (e.g. micromirrors) are in their first configurations, thereby allowing the greatest amount of light from the environment to pass through the selectively-reflective component (or layer) to the person's eye and reflecting the least amount of light from the display toward the person's eye.

FIG. 2 shows this structure at a second time when all of the reflective elements (e.g. micromirrors) are in their second configurations, thereby allowing less light from the environment to pass through the selectively-reflective component (or layer) to the person's eye and reflecting more light from the display toward the person's eye. In an example, the reflective elements can collectively comprise (a portion of) a Fresnel reflector when they are all in their second configurations.

FIG. 3 shows this structure at a third time when a selected subset (three, in this example) of the reflective elements (e.g. micromirrors) are in their second configurations and the rest of the reflective elements (e.g. micromirrors) are in their first configurations. This enables a virtual object to be displayed in a selected area of the person's field of view and transmission of light from the environment to be blocked (or reduced) through this selected area, thereby making a virtual object displayed in this area to be more opaque and enabling black portions in the virtual object.

The optical structure for use in augmented reality (and/or mixed reality) eyewear which is shown in FIGS. 1 through 3 can also be described as comprising: a proximal electroconductive component (or layer) which is a first average distance from a person's eye, wherein the proximal electroconductive component further comprises a plurality of electroconductive pathways (e.g. microwires), and wherein the proximal electroconductive component is substantially-transparent; a distal electroconductive component (or layer) which is a second average distance from the person's eye, wherein the proximal electroconductive component further comprises a plurality of electroconductive pathways (e.g. microwires), wherein the proximal electroconductive component is substantially-transparent, and wherein the second distance is greater than the first distance; a selectively-reflective component (or layer) which is between the proximal electroconductive component and the distal electroconductive component, wherein the selectively-reflective component further comprises a plurality of reflective elements (e.g. micromirrors), wherein a selected subset of individual reflective elements (e.g. micromirrors) can be rotated between a first configuration and a second configuration, wherein a longitudinal axis of a reflective element is substantially-parallel to a radial vector extending out from the person's eye in the first configuration, wherein the longitudinal axis of a reflective element is not parallel to the radial vector in the second configuration, and wherein a selected subset of individual reflective elements (e.g. micromirrors) can be rotated between the first configuration and the second configuration by transmission of electrical energy through the proximal electroconductive component and/or the distal electroconductive component; and a virtual-object display, wherein individual reflective elements (e.g. micromirrors) in the first configuration reflect from the selected area a first amount of light from the virtual-object display toward the person's eye, wherein individual reflective elements (e.g. micromirrors) in the second configuration reflect from the selected area a second amount of light from the virtual-object display toward the person's eye, wherein the second amount is greater than the first amount, and wherein reflection of light from the virtual-object display causes a virtual object to be displayed in the person's field of view.

The optical structure for use in augmented reality (and/or mixed reality) eyewear which is shown in FIGS. 1 through 3 can also be described as comprising: a multi-layer optical structure which is configured to be placed in front of a person's eye, wherein the optical structure further comprises—(a) a proximal layer (e.g. closer to the eye) comprising a first plurality of transparent or translucent electroconductive pathways (e.g. microwires), (b) a distal layer (e.g. farther from the eye) comprising a second plurality of transparent or translucent electroconductive pathways (e.g. microwires), and (c) a middle layer between the proximal and distal layers comprising a plurality of reflective elements (e.g. micromirrors), wherein a selected subset of individual reflective elements (e.g. micromirrors) can be rotated between a first configuration and a second configuration, wherein a longitudinal axis of a reflective element is substantially-parallel to a radial vector extending out from the person's eye in the first configuration, wherein the longitudinal axis of a reflective element is not parallel to the radial vector in the second configuration, and wherein a selected subset of individual reflective elements (e.g. micromirrors) can be rotated between the first configuration and the second configuration by transmission of electrical energy through the proximal layer and/or the distal layer; and a virtual-object display, wherein individual reflective elements (e.g. micromirrors) in the first configuration reflect from the selected area a first amount of light from the virtual-object display toward the person's eye, wherein individual reflective elements (e.g. micromirrors) in the second configuration reflect from the selected area a second amount of light from the virtual-object display toward the person's eye, wherein the second amount is greater than the first amount, and wherein reflection of light from the virtual-object display causes a virtual object to be displayed in the person's field of view.

In a variation on the optical structure for use in augmented reality (and/or mixed reality) eyewear shown in FIGS. 1 through 3, an optical structure may not require two electroconductive components (e.g. layers) to rotate a selected subset of individual reflective elements. In an alternative example, an optical structure may require only one electroconductive component (or layer). In this alternative example, an optical structure for use in augmented reality (and/or mixed reality) eyewear can comprise: a substantially-transparent (e.g. transparent or translucent) electroconductive component (or layer) which further comprises a plurality of electroconductive pathways (e.g. microwires); a selectively-reflective component (or layer) which is adjacent to (e.g. parallel with) the electroconductive component, wherein the selectively-reflective component further comprises a plurality of reflective elements (e.g. micromirrors), wherein a selected subset individual reflective elements (e.g. micromirrors) can be rotated between a first configuration and a second configuration, wherein the first configuration allows a first amount of light from the environment to pass through a selected area of the selectively-reflective component, wherein the second configuration allows a second amount of light from the environment to pass through the selected area of the selectively-reflective component, wherein the second amount is less than the first amount, and wherein a selected subset of individual reflective elements (e.g. micromirrors) can be rotated between the first configuration and the second configuration by transmission of electrical energy through the electroconductive component; and a virtual-object display, wherein individual reflective elements (e.g. micromirrors) in the first configuration reflect from the selected area a first amount of light from the virtual-object display toward the person's eye, wherein individual reflective elements (e.g. micromirrors) in the second configuration reflect from the selected area a second amount of light from the virtual-object display toward the person's eye, wherein the second amount is greater than the first amount, and wherein reflection of light from the virtual-object display causes a virtual object to be displayed in the person's field of view.

In an example, a proximal or distal electroconductive component (or layer) can comprise an array (e.g. array, grid, mesh, or matrix) of transparent conductive oxide pathways. In an example, a proximal or distal electroconductive component (or layer) can comprise an array (e.g. array, grid, mesh, or matrix) of transparent or translucent electroconductive microwires. In an example, a proximal or distal electroconductive component (or layer) can comprise an array (e.g. array, grid, mesh, or matrix) of conductive liquid pathways. In an example, a proximal or distal electroconductive component (or layer) can comprise an array (e.g. array, grid, mesh, or matrix) of conductive (elastomeric) polymer pathways. In an example, a proximal or distal electroconductive component (or layer) can comprise an array (e.g. array, grid, mesh, or matrix) of electroconductive pathways made from an (elastomeric) polymer which has been embedded, impregnated, or coated with conductive particles.

In an example, a proximal or distal electroconductive component (or layer) can comprise a latitude and longitude array, grid, mesh, or matrix of substantially-transparent (e.g. transparent or translucent) electroconductive pathways (e.g. microwires), wherein transmission of electrical energy through a selected latitude pathway and a selected longitude pathway creates an electromagnetic field at the intersection of those pathways (e.g. microwires), which in turn rotates and/or pivots a reflective element near (e.g. adjacent to) that intersection. In an example, transmission of electrical energy through a selected subset of electroconductive pathways (e.g. microwires) can rotate two or more reflective elements (e.g. micromirrors) from their first configurations to their second configurations (or vice versa).

In an example, transmission of electrical energy through a proximal or distal electroconductive component can create a localized electromagnetic field which rotates one or more nearby (e.g. adjacent) reflective elements (e.g. micromirrors). In an example, a proximal or distal electroconductive component (or layer) can comprise a radial (e.g. hub and spoke) or polar array, grid, mesh, or matrix of substantially-transparent (e.g. transparent or translucent) electroconductive pathways (e.g. microwires). In an example, inter-pathway distances in a proximal or distal electroconductive component can be between 50% and 150% of the widths of adjacent reflective elements (e.g. micromirrors). In an example, the terms "near" or "adjacent" as used herein can be defined as being closer than the distance spanned by the maximum perimeter dimension (e.g. length) of a reflective element.

In an example, a proximal or distal electroconductive component can have a shape which is a section of a sphere or ellipsoid. In an example, a proximal or distal electroconductive component can have a conic section shape. In an example, a proximal or distal electroconductive component can have a concave shape with a proximal-facing opening. In an example, a proximal or distal electroconductive component can be planar. In an example, a proximal or distal electroconductive component can be arcuate. In an example, the distal envelope and/or surface of a proximal or distal electroconductive component can be a section of a sphere or ellipsoid.

In an example, a proximal or distal electroconductive component (or layer) can comprise an orthogonal (e.g. row and column) array, grid, mesh, or matrix of substantially-transparent (e.g. transparent or translucent) electroconductive pathways (e.g. microwires), wherein pathways (e.g. microwires) which are closer to the center of the person's field of view are more densely-distributed than pathways (e.g. microwires) which are farther from this center. In an example, inter-pathway distances in a proximal or distal electroconductive component can be between 80% and 120% of the lengths of adjacent reflective elements (e.g. micromirrors). In an example, inter-pathway distances in a proximal or distal electroconductive component can be equal to the lengths of reflective elements (e.g. micromirrors). In an example, openings (or gaps) between pathways in a proximal or distal electroconductive component can be between 80% and 120% of the lengths of reflective elements (e.g. micromirrors).

In an example, transmission of electrical energy through a selected subset of electroconductive pathways (e.g. microwires) can move (e.g. rotate or pivot) a subset of reflective elements (e.g. micromirrors) from their first configurations to their second configurations (or vice versa), wherein this subset of reflective elements collectively comprises a polygonal-shaped (e.g. quadrilateral) area. In an example, transmission of electrical energy through a selected subset of electroconductive pathways (e.g. microwires) can move (e.g. rotate and/or pivot) a subset of reflective elements (e.g. micromirrors) from their first configurations to their second configurations (or vice versa), wherein the subset of reflective elements collectively comprises an area with an irregularly-shaped perimeter.

In an example, transmission of electrical energy through a selected subset of electroconductive pathways (e.g. microwires) can move (e.g. rotate and/or pivot) a subset of reflective elements (e.g. micromirrors) from their first configurations to their second configurations (or vice versa), wherein the subset of reflective elements collectively comprises an area with a perimeter which matches (and aligns with) the perimeter of a displayed virtual object. In an example, a proximal or distal electroconductive component can be a layer of an optical structure. In an example, inter-pathway distances in a proximal or distal electroconductive component can be between 50% and 150% of the lengths of reflective elements (e.g. micromirrors).

In an example, proximal and distal electroconductive components can conduct different electrical charges and/or create different electromagnetic poles. In an example, proximal and distal electroconductive components can conduct different electrical charges and/or create different electromagnetic poles, wherein transmission of electrical energy through a selected subset of conductive pathways (e.g. microwires) in them causes a selected subset of reflective elements to rotate into alignment with an electromagnetic field generated by these different electrical charges and/or magnetic poles. In an example, proximal and distal electroconductive components (e.g. layers) can be substantially equidistant (e.g. parallel) relative to each other.

In an example, a proximal or distal electroconductive component (or layer) can comprise a latitude and longitude array, grid, mesh, or matrix of substantially-transparent (e.g. transparent or translucent) electroconductive pathways (e.g. microwires). In an example, a proximal or distal electroconductive component (or layer) can comprise a honeycomb (e.g. hexagonal element) array, grid, mesh, or matrix of substantially-transparent (e.g. transparent or translucent) electroconductive pathways (e.g. microwires). In an example, inter-pathway distances in a proximal or distal electroconductive component can be equal to the lengths of adjacent reflective elements (e.g. micromirrors). In an example, the distance between proximal and distal electroconductive components (e.g. layers) can vary (e.g. decrease) with distance from the virtual-image display.

In an example, a proximal or distal electroconductive component (or layer) can comprise an orthogonal array, grid, mesh, or matrix of substantially-transparent (e.g. transparent or translucent) electroconductive pathways (e.g. microwires), wherein pathways (e.g. microwires) which are closer to the center of the person's field of view are closer together (e.g. denser) than pathways (e.g. microwires) which are farther from this center. In an example, transmission of electrical energy through a selected subset of electroconductive pathways (e.g. microwires) can rotate a single reflective element (e.g. micromirror) from its first configuration to its second configuration (or vice versa). In an example, the distance between proximal and distal electroconductive components (e.g. layers) can vary (e.g. decrease) with distance from the center of the electroconductive components.

In an example, a proximal or distal electroconductive component (or layer) can comprise an orthogonal array, grid, mesh, or matrix of substantially-transparent (e.g. transparent or translucent) electroconductive pathways (e.g. microwires). In an example, transmission of electrical energy through intersecting electroconductive pathways (e.g. microwires) causes one or more reflective elements (e.g. micromirrors) near (e.g. adjacent to) the intersection of these pathways (e.g. microwires) to move (e.g. rotate and/or pivot) between their first and second configurations.

In an example, a proximal or distal electroconductive component (or layer) can comprise an orthogonal (e.g. row and column) array, grid, mesh, or matrix of substantially-transparent (e.g. transparent or translucent) electroconductive pathways (e.g. microwires), wherein transmission of electrical energy through a selected row and a selected column creates an electromagnetic field at the intersection of that row and column which, in turn, rotates a reflective element near (e.g. adjacent to) that intersection. In an example, the distance between proximal and distal electroconductive components (e.g. layers) can vary (e.g. increase) with distance from the center of the electroconductive components.

In an example, a proximal or distal electroconductive component (or layer) can comprise an orthogonal array, grid, mesh, or matrix of substantially-transparent (e.g. transparent or translucent) electroconductive pathways (e.g. microwires), wherein pathways (e.g. microwires) which are closer to the center of the array are closer together (e.g. denser) than pathways (e.g. microwires) which are farther from this center. In an example, a proximal or distal electroconductive component (or layer) can be substantially-parallel to a selectively-reflective component (or layer). In an example, the distance between proximal and distal electroconductive components (e.g. layers) can vary (e.g. increase) with distance from the virtual-image display.

In an example, electroconductive pathways (e.g. microwires) which are closer to the center of a optical structure can be narrower than pathways which are farther from this center. In an example, electroconductive pathways (e.g. microwires) which are closer to the center of a person's field of view can be narrower than pathways which are farther from this center. In an example, an optical structure can be incorporated into an eyewear lens. In an example, an optical structure can be separate from, but coaxial with, an eyewear lens.

In an example, a selectively-reflective component can comprise an arcuate array of individual reflective elements. In an example, individual reflective elements can be mirrors (e.g. micromirrors). In an example, these reflective elements (e.g. micromirrors) can be individually and independently changed (e.g. rotated and/or pivoted) from first configurations to second configurations, or vice versa. In an example, a selected subset of these reflective elements can be changed (e.g. rotated and/or pivoted) from first configurations to second configurations, while the rest of the reflective elements remain in their first configurations.

In an example, a selected subset of reflective elements (e.g. micromirrors) can collectively align with the location and shape of a virtual object displayed in a person's field of view. In an example, the combined location and perimeter of a selected subset of reflective elements can align with the location and perimeter of a virtual object which is displayed in a person's field of view. In an example, different subsets of reflective elements can be moved (e.g. rotated or pivoted) to their second configurations corresponding to the display of virtual objects in different areas of a person's field of view. In an example, subsets of reflective elements with different locations and perimeter shapes can be selected to match virtual objects with different locations and perimeter shapes.

In an example, a subset of individual reflective elements (e.g. micromirrors) can be selected and moved (e.g. rotated or pivoted) to display relatively-opaque virtual objects in a person's field of view by reflecting light rays from a virtual-object display to the person's eye and to selectively block (or reduce) environmental light rays from reaching the person's eye in the area where the virtual object is displayed. In an example, environmental light can be reflected away from a person's eye by the distal side of a reflective element when that element is in its second configuration.

In an example, a reflective element can be rotated or pivoted by an acute angle between its first configuration and its second configuration. In an example, a reflective element can pivot around an axle or joints. In an example, a reflective element can be responsive to an electromagnetic field, wherein it rotates and/or pivots when exposed to the creation (or modification) of an electromagnetic field. In an example, the angles by which reflective elements are rotated or pivoted from their first configurations to their second configurations can vary with increased distance from a virtual-object display. In an example, the angles by which reflective elements are rotated or pivoted from their first configurations to their second configurations can decrease with increased distance from a virtual-object display. In an example, an optical structure can further comprise an array of joints around which individual reflective elements (e.g. micromirrors) rotate and/or pivot.

In an example, both sides of a reflective element can reflect light. In an example, a reflective element can be transflective. In an example, a reflective element in its first configuration allows light from the environment to pass through a selected area of the selectively-reflective component and the reflective element in its second configuration blocks (or reduces) light transmission of light from the environment through this selected area. In an example, this area can be the space through which a reflective element passes as it rotates and/or pivots between its first and second configurations.

In an example, a selectively-reflective component can comprise an array, grid, mesh, or matrix of individual reflective elements (e.g. micromirrors). In an example, individual reflective elements can have flat reflective sides. In an example, one side of a reflective element can be more reflective than the other side. In an example, a proximal side of a reflective element can be more reflective than a distal side of the reflective element. In an example, individual reflective elements can have curved reflective sides. In an example, a reflective element can be magnetic. In an example, individual reflective elements can align with the application of an electromagnetic field.

In an example, individual reflective elements which are closer to the center of a selectively-reflective component can be closer together than elements which are farther from this center. In an example, reflective elements (e.g. micromirrors) can overlap each other in their second configurations. In an example, reflective elements can be rotated around their centroids. In an example, a reflective element can be magnetic, wherein it rotates or pivots to become aligned with an electromagnetic field which is created by transmission of electrical energy through proximal and/or distal electroconductive components. In an example, the angles by which reflective elements are rotated from their first configurations to their second configurations can be a quadratic function of their distance from a virtual-object display.

In an example, individual reflective elements which are closer to the center of a selectively-reflective component can be smaller than elements which are farther from this center. In an example, individual reflective elements which are farther from the center of the selectively-reflective component can be farther apart than elements which are closer to this center. In an example, a selected subset of reflective elements can be changed from their first configurations to their second configurations in order to block the transmission of environmental light through a selected area of a selectively-reflective component which they collectively span.

In an example, a selected subset of reflective elements can be changed from their first configurations to their second configurations, thereby blocking the transmission of environmental light through an area of a selectively-reflective component which they collectively span, wherein the location and perimeter of this area corresponds to the location and perimeter of a virtual object which is displayed in a person's field of view. In an example, individual reflective elements which are father from the center of a selectively-reflective component can be larger than elements which are closer to this center. In an example, (the perimeter of) a selectively-reflective component can have a conic section shape.

In an example, a reflective element can reflect a portion (e.g. one or more pixels) of a virtual object from the virtual-object display to the person's eye when the element is in its second configuration. In an example, reflective elements can be suspended in a fluid (e.g. liquid). In an example, (the perimeter of) a selectively-reflective component can have an arcuate shape. In an example, reflective elements can be rotated around their central axes. In an example, (the perimeter of) a selectively-reflective component can have a shape which is a section of a sphere or ellipsoid.

In an example, a reflective element in its first configuration allows a first amount of light from the environment to pass through a selected area of the selectively-reflective component and the reflective element in its second configuration allows a second amount of light from the environment to pass through the selected area of the selectively-reflective component, wherein the second amount is less than the first amount. In an example, a reflective element in its first configuration allows a first amount of light from the environment to pass through a selected area of the selectively-reflective component and the reflective element in its second configuration allows a second amount of light from the environment to pass through the selected area of the selectively-reflective component, wherein the second amount is less than half of the first amount.

In an example, a reflective element can be pivoted around one end of its longitudinal axis. In an example, a reflective element can be a mirror. In an example, a reflective element in its first configuration allows a first amount of light from the environment to pass through a selected area of the selectively-reflective component and the reflective element in its second configuration allows a second amount of light from the environment to pass through the selected area of the selectively-reflective component, wherein the second amount is less than 75% of the first amount. In an example, a selectively-reflective component can be between a proximal electroconductive component and a distal electroconductive component.

In an example, a longitudinal axis of a reflective element (e.g. micromirror) in its first configuration can be substantially-parallel to a radial vector which extends out from a person's eye (e.g. from the center of the eye pupil). In an example, a reflective element can be a one-way mirror. In an example, a subset of individual reflective elements (e.g. micromirrors) can be selectively rotated (e.g. rotated or pivoted) between first and second configurations. In an example, an optical structure can further comprise an array of axles around which individual reflective elements (e.g. micromirrors) rotate. In an example, these axles can be vertical. In an example, these axles can be horizontal. In an example, some of these axles can be vertical and some of these axles can be horizontal.

In an example, reflective elements in their second configurations can collectively form a portion of a Fresnel reflector. In an example, a first vector extends from (the center of) a reflective element to (the center of) a person's eye and a second vector extends from (the center of) the reflective element to (the center of) a virtual-object display, wherein a longitudinal axis of the reflective element (in its second configuration) is substantially-orthogonal to a third vector which is (midway) between the first and second vectors. In an example, a selected subset of individual reflective elements (e.g. micromirrors) can be selectively rotated (e.g. rotated or pivoted) from their first configurations to their second configurations.

In an example, a first vector extends from (the center of) a reflective element to (the center of) a person's eye and a second vector extends from (the center of) the reflective element to (the center of) a virtual-object display, wherein a longitudinal axis of the reflective element (in its second configuration) can be substantially-orthogonal to a third vector which bisects the angle between the first and second vectors. In an example, a selected subset of individual reflective elements (e.g. micromirrors) can be selectively rotated (e.g. rotated or pivoted) from their first configurations to their second configurations, wherein in their second configurations the selected subset of reflective elements can have a combined perimeter which overlaps the perimeter of a displayed virtual object. In an example, reflective elements can rotate and/or pivot around axles.

In an example, the angles by which reflective elements are rotated from their first configurations to their second configurations can be a linear function of their distances from a virtual-object display. In an example, a reflective element can be a partial mirror. In an example, a reflective element in its first configuration allows a first amount of light from the environment to pass through a selected area of the selectively-reflective component and the reflective element in its second configuration allows a second amount of light from the environment to pass through the selected area of the selectively-reflective component, wherein the second amount is less than 25% of the first amount.

In an example, a selectively-reflective component can be substantially-parallel to a proximal electroconductive component and/or a distal electroconductive component. In an example, individual reflective elements in a selectively-reflective component can be evenly-distributed (e.g. equidistant) across the selectively-reflective component. In an example, the angles by which reflective elements are rotated from their first configurations to their second configurations can increase with increased distance from a virtual-object display. In an example, a first vector extends from (the longitudinal center of) a reflective element to (the center of) a person's eye and a second vector extends from (the longitudinal center of) the reflective element to (the center of) a virtual-object display, wherein a longitudinal axis of the reflective element (in its second configuration) can be substantially-orthogonal to a third vector which is (midway) between the first and second vectors.

In an example, a selected subset of individual reflective elements (e.g. micromirrors) can be rotated (e.g. rotated or pivoted) from their first configurations to their second configurations, wherein in their second configurations the selected subset of reflective elements have a collective perimeter which matches the perimeter of a displayed virtual object. In an example, individual reflective elements in a selectively-reflective component can all be the same size. In an example, the angles by which reflective elements are rotated from their first configurations to their second configurations can be a function of their distances from a virtual-object display.

In an example, a virtual-object display can comprise an array, grid, mesh, or matrix of light emitters. In an example, a virtual-object display can comprise an array of Light Emitting Diodes (LEDs). In an example, a virtual-object display can comprise an array of micro Light Emitting Diodes (uLEDs). In an example, a virtual-object display can comprise an array of Organic Light Emitting Diodes (OLEDs). In an example, a virtual-object display can comprise an array of laser diodes. In an example one or more light emitters in a virtual-object display can be selected from the group consisting of: Light Emitting Diode (LED); Laser Diode; Liquid Crystal Virtual-object display (LCD); Liquid-Crystal-On-Silicon (LCoS) virtual-object display; Micro Light-Emitting Diode (Micro-LED); Organic Light-Emitting Diode (OLED); and Vertical Cavity Surface Emitting Laser (VCSEL).

In an example, a virtual-object display be selected from the group consisting of: active-matrix organic light-emitting diode array, projector, or display; collimated light projector or display; digital micro-mirror array, projector, or display; diode laser array, projector, or display; ferroelectric liquid crystal on silicon array, projector, or display; holographic projector or display. In an example, a display can be selected from the group consisting of: light emitting diode array, projector, or display; liquid crystal display array, projector, or display; liquid crystal on silicon array, projector, or display; low-power (e.g. nano-watt) laser projector or display; and display and/or microprojector. In an example, a display can comprise a scanning laser.

In an example, a virtual-object display can be located on a right or left sidepiece ("temple") of an eyewear frame. In an example, a virtual-object display can be located along the inside (body-facing) surface of a sidepiece ("temple") of an eyewear frame. In an example, a virtual-object display can be located on a portion of a front piece of an eyewear frame on the perimeter of a lens. In an example, a virtual object virtual-object display can be located on the portion of a front piece of an eyewear frame which is to the right or left of an eye.

In an example, the distal envelope and/or outer surface of an optical structure can be arcuate. In an example, the distal envelope and/or outer surface of an optical structure can be concave. In an example, the distal envelope and/or outer surface of an optical structure can be convex. In an example, the distal envelope and/or outer surface of an optical structure can have a shape which is a section of a sphere or ellipsoid. In an example, the distal envelope and/or outer surface of an optical structure can have a conic section shape.

This optical structure can be part of an overall near-eye wearable device (e.g. eyewear and/or eyeglasses) or system. In an example, there can be symmetric (right and left) versions of this optical structure which are positioned in front of a person's (right and left) eyes. In an example, this optical structure can be part of an overall near-eye wearable device (e.g. eyewear and/or eyeglasses) or multi-device system.

In an example, this device or system can further comprise one or more components selected from the group consisting of: (wireless) data receiver; (wireless) data transmitter; acoustic speaker; beam splitter; camera; concave lens; convex lens; curved mirror; data processor; EEG sensor; electrical actuator; electrochromic layer; eyewear (e.g. eyeglasses) front piece; eyewear (e.g. eyeglasses) sidepieces (e.g. temples); in-coupler; infrared light detector; infrared light emitter; laser scanner; lens; liquid crystal diode; liquid lens; microlens array; microphone; motion sensor; out-coupler; planoconcave lens; power source (e.g. battery); prism; remote data processor; smart ring; smart watch; cell phone; spectroscopic sensor; spherical lens; touch screen; lens with adjustable focal length; vibrating element; and waveguide. Example variations discussed elsewhere in this disclosure or in priority-linked disclosures can also be applied to this example where relevant.

Figure 4:
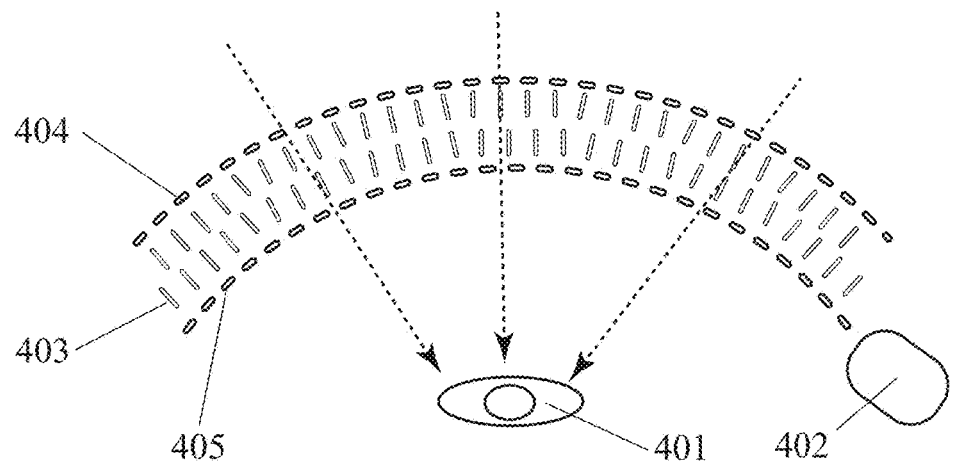
FIGS. 4 through 6 show an optical structure with two electroconductive layers, a selectively-transparent layer with multiple reflective elements spanning a width, and a virtual-object display.
Figure 5:
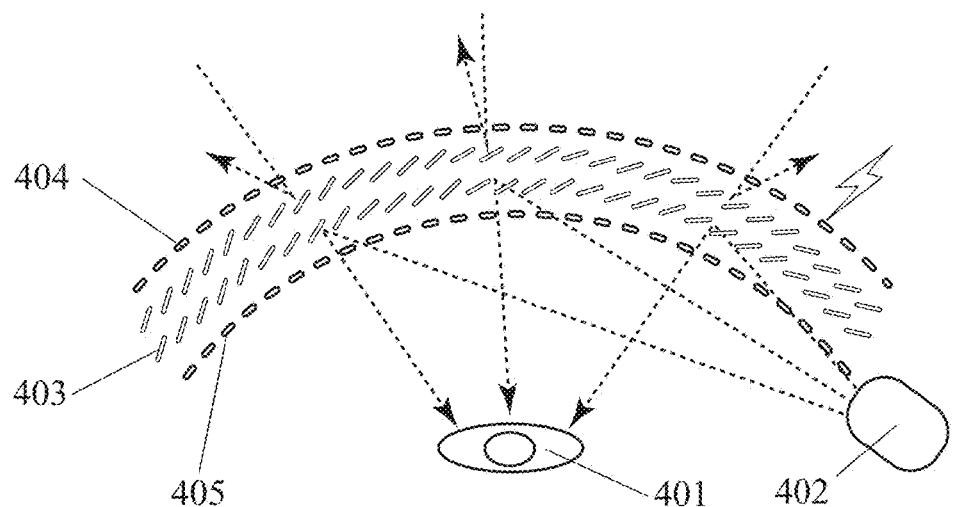
Figure 6:
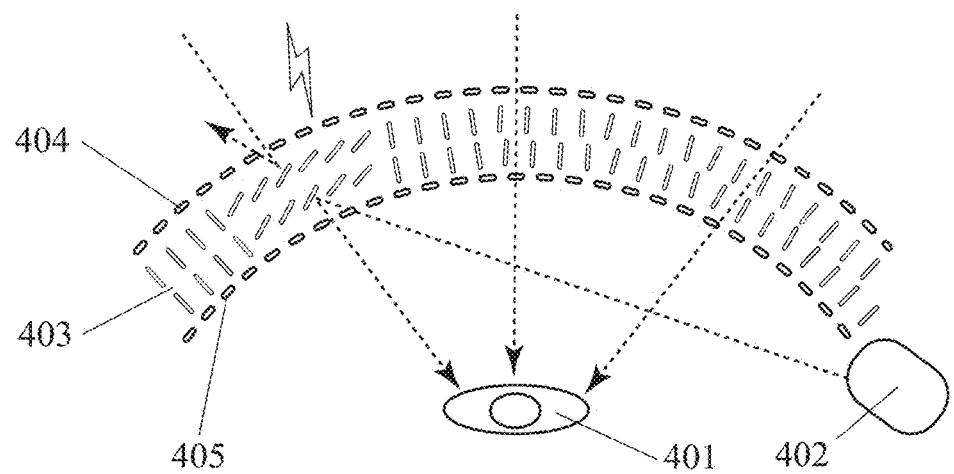

FIGS. 4 through 6 show an optical structure for use in augmented reality (and/or mixed reality) eyewear like the one shown in FIGS. 1 through 3, except that there are multiple reflective elements spanning a particular cross-sectional width of the selectively-reflective component. In this example, two reflective elements span a particular cross-sectional width of the selectively-reflective component. In this example, there are two parallel layers of reflective elements in the selectively-reflective component.

FIGS. 4 through 6 show three (top-down, cross-sectional) views, at three different times, of an optical structure for use in augmented reality (and/or mixed reality) eyewear comprising: a proximal electroconductive component (or layer) 405 which is a first average distance from a person's eye 401, wherein the proximal electroconductive component further comprises a plurality of electroconductive pathways (e.g. microwires), and wherein the proximal electroconductive component is substantially-transparent (e.g. transparent or translucent); a distal electroconductive component (or layer) 404 which is a second average distance from the person's eye, wherein the proximal electroconductive component further comprises a plurality of electroconductive pathways (e.g. microwires), wherein the proximal electroconductive component is substantially-transparent (e.g. transparent or translucent), and wherein the second distance is greater than the first distance; a selectively-reflective component (or layer) 403 which is between the proximal electroconductive component and the distal electroconductive component, wherein the selectively-reflective component further comprises a plurality of reflective elements (e.g. micromirrors), wherein there are multiple (e.g. two in this example) individual reflective elements spanning a particular cross-sectional width of the selectively-reflective component, wherein a selected subset of individual reflective elements (e.g. micromirrors) can be rotated between a first configuration and a second configuration, wherein the first configuration allows a first amount of light from the environment to pass through a selected area of the selectively-reflective component, wherein the second configuration allows a second amount of light from the environment to pass through the selected area of the selectively-reflective component, wherein the second amount is less than the first amount, and wherein a selected subset of individual reflective elements (e.g. micromirrors) can be rotated between the first configuration and the second configuration by transmission of electrical energy through the proximal electroconductive component and/or the distal electroconductive component; and a virtual-object display 402, wherein individual reflective elements (e.g. micromirrors) in the first configuration reflect from the selected area a first amount of light from the virtual-object display toward the person's eye, wherein individual reflective elements (e.g. micromirrors) in the second configuration reflect from the selected area a second amount of light from the virtual-object display toward the person's eye, wherein the second amount is greater than the first amount, and wherein reflection of light from the virtual-object display causes a virtual object to be displayed in the person's field of view.

FIG. 4 shows this structure at a first time when all of the reflective elements (e.g. micromirrors) are in their first configurations, thereby allowing the greatest amount of light from the environment to pass through the selectively-reflective component (or layer) to the person's eye and reflecting the least amount of light from the display toward the person's eye.

FIG. 5 shows this structure at a second time when all of the reflective elements (e.g. micromirrors) are in their second configurations, thereby allowing less light from the environment to pass through the selectively-reflective component (or layer) to the person's eye and reflecting more of light from the display toward the person's eye. In an example, the reflective elements can collectively comprise a portion of a Fresnel reflector when they are all in their second configurations.

FIG. 6 shows this structure at a third time when a selected subset of the reflective elements (e.g. micromirrors) are in their first configurations and a selected subset of the reflective elements (e.g. micromirrors) are in their second configurations. This enables a virtual object to be selectively displayed in a selected area of the person's field of view and light from the environment to be selectively reduced (or even blocked) in this selected area, thereby making virtual objects more opaque and allowing black portions in the virtual object.

The optical structure for use in augmented reality (and/or mixed reality) eyewear shown in FIGS. 4 through 6 can also be described as comprising: a proximal electroconductive component (or layer) which is a first average distance from a person's eye, wherein the proximal electroconductive component further comprises a plurality of electroconductive pathways (e.g. microwires), and wherein the proximal electroconductive component is substantially-transparent; a distal electroconductive component (or layer) which is a second average distance from the person's eye, wherein the proximal electroconductive component further comprises a plurality of electroconductive pathways (e.g. microwires), wherein the proximal electroconductive component is substantially-transparent, and wherein the second distance is greater than the first distance; a selectively-reflective component (or layer) which is between the proximal electroconductive component and the distal electroconductive component, wherein the selectively-reflective component further comprises a plurality of reflective elements (e.g. micromirrors), wherein there are multiple (e.g. two in this example) reflective elements spanning a particular cross-sectional width of the selectively-reflective component, wherein a selected subset of individual reflective elements (e.g. micromirrors) can be rotated between a first configuration and a second configuration, wherein a longitudinal axis of a reflective element is substantially-parallel to a radial vector extending out from the person's eye in the first configuration, wherein the longitudinal axis of a reflective element is not parallel to the radial vector in the second configuration, and wherein a selected subset of individual reflective elements (e.g. micromirrors) can be rotated between the first configuration and the second configuration by transmission of electrical energy through the proximal electroconductive component and/or the distal electroconductive component; and a virtual-object display, wherein individual reflective elements (e.g. micromirrors) in the first configuration reflect from the selected area a first amount of light from the display toward the person's eye, wherein individual reflective elements (e.g. micromirrors) in the second configuration reflect from the selected area a second amount of light from the display toward the person's eye, wherein the second amount is greater than the first amount, and wherein reflection of light from the display causes a virtual object to be displayed in the person's field of view.

The optical structure for use in augmented reality (and/or mixed reality) eyewear shown in FIGS. 4 through 6 can also be described as comprising: a three-layer optical structure which is configured to be placed in front of a person's eye, wherein the three-layer optical structure further comprises—(a) a proximal layer (e.g. closest to the eye) comprising a first plurality of transparent or translucent electroconductive pathways (e.g. microwires), (b) a distal layer (e.g. farthest from the eye) comprising a second plurality of transparent or translucent electroconductive pathways (e.g. microwires), and (c) a middle layer between the proximal and distal layers which comprises a plurality of reflective elements (e.g. micromirrors), wherein there are multiple (e.g. two) individual reflective elements spanning a given cross-sectional width of the middle layer, wherein a selected subset of individual reflective elements (e.g. micromirrors) can be rotated between a first configuration and a second configuration, wherein a longitudinal axis of a reflective element is substantially-parallel to a radial vector extending out from the person's eye in the first configuration, wherein the longitudinal axis of a reflective element is not parallel to the radial vector in the second configuration, and wherein a selected subset of individual reflective elements (e.g. micromirrors) can be rotated between the first configuration and the second configuration by transmission of electrical energy through the proximal layer and/or the distal layer; and a virtual-object display, wherein individual reflective elements (e.g. micromirrors) in the first configuration reflect from the selected area a first amount of light from the display toward the person's eye, wherein individual reflective elements (e.g. micromirrors) in the second configuration reflect from the selected area a second amount of light from the display toward the person's eye, wherein the second amount is greater than the first amount, and wherein reflection of light from the display causes a virtual object to be displayed in the person's field of view.

In a variation on augmented reality (and/or mixed reality) eyewear shown in FIGS. 4 through 6, an optical structure may not require two electroconductive components (e.g. layers) to rotate a selected subset of individual reflective elements. In an alternative example, only one electroconductive component (or layer) may be needed. In this alternative example, an optical structure for use in augmented reality (and/or mixed reality) eyewear can comprise: a substantially-transparent (e.g. transparent or translucent) electroconductive component (or layer) which further comprises a plurality of electroconductive pathways (e.g. microwires); a selectively-reflective component (or layer) which is adjacent to (e.g. parallel with) the electroconductive component, wherein the selectively-reflective component further comprises a plurality of reflective elements (e.g. micromirrors), wherein there are multiple (e.g. two) individual reflective elements spanning a particular cross-sectional width of the selectively-reflective component, wherein a selected subset of individual reflective elements (e.g. micromirrors) can be rotated between a first configuration and a second configuration, wherein the first configuration allows a first amount of light from the environment to pass through a selected area of the selectively-reflective component, wherein the second configuration allows a second amount of light from the environment to pass through the selected area of the selectively-reflective component, wherein the second amount is less than the first amount, and wherein a selected subset of individual reflective elements (e.g. micromirrors) can be rotated between the first configuration and the second configuration by transmission of electrical energy through the electroconductive component; and a virtual-object display, wherein individual reflective elements (e.g. micromirrors) in the first configuration reflect from the selected area a first amount of light from the display toward the person's eye, wherein individual reflective elements (e.g. micromirrors) in the second configuration reflect from the selected area a second amount of light from the display toward the person's eye, wherein the second amount is greater than the first amount, and wherein reflection of light from the display causes a virtual object to be displayed in the person's field of view.

In an example, a selectively-reflective component can comprise a proximal array (or layer) of individual reflective elements and a distal array (or layer) of individual reflective elements. In an example, reflective elements in a particular cross-sectional width of a selectively-reflective component can be aligned along the same radial vector extending out from a person's eye. In an example, reflective elements in a particular cross-sectional width of a selectively-reflective component can be parallel to each other. In an example, reflective elements in a particular cross-sectional width of a selectively-reflective component can be rotated by the same angle between their first configurations and their second configurations. In an example, individual reflective elements in proximal and distal arrays in a selected cross-sectional width of the component can be rotated simultaneously and by the same angles between their first and second configurations.

In another example, individual reflective elements in proximal and distal arrays in a selected cross-sectional width of the component may have different orientations. In an example, individual reflective elements in proximal and distal arrays in a selected cross-sectional width of the component can be rotated at different times and/or by different angles between their first and second configurations. In an example, relatively distal reflective elements in a selectively-reflective component can be larger than relatively proximal reflective elements in the selectively-reflective component. In an example, the distance between relatively-distal reflective elements and relatively-proximal reflective elements can vary with distance from the center of the selectively-reflective component. In an example, the distance between relatively-distal reflective elements and relatively-proximal reflective elements can increase with distance from the center of the selectively-reflective component.

Example variations discussed for the example in FIGS. 1 through 3 concerning proximal and distal electroconductive components, conductive pathways (e.g. microwires) within the electroconductive components, the selectively-reflective component, individual reflective elements within the selectively-reflective component, the virtual-object display, and/or other selected components can also be applied to this example where relevant. Example variations discussed elsewhere in this disclosure or in priority-linked disclosures can also be applied to this example where relevant.

Figure 7:
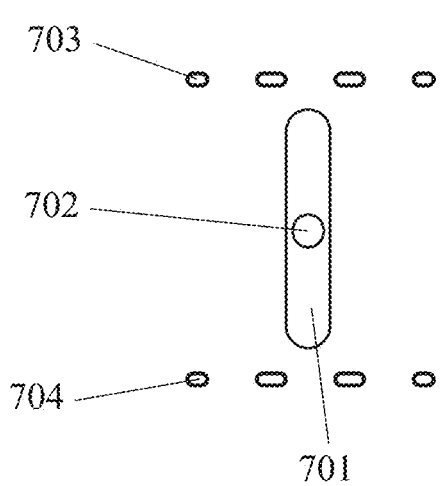
FIGS. 7 and 8 show a mechanism for moving a reflective element via rotation around a central axis.
Figure 8:
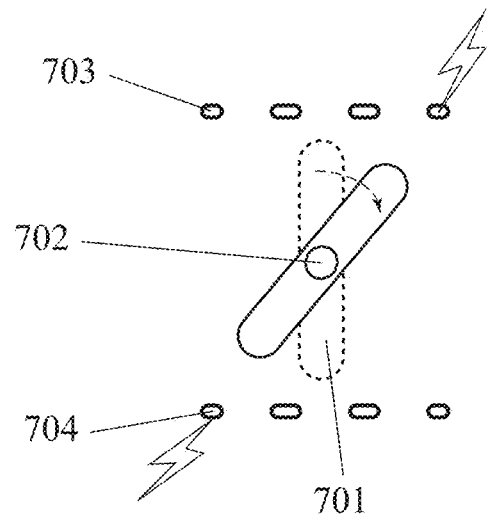

FIGS. 7 and 8 show two (top-down, cross-sectional) views, at two different times, which illustrate specifics concerning one possible rotational mechanism whereby an individual reflective element (e.g. micromirror) is rotated (and/or pivoted) by the transmission of electrical energy through a proximal electroconductive component (or layer) and/or through a distal electroconductive component (or layer). This mechanism includes a central axle around which a reflective element rotates. This rotational mechanism can be applied to the optical structures with rotating (and/or pivoting) individual reflective elements which are shown in other figures, such as those in FIGS. 1 through 6.

FIG. 7 shows this rotational mechanism at a first time when an individual reflective element (e.g. micromirror) is in its first configuration. FIG. 8 shows this rotational mechanism at a second time when the individual reflective element (e.g. micromirror) has been rotated (and/or pivoted) into its second configuration by the transmission of electrical energy through electroconductive pathways (e.g. microwires) in proximal and distal electroconductive components. In an example, this transmission of electrical energy creates or modifies an electromagnetic field which rotates (and/or pivots) the reflective element.

With respect to specific components, FIGS. 7 and 8 show a (top-down, cross-sectional) view of a rotational mechanism in an optical structure for use in augmented reality (and/or mixed reality) eyewear comprising: a proximal electroconductive component 703 which further comprises a first plurality of transparent or translucent electroconductive pathways (e.g. microwires) (whose cross-sections are shown here); a distal electroconductive component 704 comprising a second plurality of transparent or translucent electroconductive pathways (e.g. microwires) (whose cross-sections are shown here); an individual reflective element 701 (whose cross-section is shown here); and a central axle 702 (whose cross-section is shown here) of the reflective element, wherein the individual reflective element has a first configuration with a first longitudinal orientation, wherein the individual reflective element has a second configuration with a second longitudinal orientation, wherein the individual reflective element is moved between the first configuration and the second configuration by rotating (and/or pivoting) around the central axle; and wherein the individual reflective element is moved between the first configuration and the second configuration by the transmission of electrical energy through the proximal electroconductive component and/or the distal electroconductive component. In this example, a central axle around which an individual reflective element rotates (and/or pivots) intersects the central third of the longitudinal axis of the reflective element.

In an example, transmission of electrical energy through the proximal electroconductive component and/or the distal electroconductive component can create or modify an electromagnetic (electrical and/or magnetic) field. In an example, the individual reflective element responds to this field by aligning its longitudinal axis with the field. In this example, transmission of electrical energy through both the proximal electroconductive component and the distal electroconductive component creates an electromagnetic (electrical and/or magnetic) field. In this example, transmission of electrical energy through either a proximal electroconductive component or a distal electroconductive component creates an electromagnetic (electrical and/or magnetic) field. In an example, this field can be localized and thus only rotate (and/or pivot) a nearby (e.g. adjacent) individual reflective element.

In an example, transmission of electrical energy through electroconductive pathways (e.g. microwires) in a proximal electroconductive component and/or a distal electroconductive component can create or modify an electromagnetic (electrical and/or magnetic) field. In an example, the individual reflective element responds to this field by aligning its longitudinal axis with the field. In this example, transmission of electrical energy through electroconductive pathways (e.g. microwires) in both the proximal electroconductive component and the distal electroconductive component creates an electromagnetic (electrical and/or magnetic) field.

In another example, transmission of electrical energy through only one electroconductive component can be sufficient to create or modify an electromagnetic field. In this example, transmission of electrical energy through electroconductive pathways (e.g. microwires) in either a proximal electroconductive component or a distal electroconductive component creates an electromagnetic (electrical and/or magnetic) field. Example variations discussed elsewhere in this disclosure or in priority-linked disclosures can also be applied to this example where relevant.

Figure 9:
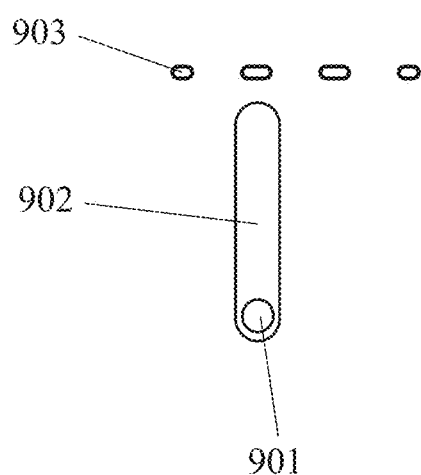
FIGS. 9 and 10 show a mechanism for moving a reflective element via pivoting around an end axis.
Figure 10:
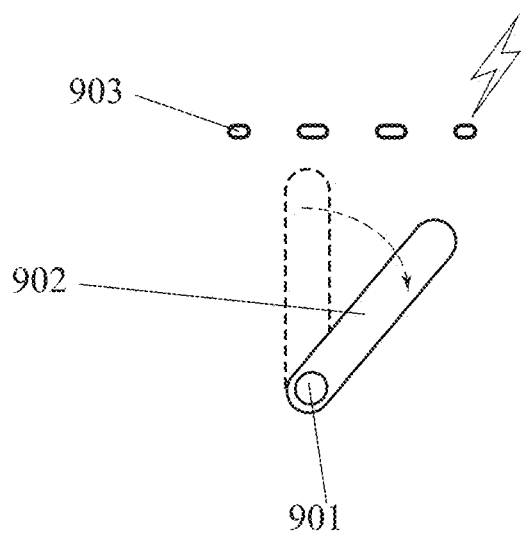

FIGS. 9 and 10 show two (top-down, cross-sectional) views, at two different times, which illustrate specifics concerning one possible rotational mechanism whereby an individual reflective element (e.g. micromirror) is pivoted (and/or rotated) by the transmission of electrical energy through a proximal electroconductive component (or layer) and/or through a distal electroconductive component (or layer). This mechanism includes a longitudinal-end axle around which an individual reflective element pivots. This rotational mechanism can be applied to the optical structures with pivoting (and/or rotating) individual reflective elements which are shown in other figures, such as those in FIGS. 1 through 6.

FIG. 9 shows this rotational mechanism at a first time when an individual reflective element (e.g. micromirror) is in its first configuration. FIG. 10 shows this rotational mechanism at a second time when the individual reflective element (e.g. micromirror) has been pivoted (and/or rotated) into its second configuration by the transmission of electrical energy through electroconductive pathways (e.g. microwires) in proximal and distal electroconductive components.

With respect to specific components, FIGS. 9 and 10 show a (top-down, cross-sectional) view of a rotational mechanism in an optical structure for use in augmented reality (and/or mixed reality) eyewear comprising: a proximal electroconductive component 903 which further comprises a first plurality of transparent or translucent electroconductive pathways (e.g. microwires) (whose cross-sections are shown here); a distal electroconductive component 904 comprising a second plurality of transparent or translucent electroconductive pathways (e.g. microwires) (whose cross-sections are shown here); an individual reflective element 901 (whose cross-section is shown here); and a longitudinal-end axle 902 (whose cross-section is shown here) of the individual reflective element, wherein the individual reflective element has a first configuration with a first longitudinal orientation, wherein the individual reflective element has a second configuration with a second longitudinal orientation, wherein the individual reflective element is moved between the first configuration and the second configuration by pivoting (and/or rotating) around the longitudinal-end axle; and wherein the individual reflective element is moved between the first configuration and the second configuration by the transmission of electrical energy through the proximal electroconductive component and/or the distal electroconductive component.

In this example, a longitudinal-end axle around which an individual reflective element pivots intersects the proximal third of the longitudinal axis of the reflective element. In another example, a longitudinal-end axle around which an individual reflective element pivots can intersect the distal third of the longitudinal axis of the reflective element. In another example, a reflective element can pivot around a joint or hinge connected to its (proximal or distal) longitudinal end.

In an example, transmission of electrical energy through a proximal electroconductive component and/or a distal electroconductive component can create or modify an electromagnetic (electrical and/or magnetic) field. In an example, the individual reflective element responds to this field by aligning its longitudinal axis with the field. In this example, transmission of electrical energy through both the proximal electroconductive component and the distal electroconductive component creates an electromagnetic (electrical and/or magnetic) field. In this example, transmission of electrical energy through either a proximal electroconductive component or a distal electroconductive component creates an electromagnetic (electrical and/or magnetic) field. In an example, this field can be localized and thus only pivot (and/or rotate) a nearby (e.g. adjacent individual reflective element.

In an example, transmission of electrical energy through electroconductive pathways (e.g. microwires) in the proximal electroconductive component and/or the distal electroconductive component can create or modify an electromagnetic (electrical and/or magnetic) field. In an example, the individual reflective element responds to this field by aligning its longitudinal axis with the field. In this example, transmission of electrical energy through electroconductive pathways (e.g. microwires) in both the proximal electroconductive component and the distal electroconductive component creates or modifies an electromagnetic (electrical and/or magnetic) field. In this example, transmission of electrical energy through electroconductive pathways (e.g. microwires) in either a proximal electroconductive component or a distal electroconductive component creates or modifies an electromagnetic (electrical and/or magnetic) field. Example variations discussed elsewhere in this disclosure or in priority-linked disclosures can also be applied to this example where relevant.

Figure 11:
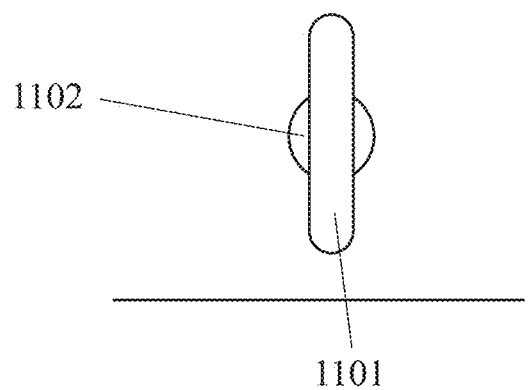
FIGS. 11 and 12 show a mechanism for moving a reflective element using an electromagnetic actuator.
Figure 12:
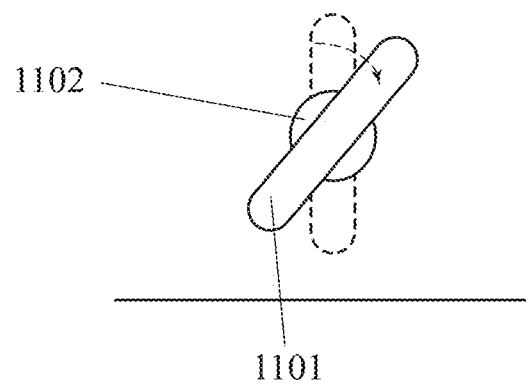

FIGS. 11 and 12 show two (top-down, cross-sectional) views, at two different times, which illustrate a rotational mechanism whereby an individual reflective element (e.g. micromirror) is rotated (and/or pivoted) by an electromagnetic actuator (e.g. MEMS device). FIG. 11 shows this rotational mechanism at a first time when an individual reflective element (e.g. micromirror) is in its first configuration. FIG. 12 shows this rotational mechanism at a second time when the individual reflective element (e.g. micromirror) has been pivoted (and/or rotated) into its second configuration by the electromagnetic actuator.

With respect to specific components, FIGS. 11 and 12 show a (top-down, cross-sectional) view of a rotational mechanism in an optical structure for use in augmented reality (and/or mixed reality) eyewear comprising: an electromagnetic actuator 1102; and an individual reflective element 1101, wherein the individual reflective element has a first configuration with a first longitudinal orientation, wherein the individual reflective element has a second configuration with a second longitudinal orientation.

In an example, there can be an individual electromagnetic actuator (e.g. MEMS device) for each individual reflective element. In an example, an electromagnetic actuator (e.g. MEMS device) can rotate (and/or pivot) an individual reflective element around a central axle (e.g. in the central third of the longitudinal axis of the element). In another example, an electromagnetic actuator (e.g. MEMS device) can pivot (and/or rotate) an individual reflective element around a longitudinal-end axle (e.g. in the proximal or distal third of the longitudinal axis of the element). In another example, an electromagnetic actuator can rotate (and/or pivot) a plurality (e.g. a whole row, column, or ring) of reflective elements. Example variations discussed elsewhere in this disclosure or in priority-linked disclosures can also be applied to this example where relevant.

Figure 13:
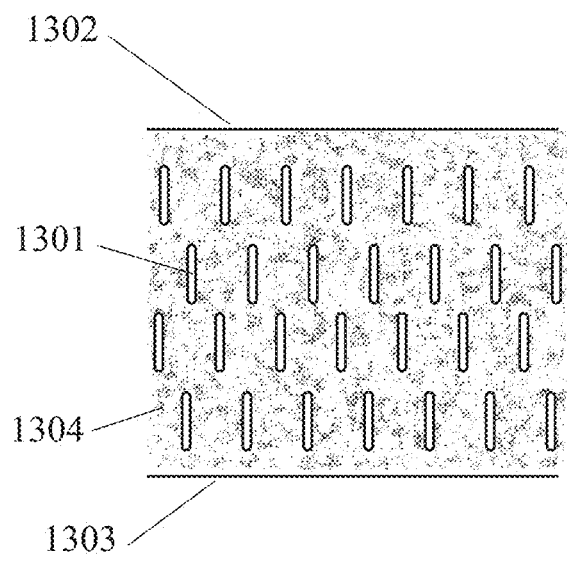
FIGS. 13 and 14 show a mechanism for moving reflective elements suspended in a liquid.
Figure 14:
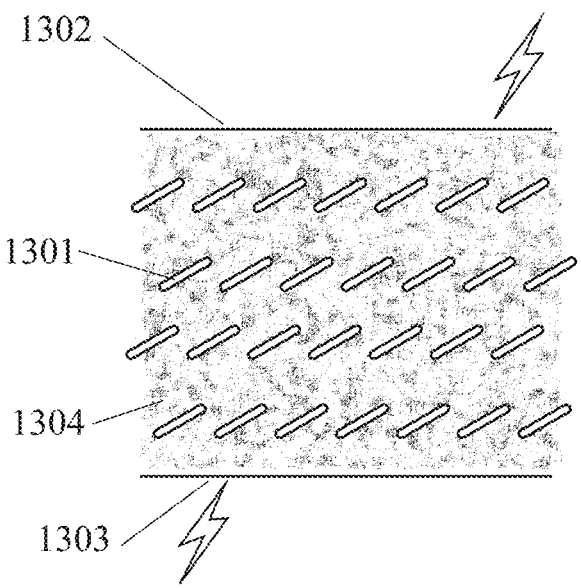

FIGS. 13 and 14 show two (top-down, cross-sectional) views, at two different times, of a possible rotational mechanism for use in an optical structure wherein a plurality of reflective longitudinal micromirrors, reflective particles, nematic liquid crystals, or reflective molecules are suspended in a liquid and then rotated by the transmission of electrical energy through a proximal electroconductive component (or layer) and/or through a distal electroconductive component (or layer). In an example, transmission of electrical energy through proximal and/or distal electroconductive components creates or modifies an electromagnetic field which rotates (e.g. changes the alignment of) the longitudinal micromirrors, reflective particles, nematic liquid crystals, or reflective molecules.

FIG. 13 shows this rotational mechanism at a first time when longitudinal micromirrors, reflective particles, nematic liquid crystals, or reflective molecules are in their first configurations. FIG. 14 shows this rotational mechanism at a second time when the longitudinal micromirrors, reflective particles, nematic liquid crystals, or reflective molecules have been rotated into their second configurations by the transmission of electrical energy through electroconductive pathways (e.g. microwires) in proximal and distal electroconductive components.

With respect to specific components, FIGS. 13 and 14 show a (top-down, cross-sectional) view of a rotational mechanism in an optical structure for use in augmented reality (and/or mixed reality) eyewear comprising: a proximal electroconductive component 1303; a distal electroconductive component 1302; a plurality of longitudinal micromirrors, reflective particles, nematic liquid crystals, or reflective molecules (including 1301); and a liquid in which the longitudinal micromirrors, reflective particles, nematic liquid crystals, or reflective molecules are suspended, wherein the orientations of the longitudinal micromirrors, reflective particles, nematic liquid crystals, or reflective molecules are changed by the transmission of electrical energy through the proximal electroconductive component and/or the distal electroconductive component.

In an example, transmission of electrical energy through the proximal electroconductive component and/or the distal electroconductive component creates an electromagnetic (electrical and/or magnetic) field. In an example, this field can be localized and thus only rotate nearby longitudinal micromirrors, particles, or molecules. In this example, longitudinal micromirrors, reflective particles, nematic liquid crystals, or reflective molecules are suspended in a liquid. In another example, longitudinal micromirrors, reflective particles, nematic liquid crystals, or reflective molecules can be suspended in an electromagnetic field instead of a liquid.

In another example, longitudinal micromirrors, reflective particles, nematic liquid crystals, or reflective molecules can be suspended in an electromagnetic field whose orientation is changed by transmission of electrical energy through a proximal electroconductive component and/or through a distal electroconductive component. In another example, longitudinal micromirrors, reflective particles, nematic liquid crystals, or reflective molecules can be suspended in an electromagnetic field, wherein they are moved from their first configurations to their second configurations by transmission of electrical energy through a proximal electroconductive component and/or through a distal electroconductive component.

In another example, longitudinal micromirrors, reflective particles, nematic liquid crystals, or reflective molecules can be suspended in an electromagnetic field, wherein they are moved from their first configurations to their second configurations by transmission of electrical energy through a proximal electroconductive component and/or through a distal electroconductive component, which changes the orientation of the field. Example variations discussed elsewhere in this disclosure or in priority-linked disclosures can also be applied to this example where relevant.

Figure 15:
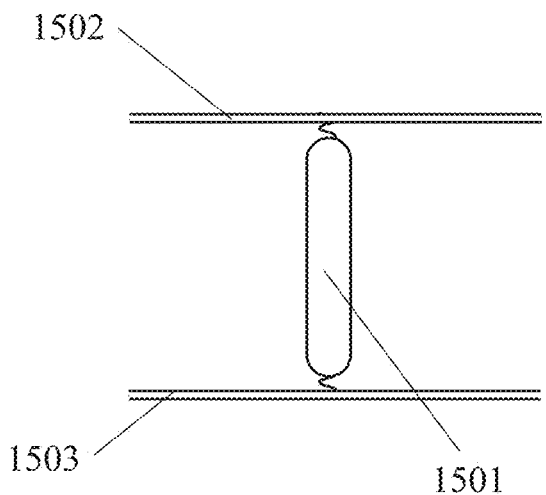
FIGS. 15 and 16 show a mechanism for moving a reflective element by shifting planar members.
Figure 16:
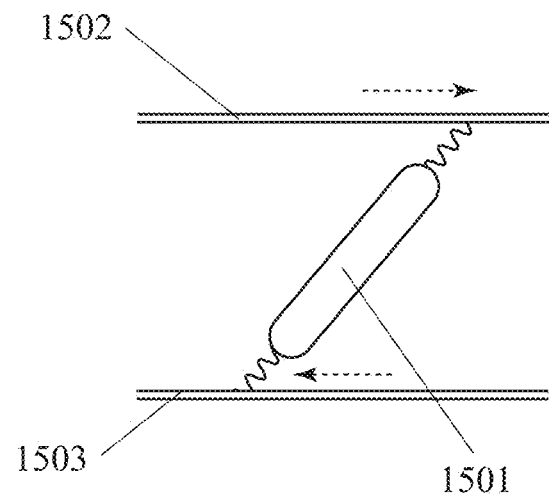

FIGS. 15 and 16 show two (top-down, cross-sectional) views, at two different times, which illustrate a one possible rotational mechanism whereby an individual reflective element is pivoted by laterally shifting (e.g. sliding) proximal and/or distal planar components to which the reflective element is flexibly connected. FIG. 15 shows this rotational mechanism at a first time when the reflective element is in a first configuration with a first orientation. FIG. 16 shows this rotational mechanism at a second time when the reflective element has been pivoted into a second configuration with a second orientation by lateral shifting (e.g. sliding) of proximal and/or distal planar components to which the element is flexibly attached.

With respect to specific components, FIGS. 15 and 16 show a (top-down, cross-sectional) view of a rotational mechanism in an optical structure for use in augmented reality (and/or mixed reality) eyewear comprising: a transparent proximal planar component 1503; a transparent distal planar component 1502; and a reflective element 1501 (e.g. micromirror) whose proximal end is flexibly-connected to the proximal planar component and whose distal end is flexibly-connected to the distal planar component, wherein the reflective element has a first configuration with a first longitudinal orientation and a second longitudinal configuration with a second longitudinal orientation, and wherein the reflective element is changed between its first longitudinal orientation and its second longitudinal orientation by lateral shifting and/or sliding of the proximal planar component and/or the distal planar component.

In an example, a reflective element can be flexibly connected to proximal and distal planar components by one or more elastic, stretchable, and/or elastomeric connecting members. In an example, the proximal and distal ends of a reflective element can be flexibly connected to proximal and distal planar components, respectively, by elastic, stretchable, and/or elastomeric connecting members. In an example, a reflective element can be flexibly connected to proximal and distal planar components by one or more springs or other tensile members. In an example, a reflective element can be flexibly connected to proximal and distal planar components by helical and/or sinusoidal connecting members.

In an example, this reflective element can be one among a plurality (e.g. an array, grid, mesh, or matrix) of reflective elements which comprise part of an optical structure for use in augmented reality eyewear. In an example, subsets of this plurality of reflective elements can be selectively changed between their first and second configurations by selectively shifting and/or sliding proximal and distal planar components. In an example, subsets of this plurality of reflective elements can be selectively changed between their first and second configurations by selectively shifting and/or sliding a subset of a plurality of proximal and distal planar components. Example variations discussed elsewhere in this disclosure or in priority-linked disclosures can also be applied to this example where relevant.

Figure 17:
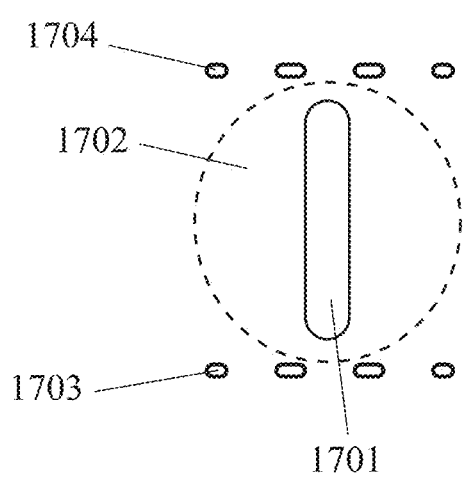
FIGS. 17 and 18 show a mechanism for moving a reflective element embedded in a transparent sphere.
Figure 18:
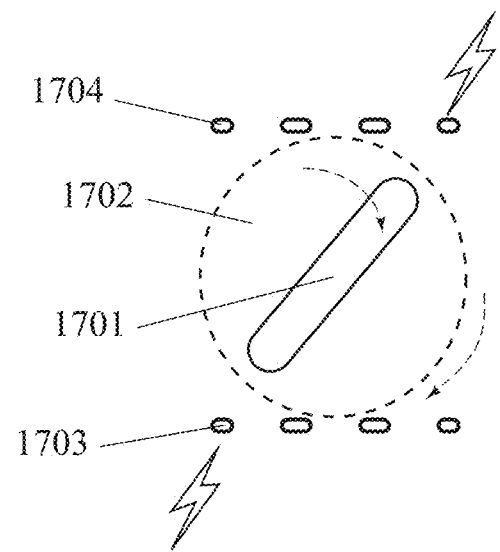

FIGS. 17 and 18 show two (top-down, cross-sectional) views, at two different times, which illustrate specifics concerning one possible rotational mechanism whereby an individual reflective element (e.g. micromirror) is rotated (and/or pivoted) by the transmission of electrical energy through a proximal electroconductive component (or layer) and/or through a distal electroconductive component (or layer). In this example, the individual reflective element (e.g. micromirror) is embedded within a rotatable transparent convex component (e.g. a rotatable transparent sphere). In this example, when the convex component (e.g. the transparent sphere) is rotated, then the orientation of the reflective element (e.g. micromirror) within it also changes.

FIG. 17 shows this rotational mechanism at a first time when the individual reflective element (e.g. micromirror) is in a first configuration. FIG. 18 shows this rotational mechanism at a second time when the individual reflective element (e.g. micromirror) has been rotated (and/or pivoted) into a second configuration by rotation of the convex component (e.g. transparent sphere) in which it is embedded, wherein rotation of the convex component is caused by transmission of electrical energy through electroconductive pathways (e.g. microwires) in proximal and distal electroconductive components.

With respect to specific components, FIGS. 17 and 18 show a (top-down, cross-sectional) view of a rotational mechanism in an optical structure for use in augmented reality (and/or mixed reality) eyewear comprising: a proximal electroconductive component 1703 which further comprises a first plurality of transparent or translucent electroconductive pathways (e.g. microwires); a distal electroconductive component 1704 comprising a second plurality of transparent or translucent electroconductive pathways (e.g. microwires); a rotatable transparent convex component (e.g. transparent sphere) 1702; and a reflective element 1701 which is embedded within the transparent convex component, wherein the individual reflective element has a first configuration with a first longitudinal orientation, wherein the individual reflective element has a second configuration with a second longitudinal orientation, wherein the individual reflective element is moved between the first configuration and the second configuration by rotation of the transparent convex component; and wherein the transparent convex component is rotated by transmission of electrical energy through the proximal electroconductive component and/or the distal electroconductive component. Example variations discussed elsewhere in this disclosure or in priority-linked disclosures can also be applied to this example where relevant.

Figure 19:
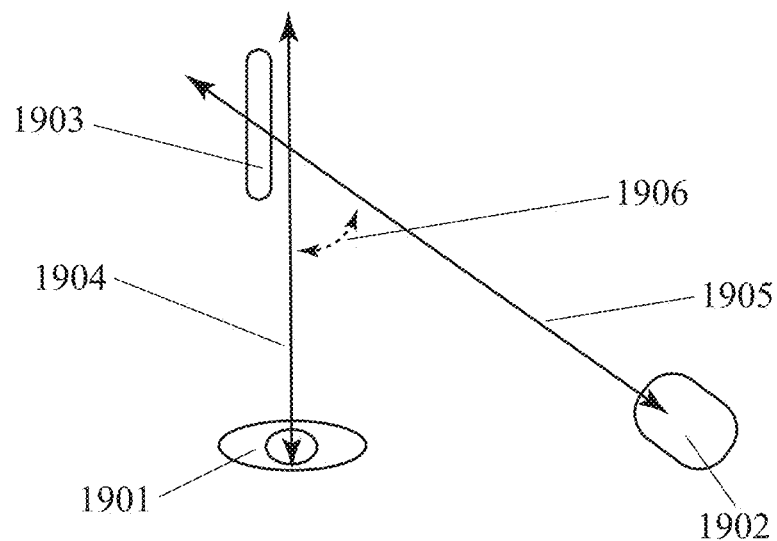
FIGS. 19 through 21 show how the angle of a reflective element can change between its first and second configurations.
Figure 20:
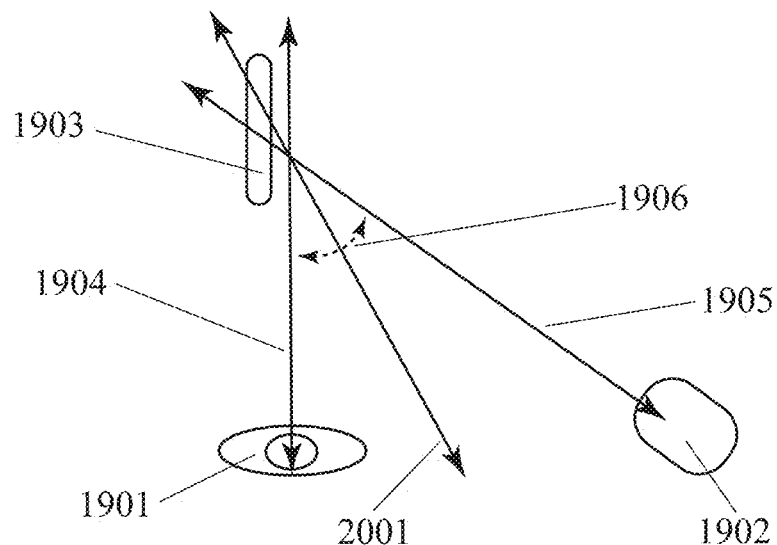
Figure 21:
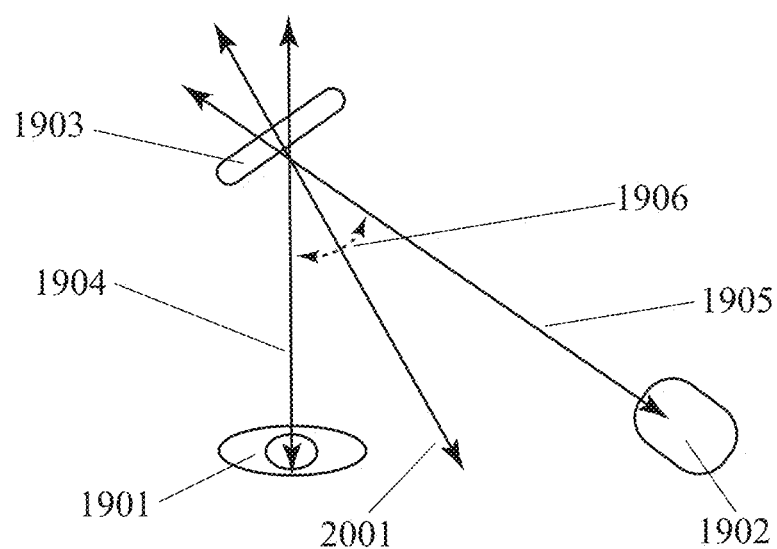

FIGS. 19 through 21 provide additional specifics concerning how the angle of a rotatable reflective element can change between its first and second configurations. FIGS. 19 through 21 show three (top-down, cross-sectional) views, at three different times, of an optical structure for use in augmented reality (and/or mixed reality) eyewear comprising: a rotatable reflective element (e.g. micromirror) 1903 which is located in front of a person's eye 1901; and a virtual-object display 1902 which is located to one side (e.g. right side or left side) of the person's eye: wherein a first vector 1904 extends out from the person's eye and passes through or near the rotatable reflective element (e.g. micromirror), wherein a second vector 1905 extends out from the virtual-object display and passes through or near the rotatable reflective element (e.g. micromirror), and wherein a third vector 2001 extends out from the rotatable reflective element (e.g. micromirror) between the first vector and second vector, bifurcating the angle 1906 between the first vector and the second vector, wherein the rotatable reflective element (e.g. micromirror) has a first configuration in which its longitudinal axis is substantially parallel to the first vector, and wherein the rotatable reflective element (e.g. micromirror) has a second configuration in which its longitudinal axis is substantially orthogonal (e.g. perpendicular) to the third vector.

FIG. 19 shows this structure at a first time when the rotatable reflective element (e.g. micromirror) is in its first configuration with its longitudinal axis being substantially parallel to the first vector 1904 between an eye and a reflective element. FIG. 20 shows this structure at the first time again, but also displays the third vector 1906 which bisects the angle 2001 between the first vector 1904 and the second vector 1905. FIG. 21 shows this structure at a second time when the rotatable reflective element (e.g. micromirror) is in its second configuration with its longitudinal axis being substantially orthogonal to the third vector 1906.

In an example, a rotatable reflective element with these specified first and second configurations can be part of a plurality (e.g. array, grid, mesh, or matrix) of rotatable reflective elements in front of a person's eye. In an example, subsets of these rotatable reflective elements can be selected to display relatively-opaque virtual objects in the person's field of view by reflecting light rays from the virtual-object display to the person's eye and by selectively blocking (or reducing) environmental light rays from reaching the person's eye in the area where the virtual object is displayed. In an example, a plurality of reflective elements can collectively form a portion of a Fresnel reflector when they are in their second configurations.

In an example, a rotatable reflective element (e.g. micromirror) can be rotated (and/or pivoted) between a first configuration and a second configuration by one or more mechanisms selected from the group consisting of: creation of an electromagnetic (or magnetic) field by transmission of electrical energy through one or more nearby (e.g. adjacent) conductive components; changing the orientation of an electromagnetic (or magnetic) field by transmission of electrical energy through one or more nearby (e.g. adjacent) conductive components; lateral shifting and/or sliding of one or more planar components to which the rotatable reflective element is flexibly connected); and rotation and/or pivoting of the rotatable reflective element by an electromagnetic actuator. Example variations discussed elsewhere in this disclosure or in priority-linked disclosures can also be applied to this example where relevant.

Figure 22:
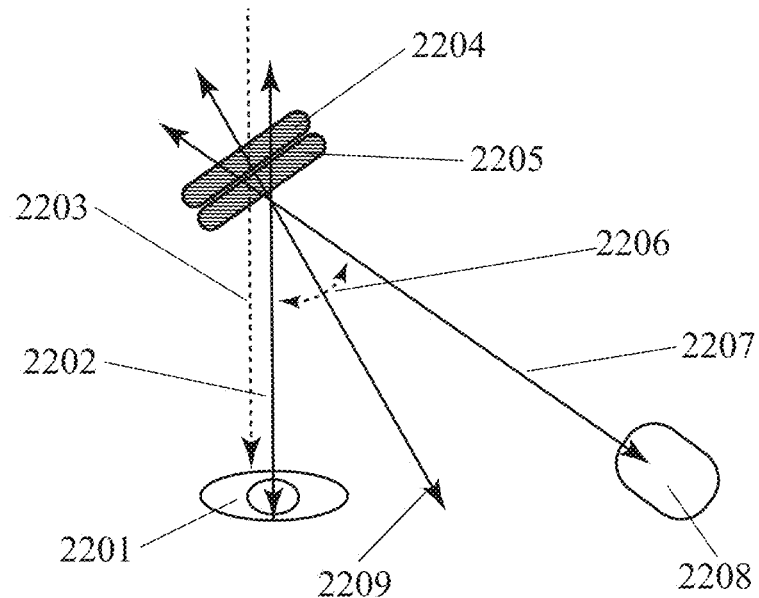
FIGS. 22 and 23 show a selectively-reflective element with distal and proximal parts having different polarization orientations.
Figure 23:
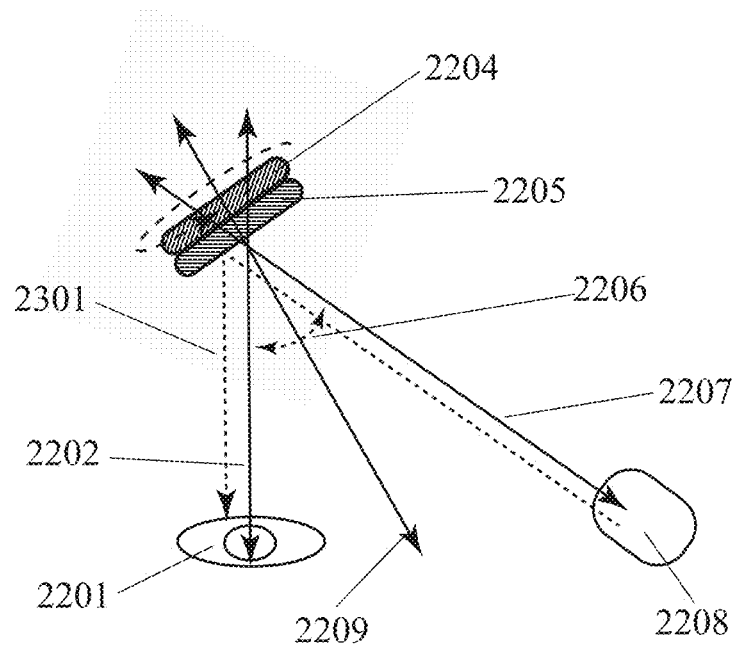

FIGS. 22 and 23 show an example of a selectively-reflective element with: a first configuration which allows environmental light to pass through; and a second configuration which blocks (or reduces) the transmission of environmental light and reflects light from a virtual-object display toward a person's eye. The selectively-reflective element in this example has a proximal part and a distal part. Rotation of the distal part relative to the proximal part, or vice versa, changes the element from the first configuration to the second configuration. In an example, the proximal and distal parts can have polarization filters with different orientations. In an example, the proximal and distal parts can have different opacity levels. In an example, when the proximal and distal parts are in a first configuration, light from the environment can pass through them. However, when one part is rotated relative to the other part, light from the environment is blocked and light from the virtual-object display is reflected. FIG. 22 shows this selectively-reflective element at a first time in the first configuration. FIG. 23 shows this selectively-reflective element at a second time in the second configuration.

FIGS. 22 and 23 show two (top-down, cross-sectional) views, at two different times, of an optical structure for use in augmented reality (and/or mixed reality) eyewear comprising: a selectively-reflective element which is located in front of a person's eye 2301, wherein the selectively-reflective element further comprises a distal part 2204 and a proximal part 2205; and a virtual-object display 2208 which is located to one side (e.g. right side or left side) of the person's eye; wherein the selectively-reflective element has a first configuration which allows transmission of environmental light 2203 to the person's eye in a selected area of the person's field of view, wherein the selectively-reflective element has a second configuration which blocks (or reduces) transmission of environmental light to the person's eye in the selected area of the person's field of view and reflects light from the virtual-object display to the person's eye in the selected area, wherein the selectively-reflective element is changed between the first configuration and the second configuration by rotating the distal part relative to the proximal part, or vice versa, wherein a first vector 2202 extends out from the person's eye and passes through or near the rotatable reflective element (e.g. micromirror), wherein a second vector 2207 extends out from the virtual-object display and passes through or near the rotatable reflective element (e.g. micromirror), wherein a third vector 2209 extends out from the rotatable reflective element (e.g. micromirror) between the first vector and second vector, bifurcating the angle 2206 between the first vector and the second vector, and wherein the selectively-reflective element is substantially orthogonal (e.g. perpendicular) to the third vector.

Figure 24:
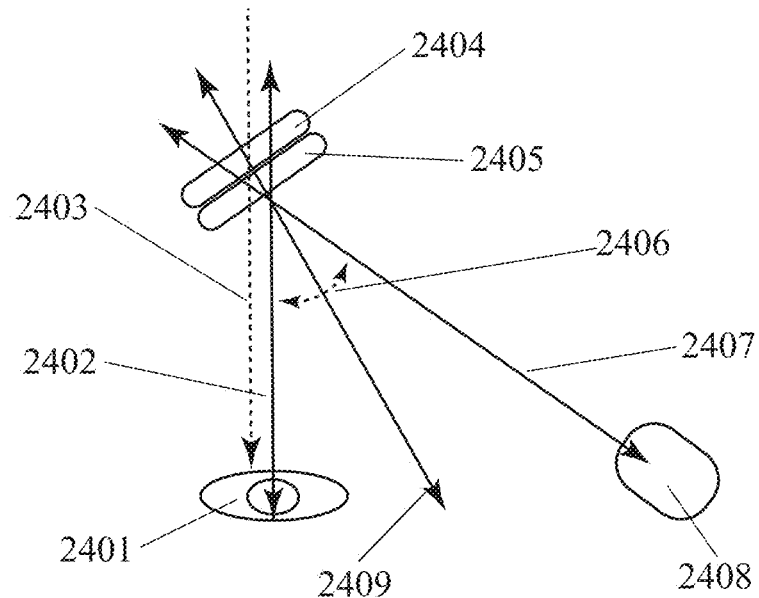
FIGS. 24 and 25 show a selectively-reflective element with distal and proximal parts having different opacity levels.
Figure 25:
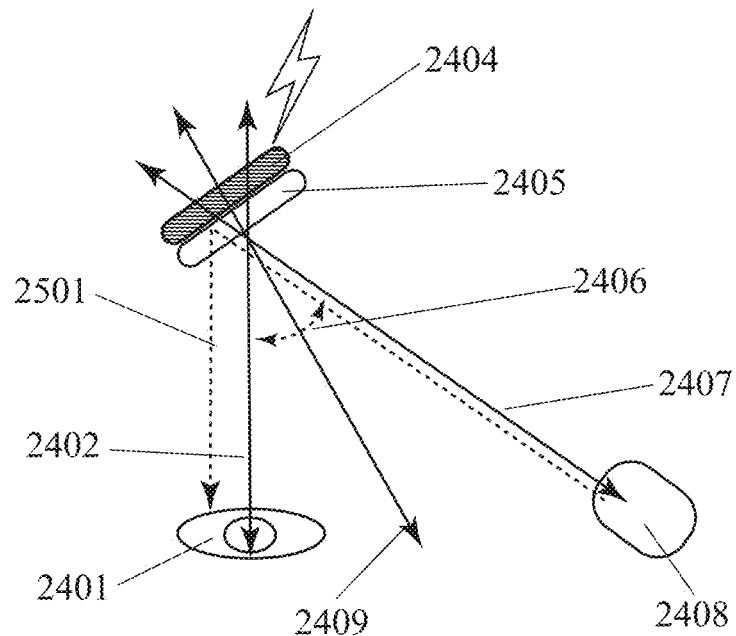

FIGS. 24 and 25 show another example of a selectively-reflective element. This selectively-reflective element has a first configuration which allows environmental light to pass through and a second configuration which blocks environmental light and reflects light from a virtual-object display toward a person's eye. The selectively-reflective element in this example has a proximal part and a distal part. Application of electrical energy to the distal part changes the element between the first configuration to the second configuration. In an example, application of electrical energy to the distal part can make it opaque. In an example, application of electrical energy to the distal part can make the proximal part reflective. In an example, when the element is in a first configuration, light from the environment can pass through it. However, when the element is in the second configuration, then light from the environment is blocked and light from the virtual-object display is reflected. FIG. 24 shows this selectively-reflective element at a first time in the first configuration. FIG. 24 shows this selectively-reflective element at a second time in the second configuration.

FIGS. 24 and 25 show two (top-down, cross-sectional) views, at two different times, of an optical structure for use in augmented reality (and/or mixed reality) eyewear comprising: a selectively-reflective element which is located in front of a person's eye 2401, wherein the selectively-reflective element further comprises a distal part 2404 and a proximal part 2405; and a virtual-object display 2408 which is located to one side (e.g. right side or left side) of the person's eye; wherein the selectively-reflective element has a first configuration which allows transmission of environmental light 2403 to the person's eye in a selected area of the person's field of view, wherein the selectively-reflective element has a second configuration which blocks (or reduces) transmission of environmental light to the person's eye in the selected area of the person's field of view and reflects light from the virtual-object display 2408 to the person's eye in the selected area, wherein the selectively-reflective element is changed between the first configuration and the second configuration by application of electrical energy to the distal part, wherein a first vector 2402 extends out from the person's eye and passes through or near the rotatable reflective element (e.g. micromirror), wherein a second vector 2407 extends out from the virtual-object display and passes through or near the rotatable reflective element (e.g. micromirror), wherein a third vector 2409 extends out from the rotatable reflective element (e.g. micromirror) between the first vector and second vector, bifurcating the angle 2406 between the first vector and the second vector, and wherein the selectively-reflective element is substantially orthogonal (e.g. perpendicular) to the third vector. Example variations discussed elsewhere in this disclosure or in priority-linked disclosures can also be applied to this example where relevant.

Figure 26:
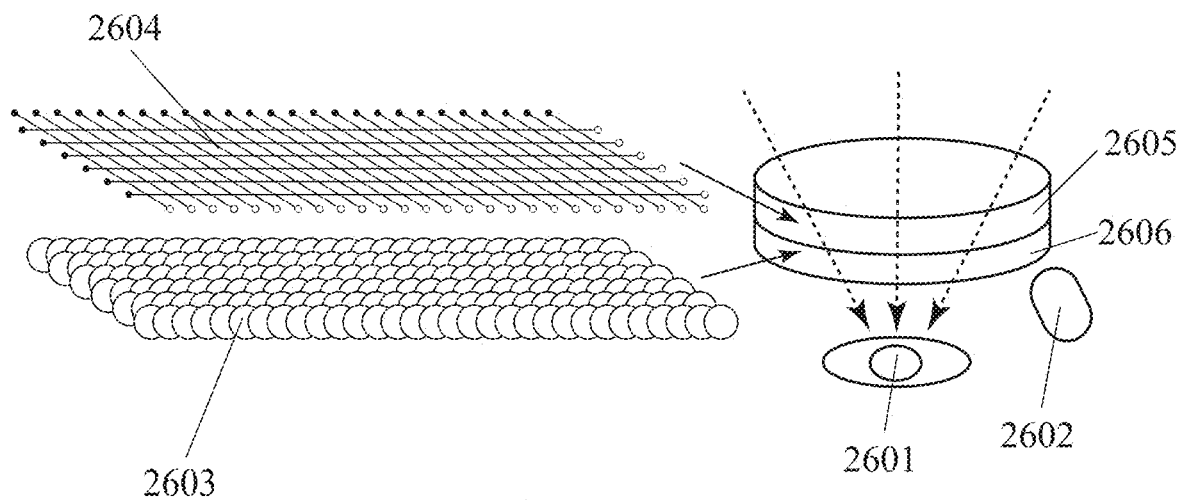
FIGS. 26 through 28 show an optical structure with one distal electroconductive layer, a selectively-transparent layer comprising reflective elements, and a virtual-object display.
Figure 27:
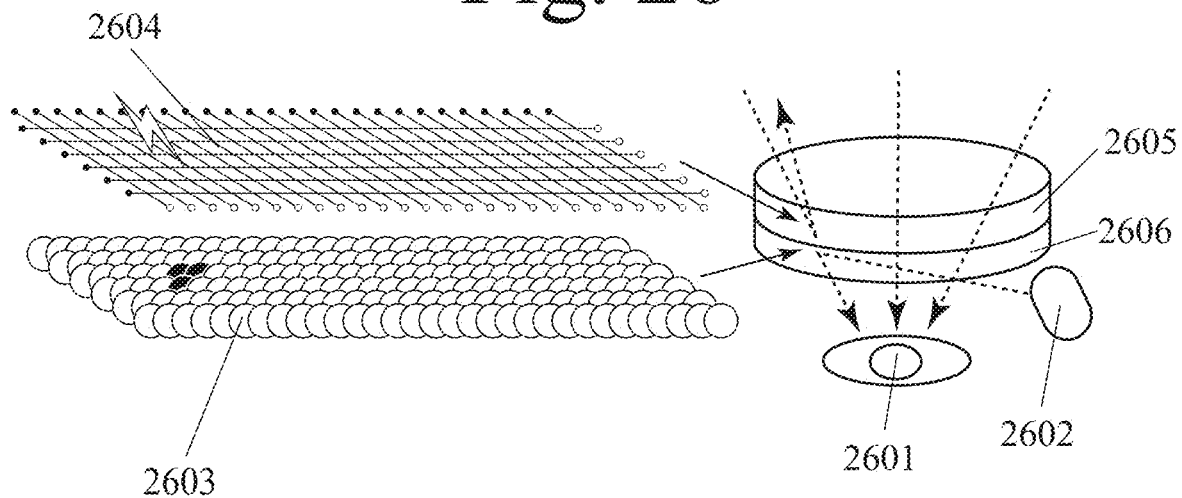
Figure 28:
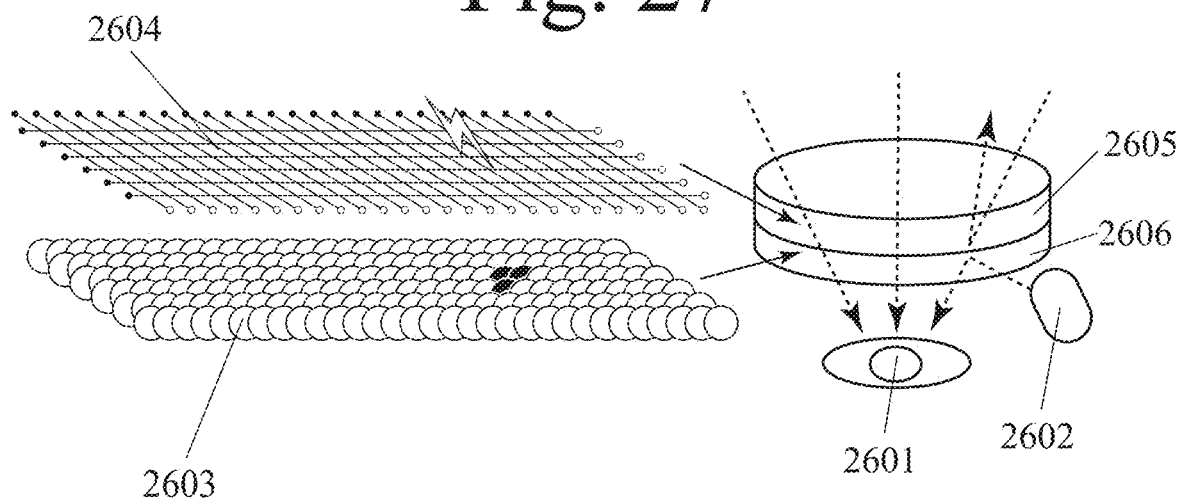

FIGS. 26 through 28 show three oblique views, at three different times, of an optical structure for use in augmented reality (and/or mixed reality) eyewear which enables the display of relatively-opaque virtual objects in different areas of a person's field of view at different times, while providing the person with a relatively-clear view of their environment in the rest of their field of view. This optical structure has one (e.g. distal) electroconductive component (or layer) and a selectively-reflective component.

The right portion of each of these figures shows a person's eye 2601, a virtual-image display 2602, and a multi-layer disk-shaped optical structure with a proximal component 2606 (closer to a person's eye) and a distal component (farther from the person's eye) 2605. The left portion of each of these figures shows expanded views of: the proximal component which comprises a plurality (e.g. array, grid, mesh, or matrix) of individual reflective elements, including 2603; and the distal component which comprises a plurality (e.g. array, grid, mesh, or matrix) of transparent or translucent electroconductive pathways (e.g. microwires), including 2604.

FIG. 24 shows this optical structure at a first time wherein all of the individual reflective elements are in a first configuration which allows environmental light to pass through the optical structure to the person's eye. FIG. 25 shows this optical structure at a second time wherein a first selected subset of the reflective elements are in a second configuration which blocks (or reduces) environmental light from passing through a selected first area of the optical structure and reflects light from the virtual-object display from this first area to the person's eye. This displays a relatively-opaque virtual object in this first area in the person's field of view. The rest of the reflective elements remain in the first configuration to allow a clear view of the environment. FIG. 26 shows this optical structure at a third time wherein a second selected subset of the reflective elements are in a second configuration which blocks (or reduces) environmental light from passing through a selected second area of the optical structure and reflects light from the virtual-object display from this second area to the person's eye. This displays a relatively-opaque virtual object in this second area in the person's field of view. The rest of the reflective elements remain in the first configuration to allow a clear view of the environment.

With respect to specific components, FIGS. 26 through 28 show three oblique expanded views, at three different times, of an optical structure for use in augmented reality (and/or mixed reality) eyewear comprising: a distal electroconductive component (or layer) 2605 which is a first average distance from a person's eye 2601, wherein the distal electroconductive component further comprises a plurality of electroconductive pathways (e.g. microwires) including 2604, and wherein the distal electroconductive component is substantially-transparent (e.g. transparent or translucent); a proximal selectively-reflective component (or layer) 2606 which is a second distance from the person's eye, wherein the second distance is less than the first distance, wherein the selectively-reflective component further comprises a plurality of reflective elements (e.g. micromirrors) including 2603, wherein a selected subset of individual reflective elements (e.g. micromirrors) can be rotated between a first configuration and a second configuration, wherein the first configuration allows a first amount of light from the environment to pass through a selected area of the selectively-reflective component, wherein the second configuration allows a second amount of light from the environment to pass through the selected area of the selectively-reflective component, wherein the second amount is less than the first amount, and wherein a selected subset of individual reflective elements (e.g. micromirrors) can be rotated between the first configuration and the second configuration by transmission of electrical energy through the distal electroconductive component; and a virtual-object display 2602, wherein individual reflective elements (e.g. micromirrors) in the first configuration reflect from the selected area a first amount of light from the virtual-object display toward the person's eye, wherein individual reflective elements (e.g. micromirrors) in the second configuration reflect from the selected area a second amount of light from the virtual-object display toward the person's eye, wherein the second amount is greater than the first amount, and wherein reflection of light from the virtual-object display causes a virtual object to be displayed in the person's field of view. In an variation on this example, the proximal-vs.-distal locations of the electroconductive component and the selectively-reflective component can be switched, wherein the electroconductive component is proximal and the selectively-reflective component is distal.

In an example, a distal electroconductive component (or layer) can comprise an array (e.g. array, grid, mesh, or matrix) of transparent conductive oxide pathways. In an example, a distal electroconductive component (or layer) can comprise an array (e.g. array, grid, mesh, or matrix) of transparent or translucent electroconductive microwires. In an example, a distal electroconductive component (or layer) can comprise an array (e.g. array, grid, mesh, or matrix) of conductive liquid pathways. In an example, a distal electroconductive component (or layer) can comprise an array (e.g. array, grid, mesh, or matrix) of conductive (elastomeric) polymer pathways. In an example, a distal electroconductive component (or layer) can comprise an array (e.g. array, grid, mesh, or matrix) of electroconductive pathways made from (elastomeric) polymer which has been embedded, impregnated, or coated with conductive particles.

In an example, a distal electroconductive component (or layer) can comprise a latitude and longitude array, grid, mesh, or matrix of substantially-transparent (e.g. transparent or translucent) electroconductive pathways (e.g. microwires), wherein transmission of electrical energy through a selected latitude pathway and a selected longitude pathway creates an electromagnetic field at the intersection of those pathways (e.g. microwires), which in turn rotates a reflective element near (e.g. adjacent to) that intersection. In an example, transmission of electrical energy through a selected subset of electroconductive pathways (e.g. microwires) can rotate two or more reflective elements (e.g. micromirrors) from their first configurations to their second configurations (or vice versa).

In an example, transmission of electrical energy through a distal electroconductive component can create a localized electromagnetic field which rotates one or more nearby (e.g. adjacent) reflective elements (e.g. micromirrors). In an example, a distal electroconductive component (or layer) can comprise a radial (e.g. hub and spoke) array, grid, mesh, or matrix of substantially-transparent (e.g. transparent or translucent) electroconductive pathways (e.g. microwires). In an example, inter-pathway distances in a distal electroconductive component can be between 50% and 150% of the widths of adjacent reflective elements (e.g. micromirrors).

In an example, a distal electroconductive component can be arcuate. In an example, a distal electroconductive component (or layer) can comprise an orthogonal array, grid, mesh, or matrix of substantially-transparent (e.g. transparent or translucent) electroconductive pathways (e.g. microwires), wherein pathways (e.g. microwires) which are closer to the center of the person's field of view are more densely-distributed than pathways (e.g. microwires) which are farther from this center. In an example, inter-pathway distances in a distal electroconductive component can be between 80% and 120% of the lengths of adjacent reflective elements (e.g. micromirrors).

In an example, a distal electroconductive component can have a shape which is a section of a sphere or ellipsoid. In an example, a distal electroconductive component can have a conic section shape. In an example, a distal electroconductive component can have a concave shape with a proximal-facing opening. In an example, inter-pathway distances in a distal electroconductive component can be equal to the widths of reflective elements (e.g. micromirrors). In an example, inter-pathway distances in a distal electroconductive component can be between 80% and 120% of the lengths of reflective elements (e.g. micromirrors).

In an example, transmission of electrical energy through a selected subset of electroconductive pathways (e.g. microwires) can move (e.g. rotate and/or pivot) a subset of reflective elements (e.g. micromirrors) from their first configurations to their second configurations (or vice versa), wherein the subset of reflective elements collectively comprises a polygonal-shaped (e.g. quadrilateral) area. In an example, transmission of electrical energy through a selected subset of electroconductive pathways (e.g. microwires) can move (e.g. rotate and/or pivot) a subset of reflective elements (e.g. micromirrors) from their first configurations to their second configurations (or vice versa), wherein the subset of reflective elements collectively comprises an area with an irregularly-shaped perimeter.

In an example, transmission of electrical energy through a selected subset of electroconductive pathways (e.g. microwires) can move (e.g. rotate and/or pivot) a subset of reflective elements (e.g. micromirrors) from their first configurations to their second configurations (or vice versa), wherein the subset of reflective elements collectively comprises an area with a perimeter which matches (and aligns with) the perimeter of a displayed virtual object. In an example, a distal electroconductive component can be a layer of an optical structure. In an example, inter-pathway distances in a distal electroconductive component can be between 50% and 150% of the lengths of reflective elements (e.g. micromirrors).

In an example, proximal and distal electroconductive components can comprise different electrical charges and/or magnetic poles. In an example, proximal and distal electroconductive components can comprise different electrical charges and/or magnetic poles, wherein transmission of electrical energy through a selected subset of conductive pathways (e.g. microwires) in them causes a selected subset of reflective elements to rotate into alignment with an electromagnetic field generated by these different electrical charges and/or magnetic poles. In an example, proximal and distal electroconductive components (e.g. layers) can be substantially equidistant (e.g. parallel) relative to each other.

In an example, a distal electroconductive component (or layer) can comprise a latitude and longitude array, grid, mesh, or matrix of substantially-transparent (e.g. transparent or translucent) electroconductive pathways (e.g. microwires). In an example, a distal electroconductive component (or layer) can comprise a honeycomb (e.g. hexagonal element) array, grid, mesh, or matrix of substantially-transparent (e.g. transparent or translucent) electroconductive pathways (e.g. microwires). In an example, inter-pathway distances in a distal electroconductive component can be equal to the lengths of adjacent reflective elements (e.g. micromirrors). In an example, the distance between proximal and distal electroconductive components (e.g. layers) can vary (e.g. decrease) with distance from the virtual-image display.

In an example, a distal electroconductive component (or layer) can comprise an orthogonal array, grid, mesh, or matrix of substantially-transparent (e.g. transparent or translucent) electroconductive pathways (e.g. microwires), wherein pathways (e.g. microwires) which are closer to the center of the person's field of view are closer together than pathways (e.g. microwires) which are farther from this center. In an example, transmission of electrical energy through a selected subset of electroconductive pathways (e.g. microwires) can rotate a single reflective element (e.g. micromirror) from its first configuration to its second configuration (or vice versa). In an example, the distance between proximal and distal electroconductive components (e.g. layers) can vary (e.g. decrease) with distance from the center of the electroconductive components.

In an example, a distal electroconductive component (or layer) can comprise an orthogonal array, grid, mesh, or matrix of substantially-transparent (e.g. transparent or translucent) electroconductive pathways (e.g. microwires). In an example, transmission of electrical energy through intersecting electroconductive pathways (e.g. microwires) causes one or more reflective elements (e.g. micromirrors) near (e.g. adjacent to) the intersection of these pathways (e.g. microwires) to move (e.g. rotate and/or pivot) between their first and second configurations.

In an example, a distal electroconductive component (or layer) can comprise an orthogonal (e.g. row and column) array, grid, mesh, or matrix of substantially-transparent (e.g. transparent or translucent) electroconductive pathways (e.g. microwires), where transmission of electrical energy through a selected row and a selected column creates an electromagnetic field at the intersection of that row and column which rotates a reflective element near (e.g. adjacent to) that intersection. In an example, the distance between proximal and distal electroconductive components (e.g. layers) can vary (e.g. increase) with distance from the center of the electroconductive components.

In an example, a distal electroconductive component (or layer) can comprise an orthogonal array, grid, mesh, or matrix of substantially-transparent (e.g. transparent or translucent) electroconductive pathways (e.g. microwires), wherein pathways (e.g. microwires) which are closer to the center of the array are closer together than pathways (e.g. microwires) which are farther from this center. In an example, a distal electroconductive component (or layer) can be substantially-parallel to a selectively-reflective component (or layer). In an example, the distance between proximal and distal electroconductive components (e.g. layers) can vary (e.g. increase) with distance from the virtual-image display.

In an example, a selectively-reflective component can comprise an arcuate array of individual reflective elements.

In an example, individual reflective elements can be mirrors (e.g. micromirrors). In an example, these reflective elements can be individually and selectively changed (e.g. rotated and/or pivoted) from first configurations to second configurations, or vice versa. In an example, a subset of these reflective elements can be selectively changed (e.g. rotated and/or pivoted) from first configurations to second configurations, or vice versa. In an example, this subset of reflective elements can collectively align with the location and shape of a virtual object displayed in a person's field of view. In an example, subsets of individual reflective elements can be selected and moved to display relatively-opaque virtual objects in a person's field of view by reflecting light rays from a virtual-object display to the person's eye and to selectively block environmental light rays from reaching the person's eye in the area where the virtual object is displayed.

In an example, (the perimeter of) a selectively-reflective component can have a conic section shape. In an example, reflective elements can be rotated by an acute angle. In an example, reflective elements can pivot around joints. In an example, reflective elements can be responsive to an electromagnetic field, wherein they rotate and/or pivot when exposed to an electromagnetic field. In an example, the angles by which reflective elements are rotated from their first configurations to their second configurations can vary with increased distance from a virtual-object display. In an example, the angles by which reflective elements are rotated from their first configurations to their second configurations can decrease with increased distance from a virtual-object display.

In an example, an optical structure can further comprise an array of joints around which individual reflective elements (e.g. micromirrors) rotate and/or pivot. In an example, both sides of a reflective element can reflect light. In an example, a reflective element can be transflective. In an example, a reflective element in its first configuration allows light from the environment to pass through a selected area of the selectively-reflective component and the reflective element in its second configuration does not allow light from the environment to pass through the selected area of the selectively-reflective component.

In an example, a selectively-reflective component can comprise an array, grid, mesh, or matrix of individual reflective elements (e.g. micromirrors). In an example, individual reflective elements can have flat reflective sides. In an example, one side of a reflective element can be more reflective than the other side. In an example, a proximal side of a reflective element can be more reflective than a distal side of the reflective element. In an example, individual reflective elements can have curved reflective sides. In an example, a reflective element can be magnetic. In an example, individual reflective elements can align with the application of an electromagnetic field.

In an example, individual reflective elements which are closer to the center of the selectively-reflective component can be closer together than elements which are farther from this center. In an example, reflective elements (e.g. micromirrors) can overlap each other in their second configurations. In an example, reflective elements can be rotated around their centroids. In an example, a reflective element can be magnetic, wherein it rotates or pivots to become aligned with an electromagnetic field which is created by transmission of electrical energy through proximal and/or distal electroconductive components. In an example, the angles by which reflective elements are rotated from their first configurations to their second configurations can be a quadratic function of their distance from a virtual-object display.

In an example, individual reflective elements which are closer to the center of a selectively-reflective component can be smaller than elements which are farther from this center. In an example, individual reflective elements which are farther from the center of the selectively-reflective component can be farther apart than elements which are closer to this center. In an example, a selected subset of reflective elements can be changed from their first configurations to their second configurations in order to block the transmission of environmental light through the area of a selectively-reflective component which they collectively span.

In an example, a selected subset of reflective elements can be changed from their first configurations to their second configurations, thereby blocking the transmission of environmental light through the area of a selectively-reflective component which they collectively span, wherein the location and perimeter of this area corresponds to the location and perimeter of a virtual object displayed in a person's field of view. In an example, individual reflective elements which are father from the center of the selectively-reflective component can be larger than elements which are closer to this center.

In an example, a reflective element can reflect a portion (e.g. pixel) of a virtual object from the virtual-object display to the person's eye when the element is in its second configuration. In an example, a reflective element in its first configuration allows a first amount of light from the environment to pass through a selected area of the selectively-reflective component and the reflective element in its second configuration allows a second amount of light from the environment to pass through the selected area of the selectively-reflective component, wherein the second amount is less than 50% of the first amount.

In an example, a reflective element in its first configuration allows a first amount of light from the environment to pass through a selected area of the selectively-reflective component and the reflective element in its second configuration allows a second amount of light from the environment to pass through the selected area of the selectively-reflective component, wherein the second amount is less than the first amount. In an example, reflective elements can be suspended in a fluid (e.g. liquid). In an example, (the perimeter of) a selectively-reflective component can have an arcuate shape. In an example, reflective elements can be rotated around their central axes. In an example, (the perimeter of) a selectively-reflective component can have a shape which is a section of a sphere or ellipsoid.

In an example, reflective elements can be pivoted around first ends of their longitudinal axes. In an example, a reflective element can be a mirror. In an example, a reflective element in its first configuration allows a first amount of light from the environment to pass through a selected area of the selectively-reflective component and the reflective element in its second configuration allows a second amount of light from the environment to pass through the selected area of the selectively-reflective component, wherein the second amount is less than 75% of the first amount.

In an example, a longitudinal axis of a reflective element (e.g. micromirror) in its first configuration can be substantially-parallel to a radial vector extending out from a person's eye (e.g. from the center of the eye pupil). In an example, a reflective element can be a one-way mirror. In an example, individual reflective elements (e.g. micromirrors) can be selectively rotated (e.g. rotated or pivoted) between first and second configurations. In an example, an optical structure can further comprise an array of axles around which individual reflective elements (e.g. micromirrors) rotate. In an example, these axles can be vertical. In an example, these axles can be horizontal. In an example, some of these axles can be vertical and some of these axles can be horizontal.

In an example, reflective elements in their second configurations can collectively form a portion of a Fresnel reflector. In an example, a first vector extends from (the center of) a reflective element to (the center of) a person's eye and a second vector extends from (the center of) the reflective element to (the center of) a virtual-object display, wherein a longitudinal axis of the reflective element is substantially-orthogonal to a third vector which is (midway) between the first and second vectors. In an example, a selected subset of individual reflective elements (e.g. micromirrors) can be selectively rotated (e.g. rotated or pivoted) from their first configurations to their second configurations.

In an example, a first vector extends from (the center of) a reflective element to (the center of) a person's eye and a second vector extends from (the center of) the reflective element to (the center of) a virtual-object display, wherein a longitudinal axis of the reflective element can be substantially-orthogonal to a third vector which bisects the angle between the first and second vectors. In an example, a selected subset of individual reflective elements (e.g. micromirrors) can be selectively rotated (e.g. rotated or pivoted) from their first configurations to their second configurations, wherein in their second configurations the selected subset of reflective elements can have a combined perimeter which overlaps the perimeter of a displayed virtual object. In an example, reflective elements can rotate and/or pivot around axles.

In an example, the angles by which reflective elements are rotated from their first configurations to their second configurations can be a linear function of their distance from a virtual-object display. In an example, a reflective element can be a partial mirror. In an example, a reflective element in its first configuration allows a first amount of light from the environment to pass through a selected area of the selectively-reflective component and the reflective element in its second configuration allows a second amount of light from the environment to pass through the selected area of the selectively-reflective component, wherein the second amount is less than 25% of the first amount.

In an example, a selectively-reflective component can be substantially-parallel to a distal electroconductive component. In an example, individual reflective elements in a selectively-reflective component can be evenly-distributed (e.g. equidistant) across the selectively-reflective component. In an example, the angles by which reflective elements are rotated from their first configurations to their second configurations can increase with increased distance from a virtual-object display. In an example, a first vector extends from (the longitudinal center of) a reflective element to (the center of) a person's eye and a second vector extends from (the longitudinal center of) the reflective element to (the center of) a virtual-object display, wherein a longitudinal axis of the reflective element can be substantially-orthogonal to a third vector which is (midway) between the first and second vectors.

In an example, a selected subset of individual reflective elements (e.g. micromirrors) can be rotated (e.g. rotated or pivoted) from their first configurations to their second configurations, wherein in their second configurations the selected subset of reflective elements have a collective perimeter which matches the perimeter of a displayed virtual object. In an example, individual reflective elements in a selectively-reflective component can all be the same size. In an example, the angles by which reflective elements are rotated from their first configurations to their second configurations can be a function of their distance from a virtual-object display.

In an example, a virtual-object display can comprise an array, grid, mesh, or matrix of light emitters. In an example, a virtual-object display can comprise an array of Light Emitting Diodes (LEDs). In an example, a virtual-object display can comprise an array of micro Light Emitting Diodes (uLEDs). In an example, a virtual-object display can comprise an array of Organic Light Emitting Diodes (OLEDs). In an example, a virtual-object display can comprise an array of laser diodes. In an example one or more light emitters in a virtual-object display can be selected from the group consisting of: Light Emitting Diode (LED); Laser Diode; Liquid Crystal Virtual-object display (LCD); Liquid-Crystal-On-Silicon (LCoS) virtual-object display; Micro Light-Emitting Diode (Micro-LED); Organic Light-Emitting Diode (OLED); and Vertical Cavity Surface Emitting Laser (VCSEL).

In an example, a virtual-object display be selected from the group consisting of: active-matrix organic light-emitting diode array, projector, or display; collimated light projector or display; digital micro-mirror array, projector, or display; diode laser array, projector, or display; ferroelectric liquid crystal on silicon array, projector, or display; holographic projector or display. In an example, a display can be selected from the group consisting of: light emitting diode array, projector, or display; liquid crystal display array, projector, or display; liquid crystal on silicon array, projector, or display; low-power (e.g. nano-watt) laser projector or display; and display and/or microprojector.

In an example, a virtual-object display can be located on a sidepiece ("temple") of an eyewear frame. In an example, a virtual-object display can be located along the inside (body-facing) surface of a sidepiece ("temple") of an eyewear frame. In an example, a virtual-object display can be located on a portion of a front piece of an eyewear frame on the perimeter of a lens. In an example, a virtual object virtual-object display can be located on the portion of a front piece of an eyewear frame which is to the right or left of a lens.

In an example, this optical structure can be part of an overall near-eye wearable device (e.g. eyewear and/or eyeglasses) or system. In an example, there can be symmetric versions of this optical structure in front of a person's right and left eyes. In an example, this optical structure can be part of an overall an overall near-eye wearable device (e.g. eyewear and/or eyeglasses) or multi-device system. In an example, this device or multi-device system can further comprise one or more components selected from the group consisting of: (wireless) data receiver; (wireless) data transmitter; acoustic speaker; beam splitter; camera; concave lens; convex lens; curved mirror; data processor; EEG sensor; electrical actuator; electrochromic layer; eyewear (e.g. eyeglasses) front piece; eyewear (e.g. eyeglasses) sidepieces (e.g. temples); in-coupler; infrared light detector; infrared light emitter; laser scanner; lens; liquid crystal diode; liquid lens; microlens array; microphone; motion sensor; out-coupler; planoconcave lens; power source (e.g. battery); prism; remote data processor; smart ring; smart watch; cell phone; spectroscopic sensor; spherical lens; touch screen; lens with adjustable focal length; vibrating element; and waveguide. Example variations discussed elsewhere in this disclosure or in priority-linked disclosures can also be applied to this example where relevant.

Figure 29:
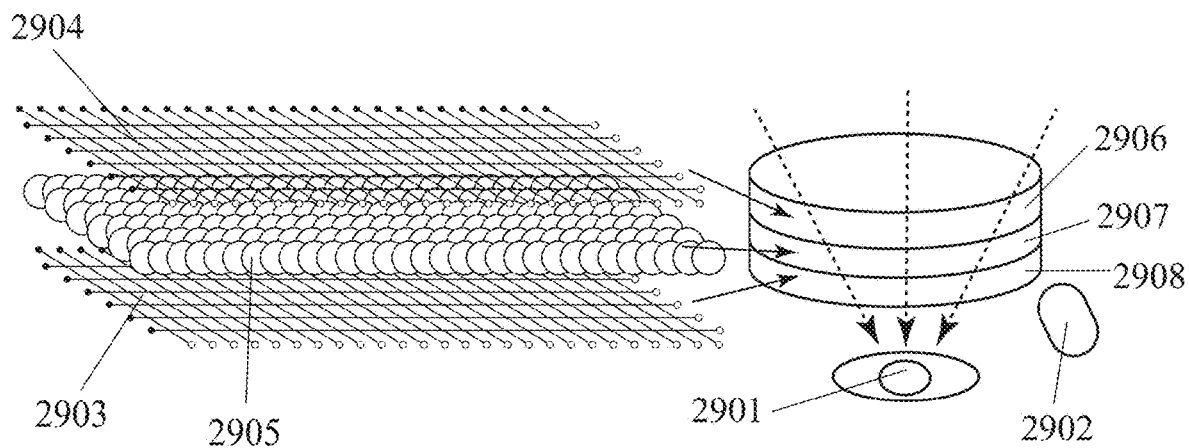
FIGS. 29 through 31 show an expanded view of an optical structure with two electroconductive layers, a selectively-transparent layer comprising reflective elements, and a virtual-object display.
Figure 30:
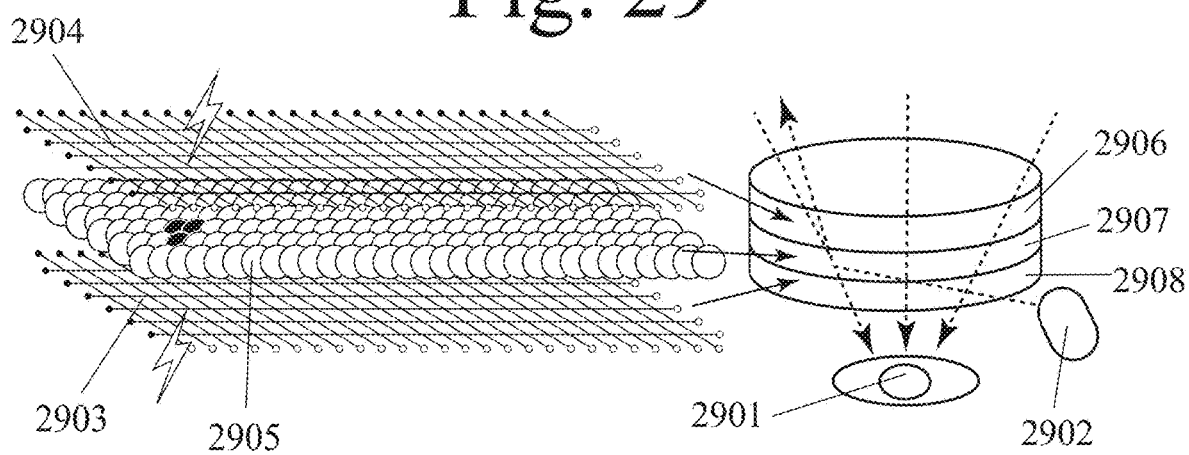
Figure 31:
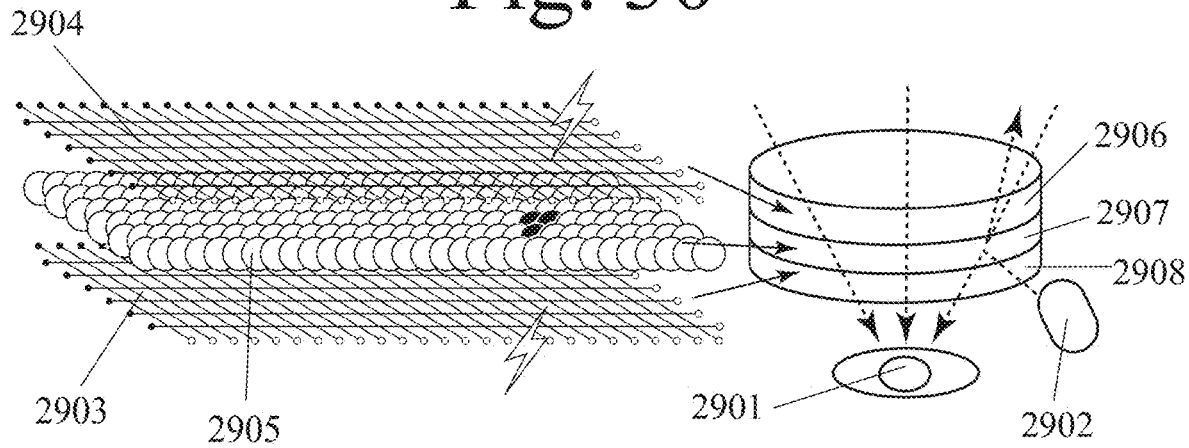

FIGS. 29 through 31 show three oblique views, at three different times, of an optical structure for use in augmented reality (and/or mixed reality) eyewear which enables the display of relatively-opaque virtual objects in different areas of a person's field of view at different times, while providing the person with a relatively-clear view of their environment in the rest of their field of view. This optical structure has two (e.g. proximal and distal) electroconductive components (e.g. layers) and a selectively-reflective component.

The right portion of each of these figures shows a person's eye 2901, a virtual-image display 2902, and a multi-layer disk-shaped optical structure with a proximal (closer to a person's eye) electroconductive component (or layer) 2908, a distal (farther from the person's eye) electroconductive component (or layer) 2906, and a selectively-reflective component 2907 between the proximal and distal electroconductive components. The left portion of each of these figures shows expanded views of: the proximal electroconductive component which comprises a plurality (e.g. array, grid, mesh, or matrix) of individual reflective elements, including 2903; the distal electroconductive component which comprises a plurality (e.g. array, grid, mesh, or matrix) of individual reflective elements, including 2904; and the selective-reflective component which comprises a plurality (e.g. array, grid, mesh, or matrix) of individual reflective elements, including 2905.

FIG. 29 shows this optical structure at a first time wherein all of the individual reflective elements are in a first configuration which allows environmental light to pass through the optical structure to the person's eye. FIG. 30 shows this optical structure at a second time wherein a first selected subset of the reflective elements are in a second configuration which blocks (or reduces) environmental light from passing through a selected first area of the optical structure and reflects light from the virtual-object display from this first area to the person's eye. This displays a relatively-opaque virtual object in this first area in the person's field of view. The rest of the reflective elements remain in the first configuration to allow a clear view of the environment. FIG. 31 shows this optical structure at a third time wherein a second selected subset of the reflective elements are in a second configuration which blocks (or reduces) environmental light from passing through a selected second area of the optical structure and reflects light from the virtual-object display from this second area to the person's eye. This displays a relatively-opaque virtual object in this second area in the person's field of view. The rest of the reflective elements remain in the first configuration to allow a clear view of the environment.

With respect to specific components, FIGS. 29 through 31 show three oblique expanded views, at three different times, of an optical structure for use in augmented reality (and/or mixed reality) eyewear comprising: a proximal electroconductive component (or layer) 2908 which is a first average distance from a person's eye 2901, wherein the proximal electroconductive component further comprises a plurality of electroconductive pathways (e.g. microwires) including 2903, and wherein the proximal electroconductive component is substantially-transparent (e.g. transparent or translucent); a distal electroconductive component (or layer) 2906 which is a second average distance from the person's eye, wherein the proximal electroconductive component further comprises a plurality of electroconductive pathways (e.g. microwires) including 2904, wherein the proximal electroconductive component is substantially-transparent (e.g. transparent or translucent), and wherein the second distance is greater than the first distance; a selectively-reflective component (or layer) 2907 which is between the proximal electroconductive component and the distal electroconductive component, wherein the selectively-reflective component further comprises a plurality of reflective elements (e.g. micromirrors) including 2905, wherein a selected subset of individual reflective elements (e.g. micromirrors) can be rotated between a first configuration and a second configuration, wherein the first configuration allows a first amount of light from the environment to pass through a selected area of the selectively-reflective component, wherein the second configuration allows a second amount of light from the environment to pass through the selected area of the selectively-reflective component, wherein the second amount is less than the first amount, and wherein a selected subset of individual reflective elements (e.g. micromirrors) can be rotated between the first configuration and the second configuration by transmission of electrical energy through the proximal electroconductive component and/or the distal electroconductive component; and a virtual-object display 2902, wherein individual reflective elements (e.g. micromirrors) in the first configuration reflect from the selected area a first amount of light from the virtual-object display toward the person's eye, wherein individual reflective elements (e.g. micromirrors) in the second configuration reflect from the selected area a second amount of light from the virtual-object display toward the person's eye, wherein the second amount is greater than the first amount, and wherein reflection of light from the virtual-object display causes a virtual object to be displayed in the person's field of view.

In an example, a proximal or distal electroconductive component (or layer) can comprise an array (e.g. array, grid, mesh, or matrix) of transparent conductive oxide pathways. In an example, a proximal or distal electroconductive component (or layer) can comprise an array (e.g. array, grid, mesh, or matrix) of transparent or translucent electroconductive microwires. In an example, a proximal or distal electroconductive component (or layer) can comprise an array (e.g. array, grid, mesh, or matrix) of conductive liquid pathways. In an example, a proximal or distal electroconductive component (or layer) can comprise an array (e.g. array, grid, mesh, or matrix) of conductive (elastomeric) polymer pathways. In an example, a proximal or distal electroconductive component (or layer) can comprise an array (e.g. array, grid, mesh, or matrix) of electroconductive pathways made from (elastomeric) polymer which has been embedded, impregnated, or coated with conductive particles.

In an example, a proximal or distal electroconductive component (or layer) can comprise a latitude and longitude array, grid, mesh, or matrix of substantially-transparent (e.g. transparent or translucent) electroconductive pathways (e.g. microwires), wherein transmission of electrical energy through a selected latitude pathway and a selected longitude pathway creates an electromagnetic field at the intersection of those pathways (e.g. microwires), which in turn rotates a reflective element near (e.g. adjacent to) that intersection. In an example, transmission of electrical energy through a selected subset of electroconductive pathways (e.g. microwires) can rotate two or more reflective elements (e.g. micromirrors) from their first configurations to their second configurations (or vice versa).

In an example, transmission of electrical energy through a proximal or distal electroconductive component can create a localized electromagnetic field which rotates one or more nearby (e.g. adjacent) reflective elements (e.g. micromirrors). In an example, a proximal or distal electroconductive component (or layer) can comprise a radial (e.g. hub and spoke) array, grid, mesh, or matrix of substantially-transparent (e.g. transparent or translucent) electroconductive pathways (e.g. microwires). In an example, inter-pathway distances in a proximal or distal electroconductive component can be between 50% and 150% of the widths of adjacent reflective elements (e.g. micromirrors).

In an example, a proximal or distal electroconductive component can be arcuate. In an example, a proximal or distal electroconductive component (or layer) can comprise an orthogonal array, grid, mesh, or matrix of substantially-transparent (e.g. transparent or translucent) electroconductive pathways (e.g. microwires), wherein pathways (e.g. microwires) which are closer to the center of the person's field of view are more densely-distributed than pathways (e.g. microwires) which are farther from this center. In an example, inter-pathway distances in a proximal or distal electroconductive component can be between 80% and 120% of the lengths of adjacent reflective elements (e.g. micromirrors).

In an example, a proximal or distal electroconductive component can have a shape which is a section of a sphere or ellipsoid. In an example, a proximal or distal electroconductive component can have a conic section shape. In an example, a proximal or distal electroconductive component can have a concave shape with a proximal-facing opening. In an example, inter-pathway distances in a proximal or distal electroconductive component can be equal to the widths of reflective elements (e.g. micromirrors). In an example, inter-pathway distances in a proximal or distal electroconductive component can be between 80% and 120% of the lengths of reflective elements (e.g. micromirrors).

In an example, transmission of electrical energy through a selected subset of electroconductive pathways (e.g. microwires) can move (e.g. rotate and/or pivot) a subset of reflective elements (e.g. micromirrors) from their first configurations to their second configurations (or vice versa), wherein the subset of reflective elements collectively comprises a polygonal-shaped (e.g. quadrilateral) area. In an example, transmission of electrical energy through a selected subset of electroconductive pathways (e.g. microwires) can move (e.g. rotate and/or pivot) a subset of reflective elements (e.g. micromirrors) from their first configurations to their second configurations (or vice versa), wherein the subset of reflective elements collectively comprises an area with an irregularly-shaped perimeter.

In an example, transmission of electrical energy through a selected subset of electroconductive pathways (e.g. microwires) can move (e.g. rotate and/or pivot) a subset of reflective elements (e.g. micromirrors) from their first configurations to their second configurations (or vice versa), wherein the subset of reflective elements collectively comprises an area with a perimeter which matches (and aligns with) the perimeter of a displayed virtual object. In an example, a proximal or distal electroconductive component can be a layer of an optical structure. In an example, inter-pathway distances in a proximal or distal electroconductive component can be between 50% and 150% of the lengths of reflective elements (e.g. micromirrors).

In an example, proximal and distal electroconductive components can comprise different electrical charges and/or magnetic poles. In an example, proximal and distal electroconductive components can comprise different electrical charges and/or magnetic poles, wherein transmission of electrical energy through a selected subset of conductive pathways (e.g. microwires) in them causes a selected subset of reflective elements to rotate into alignment with an electromagnetic field generated by these different electrical charges and/or magnetic poles. In an example, proximal and distal electroconductive components (e.g. layers) can be substantially equidistant (e.g. parallel) relative to each other.

In an example, a proximal or distal electroconductive component (or layer) can comprise a latitude and longitude array, grid, mesh, or matrix of substantially-transparent (e.g. transparent or translucent) electroconductive pathways (e.g. microwires). In an example, a proximal or distal electroconductive component (or layer) can comprise a honeycomb (e.g. hexagonal element) array, grid, mesh, or matrix of substantially-transparent (e.g. transparent or translucent) electroconductive pathways (e.g. microwires). In an example, inter-pathway distances in a proximal or distal electroconductive component can be equal to the lengths of adjacent reflective elements (e.g. micromirrors). In an example, the distance between proximal and distal electroconductive components (e.g. layers) can vary (e.g. decrease) with distance from the virtual-image display.

In an example, a proximal or distal electroconductive component (or layer) can comprise an orthogonal array, grid, mesh, or matrix of substantially-transparent (e.g. transparent or translucent) electroconductive pathways (e.g. microwires), wherein pathways (e.g. microwires) which are closer to the center of the person's field of view are closer together than pathways (e.g. microwires) which are farther from this center. In an example, transmission of electrical energy through a selected subset of electroconductive pathways (e.g. microwires) can rotate a single reflective element (e.g. micromirror) from its first configuration to its second configuration (or vice versa). In an example, the distance between proximal and distal electroconductive components (e.g. layers) can vary (e.g. decrease) with distance from the center of the electroconductive components.

In an example, a proximal or distal electroconductive component (or layer) can comprise an orthogonal array, grid, mesh, or matrix of substantially-transparent (e.g. transparent or translucent) electroconductive pathways (e.g. microwires). In an example, transmission of electrical energy through intersecting electroconductive pathways (e.g. microwires) causes one or more reflective elements (e.g. micromirrors) near (e.g. adjacent to) the intersection of these pathways (e.g. microwires) to move (e.g. rotate and/or pivot) between their first and second configurations.

In an example, a proximal or distal electroconductive component (or layer) can comprise an orthogonal (e.g. row and column) array, grid, mesh, or matrix of substantially-transparent (e.g. transparent or translucent) electroconductive pathways (e.g. microwires), where transmission of electrical energy through a selected row and a selected column creates an electromagnetic field at the intersection of that row and column which rotates a reflective element near (e.g. adjacent to) that intersection. In an example, the distance between proximal and distal electroconductive components (e.g. layers) can vary (e.g. increase) with distance from the center of the electroconductive components.

In an example, a proximal or distal electroconductive component (or layer) can comprise an orthogonal array, grid, mesh, or matrix of substantially-transparent (e.g. transparent or translucent) electroconductive pathways (e.g. microwires), wherein pathways (e.g. microwires) which are closer to the center of the array are closer together than pathways (e.g. microwires) which are farther from this center. In an example, a proximal or distal electroconductive component (or layer) can be substantially-parallel to a selectively-reflective component (or layer). In an example, the distance between proximal and distal electroconductive components (e.g. layers) can vary (e.g. increase) with distance from the virtual-image display.

In an example, a selectively-reflective component can comprise an arcuate array of individual reflective elements. In an example, individual reflective elements can be mirrors (e.g. micromirrors). In an example, these reflective elements can be individually and selectively changed (e.g. rotated and/or pivoted) from first configurations to second configurations, or vice versa. In an example, a subset of these reflective elements can be selectively changed (e.g. rotated and/or pivoted) from first configurations to second configurations, or vice versa. In an example, this subset of reflective elements can collectively align with the location and shape of a virtual object displayed in a person's field of view. In an example, subsets of individual reflective elements can be selected and moved to display relatively-opaque virtual objects in a person's field of view by reflecting light rays from a virtual-object display to the person's eye and to selectively block environmental light ray's from reaching the person's eye in the area where the virtual object is displayed.

In an example, (the perimeter of) a selectively-reflective component can have a conic section shape. In an example, reflective elements can be rotated by an acute angle. In an example, reflective elements can pivot around joints. In an example, reflective elements can be responsive to an electromagnetic field, wherein they rotate and/or pivot when exposed to an electromagnetic field. In an example, the angles by which reflective elements are rotated from their first configurations to second configurations can vary with increased distance from a virtual-object display. In an example, the angles by which reflective elements are rotated from their first configurations to their second configurations can decrease with increased distance from a virtual-object display.

In an example, an optical structure can further comprise an array of joints around which individual reflective elements (e.g. micromirrors) rotate and/or pivot. In an example, both sides of a reflective element can reflect light. In an example, a reflective element can be transflective. In an example, a reflective element in its first configuration allows light from the environment to pass through a selected area of the selectively-reflective component and the reflective element in its second configuration does not allow light from the environment to pass through the selected area of the selectively-reflective component.

In an example, a selectively-reflective component can comprise an array, grid, mesh, or matrix of individual reflective elements (e.g. micromirrors). In an example, individual reflective elements can have flat reflective sides. In an example, one side of a reflective element can be more reflective than the other side. In an example, a proximal side of a reflective element can be more reflective than a distal side of the reflective element. In an example, individual reflective elements can have curved reflective sides. In an example, a reflective element can be magnetic. In an example, individual reflective elements can align with the application of an electromagnetic field.

In an example, individual reflective elements which are closer to the center of the selectively-reflective component can be closer together than elements which are farther from this center. In an example, reflective elements (e.g. micromirrors) can overlap each other in their second configurations. In an example, reflective elements can be rotated around their centroids. In an example, a reflective element can be magnetic, wherein it rotates or pivots to become aligned with an electromagnetic field which is created by transmission of electrical energy through proximal and/or distal electroconductive components. In an example, the angles by which reflective elements are rotated from their first configurations to their second configurations can be a quadratic function of their distance from a virtual-object display.

In an example, individual reflective elements which are closer to the center of a selectively-reflective component can be smaller than elements which are farther from this center. In an example, individual reflective elements which are farther from the center of the selectively-reflective component can be farther apart than elements which are closer to this center. In an example, a selected subset of reflective elements can be changed from their first configurations to their second configurations in order to block the transmission of environmental light through the area of a selectively-reflective component which they collectively span.

In an example, a selected subset of reflective elements can be changed from their first configurations to their second configurations, thereby blocking the transmission of environmental light through the area of a selectively-reflective component which they collectively span, wherein the location and perimeter of this area corresponds to the location and perimeter of a virtual object displayed in a person's field of view. In an example, individual reflective elements which are father from the center of the selectively-reflective component can be larger than elements which are closer to this center.

In an example, a reflective element can reflect a portion (e.g. pixel) of a virtual object from the virtual-object display to the person's eye when the element is in its second configuration. In an example, a reflective element in its first configuration allows a first amount of light from the environment to pass through a selected area of the selectively-reflective component and the reflective element in its second configuration allows a second amount of light from the environment to pass through the selected area of the selectively-reflective component, wherein the second amount is less than 50% of the first amount.

In an example, a reflective element in its first configuration allows a first amount of light from the environment to pass through a selected area of the selectively-reflective component and the reflective element in its second configuration allows a second amount of light from the environment to pass through the selected area of the selectively-reflective component, wherein the second amount is less than the first amount. In an example, reflective elements can be suspended in a fluid (e.g. liquid). In an example, (the perimeter of) a selectively-reflective component can have an arcuate shape. In an example, reflective elements can be rotated around their central axes. In an example, (the perimeter of) a selectively-reflective component can have a shape which is a section of a sphere or ellipsoid.

In an example, reflective elements can be pivoted around first ends of their longitudinal axes. In an example, a reflective element can be a mirror. In an example, a reflective element in its first configuration allows a first amount of light from the environment to pass through a selected area of the selectively-reflective component and the reflective element in its second configuration allows a second amount of light from the environment to pass through the selected area of the selectively-reflective component, wherein the second amount is less than 75% of the first amount. In an example, a selectively-reflective component can be between a proximal electroconductive component and a distal electroconductive component.

In an example, a longitudinal axis of a reflective element (e.g. micromirror) in its first configuration can be substantially-parallel to a radial vector extending out from a person's eye (e.g. from the center of the eye pupil). In an example, a reflective element can be a one-way mirror. In an example, individual reflective elements (e.g. micromirrors) can be selectively rotated (e.g. rotated or pivoted) between first and second configurations. In an example, an optical structure can further comprise an array of axles around which individual reflective elements (e.g. micromirrors) rotate. In an example, these axles can be vertical. In an example, these axles can be horizontal. In an example, some of these axles can be vertical and some of these axles can be horizontal.

In an example, reflective elements in their second configurations can collectively form a portion of a Fresnel reflector. In an example, a first vector extends from (the center of) a reflective element to (the center of) a person's eye and a second vector extends from (the center of) the reflective element to (the center of) a virtual-object display, wherein a longitudinal axis of the reflective element is substantially-orthogonal to a third vector which is (midway) between the first and second vectors. In an example, a selected subset of individual reflective elements (e.g. micromirrors) can be selectively rotated (e.g. rotated or pivoted) from their first configurations to their second configurations.

In an example, a first vector extends from (the center of) a reflective element to (the center of) a person's eye and a second vector extends from (the center of) the reflective element to (the center of) a virtual-object display, wherein a longitudinal axis of the reflective element can be substantially-orthogonal to a third vector which bisects the angle between the first and second vectors. In an example, a selected subset of individual reflective elements (e.g. micromirrors) can be selectively rotated (e.g. rotated or pivoted) from their first configurations to their second configurations, wherein in their second configurations the selected subset of reflective elements can have a combined perimeter which overlaps the perimeter of a displayed virtual object. In an example, reflective elements can rotate and/or pivot around axles.

In an example, the angles by which reflective elements are rotated from their first configurations to their second configurations can be a linear function of their distance from a virtual-object display. In an example, a reflective element can be a partial mirror. In an example, a reflective element in its first configuration allows a first amount of light from the environment to pass through a selected area of the selectively-reflective component and the reflective element in its second configuration allows a second amount of light from the environment to pass through the selected area of the selectively-reflective component, wherein the second amount is less than 25% of the first amount.

In an example, a selectively-reflective component can be substantially-parallel to a proximal electroconductive component and/or a distal electroconductive component. In an example, individual reflective elements in a selectively-reflective component can be evenly-distributed (e.g. equidistant) across the selectively-reflective component. In an example, the angles by which reflective elements are rotated from their first configurations to their second configurations can increase with increased distance from a virtual-object display. In an example, a first vector extends from (the longitudinal center of) a reflective element to (the center of) a person's eye and a second vector extends from (the longitudinal center of) the reflective element to (the center of) a virtual-object display, wherein a longitudinal axis of the reflective element can be substantially-orthogonal to a third vector which is (midway) between the first and second vectors.

In an example, a selected subset of individual reflective elements (e.g. micromirrors) can be rotated (e.g. rotated or pivoted) from their first configurations to their second configurations, wherein in their second configurations the selected subset of reflective elements have a collective perimeter which matches the perimeter of a displayed virtual object. In an example, individual reflective elements in a selectively-reflective component can all be the same size. In an example, the angles by which reflective elements are rotated from their first configurations to their second configurations can be a function of their distance from a virtual-object display.

In an example, a virtual-object display can comprise an array, grid, mesh, or matrix of light emitters. In an example, a virtual-object display can comprise an array of Light Emitting Diodes (LEDs). In an example, a virtual-object display can comprise an array of micro Light Emitting Diodes (uLEDs). In an example, a virtual-object display can comprise an array of Organic Light Emitting Diodes (OLEDs). In an example, a virtual-object display can comprise an array of laser diodes. In an example one or more light emitters in a virtual-object display can be selected from the group consisting of: Light Emitting Diode (LED); Laser Diode; Liquid Crystal Virtual-object display (LCD); Liquid-Crystal-On-Silicon (LCoS) virtual-object display; Micro Light-Emitting Diode (Micro-LED); Organic Light-Emitting Diode (OLED); and Vertical Cavity Surface Emitting Laser (VCSEL).

In an example, a virtual-object display be selected from the group consisting of: active-matrix organic light-emitting diode array, projector, or display; collimated light projector or display; digital micro-mirror array, projector, or display; diode laser array, projector, or display; ferroelectric liquid crystal on silicon array, projector, or display; holographic projector or display. In an example, a display can be selected from the group consisting of: light emitting diode array, projector, or display; liquid crystal display array, projector, or display; liquid crystal on silicon array, projector, or display; low-power (e.g. nano-watt) laser projector or display; and display and/or microprojector.

In an example, a virtual-object display can be located on a sidepiece ("temple") of an eyewear frame. In an example, a virtual-object display can be located along the inside (body-facing) surface of a sidepiece ("temple") of an eyewear frame. In an example, a virtual-object display can be located on a portion of a front piece of an eyewear frame on the perimeter of a lens. In an example, a virtual object virtual-object display can be located on the portion of a front piece of an eyewear frame which is to the right or left of a lens.

In an example, this optical structure can be part of an overall near-eye wearable device (e.g. eyewear and/or eyeglasses) or system. In an example, there can be symmetric versions of this optical structure in front of a person's right and left eyes. In an example, this optical structure can be part of an overall an overall near-eye wearable device (e.g. eyewear and/or eyeglasses) or multi-device system. In an example, this device or multi-device system can further comprise one or more components selected from the group consisting of: (wireless) data receiver; (wireless) data transmitter; acoustic speaker; beam splitter; camera; concave lens; convex lens; curved mirror; data processor; EEG sensor; electrical actuator; electrochromic layer; eyewear (e.g. eyeglasses) front piece; eyewear (e.g. eyeglasses) sidepieces (e.g. temples); in-coupler; infrared light detector; infrared light emitter; laser scanner; lens; liquid crystal diode; liquid lens; microlens array; microphone; motion sensor; out-coupler; planoconcave lens; power source (e.g. battery); prism; remote data processor; smart ring; smart watch; cell phone; spectroscopic sensor; spherical lens; touch screen; lens with adjustable focal length; vibrating element; and waveguide. Example variations discussed elsewhere in this disclosure or in priority-linked disclosures can also be applied to this example where relevant.

Figure 32:
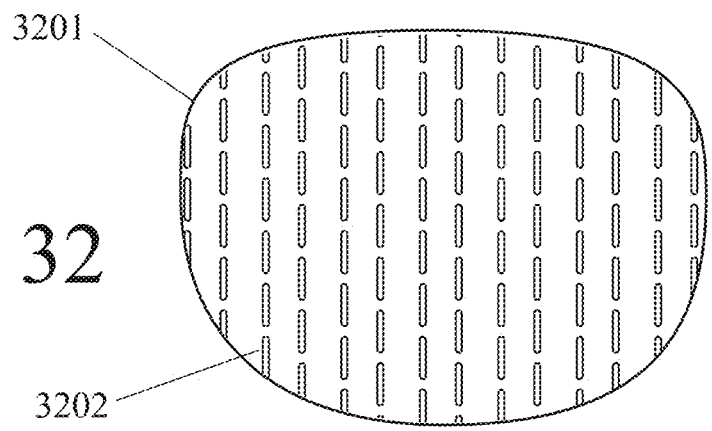
FIGS. 32 through 34 show an optical structure with a honeycomb (hexagonal) grid of reflective elements.
Figure 33:
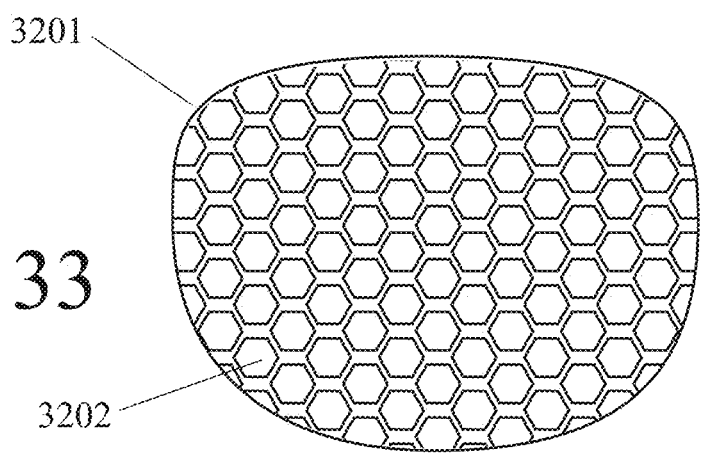
Figure 34:
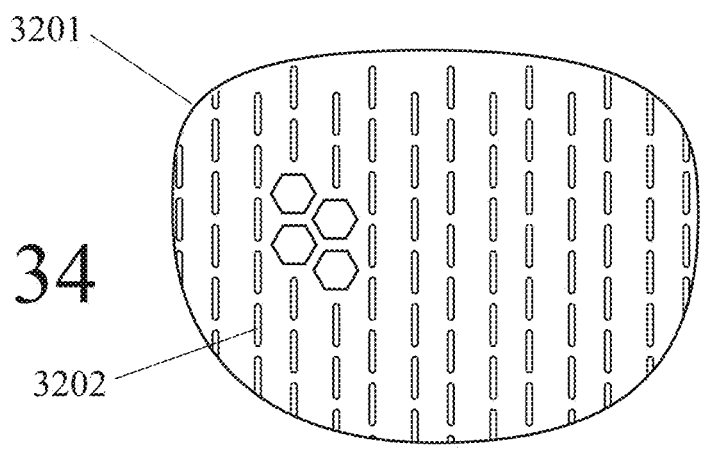

FIGS. 32 through 34 show three frontal views, at three different times, of a near-eye optical structure for use in augmented reality (and/or mixed reality) eyewear comprising a plurality (e.g. array, grid, mesh, or matrix) of polygonal (e.g. hexagonal in this example) individually-movable reflective elements (e.g. micromirrors). Each reflective element has a first configuration which allows environmental light to reach a person's eye through an area of the optical structure and a second configuration which blocks (or reduces) environmental light reaching the person's eye through that area. Also, the proximal side of a reflective element in the second configuration reflects light from a virtual-object display via that area toward the person's eye. This combination of blocking environmental light and reflecting virtual-object display light enables the display of a relatively-opaque virtual object in that area of the person's field of view.

FIG. 32 shows this optical structure at a first time when all of the polygonal (e.g. hexagonal in this example) reflective elements are in their first configurations, allowing a maximum amount of environmental light to pass through the optical structure to a person's eye. In this example, at this time the longitudinal axes of the reflective elements are all substantially parallel with vectors extending out from the person's eye, which is why they appear thin in this frontal view.

FIG. 33 shows this optical structure at a second time when all of the polygonal (e.g. hexagonal in this example) reflective elements are in their second configurations, blocking (or reducing) the amount of environmental light passing through the optical structure to the person's eye. In this example, at this time the longitudinal axes of the reflective elements are all substantially orthogonal to vectors extending out from the person's eye, which is why their hexagonal widths appear in this frontal view.

FIG. 34 shows this optical structure at a third time when a selected subset (four, in this example) of the polygonal (e.g. hexagonal in this example) reflective elements are in their second configurations and the rest of the reflective elements are in their first configurations.

With respect to specific components, FIGS. 32 through 34 shown an optical structure 3201 for use in augmented reality (and/or mixed reality) eyewear comprising a honeycomb array, grid, mesh, or matrix of hexagonal reflective elements (e.g. micromirrors). In an example, individually-rotatable reflective elements (e.g. micromirrors) can be rotated (and/or pivoted) between a first configuration and a second configuration by one or more mechanisms selected from the group consisting of: creation of an electromagnetic (or magnetic) field by transmission of electrical energy through one or more nearby (e.g. adjacent) conductive components; changing the orientation of an electromagnetic (or magnetic) field by transmission of electrical energy through one or more nearby (e.g. adjacent) conductive components; lateral shifting and/or sliding of one or more planar components to which the rotatable reflective element is flexibly connected); and rotation and/or pivoting of the rotatable reflective element by an electromagnetic actuator.

In an example, a hexagonal reflective element can be rotated around a central axis between two opposite vertexes. In an example, a hexagonal reflective element can be pivoted around a side between two adjacent vertexes. In an example, reflective elements can be rotated by transmission of electrical energy to nearby (e.g. adjacent) electroconductive pathways (e.g. microwires), wherein this transmission of electrical energy creates and/or modifies a local electromagnetic field. In an example, a plurality of individual reflective elements can be selectively rotated by transmission of electrical energy through a transparent or translucent hexagonal (e.g. honeycomb) grid or mesh of electroconductive pathways (e.g. microwires). In an example, a subset of a plurality of individual reflective elements can be selectively rotated by transmission of electrical energy through a subset of a hexagonal (e.g. honeycomb) grid or mesh of electroconductive pathways (e.g. microwires).

In an example, reflective elements in their first configurations can be substantially parallel with the distal envelope of the optical structure. In an example, reflective elements in their first configurations van be substantially coplanar with the distal envelope of the optical structure. In an example, reflective elements in their second configurations can be substantially orthogonal to the distal envelope of the optical structure. In an example, reflective elements in their second configurations van be substantially orthogonal to the distal envelope of the optical structure.

In an example, the distal envelope and/or outer surface of an optical structure can be arcuate. In an example, the distal envelope and/or outer surface of an optical structure can be concave. In an example, the distal envelope and/or outer surface of an optical structure can be convex. In an example, the distal envelope and/or outer surface of an optical structure can have a shape which is a section of a sphere or ellipsoid. In an example, the distal envelope and/or outer surface of an optical structure can have a conic section shape. Example variations discussed elsewhere in this disclosure or in priority-linked disclosures can also be applied to this example where relevant.

Figure 35:
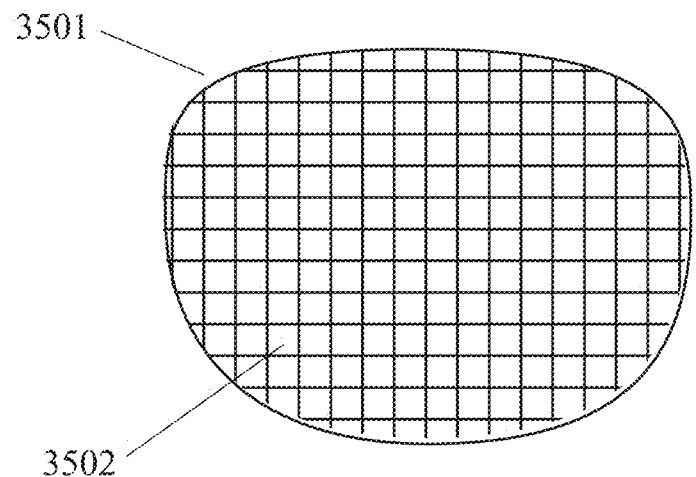
FIG. 35 shows an optical structure with an orthogonal grid of reflective elements.

FIG. 35 shows a frontal view of a near-eye optical structure 3501 for use in augmented reality (and/or mixed reality) eyewear comprising an orthogonal (e.g. row and column) array, grid, mesh, or matrix of reflective elements (e.g. micromirrors) 3502. In an example, individual reflective elements (e.g. micromirrors) in this array, grid, mesh, or matrix can be selectively and individually changed (e.g. moved) between a first configuration and a second configuration. In an example, a reflective element in the first configuration allows environmental light to pass through an area to a person's eye. In an example, a reflective element in the second configuration blocks (or reduces) environmental light from passing through the area to the person's eye and also reflects light from a virtual-image display via this area toward the person's eye. This combination of blocking environmental light and reflecting light from a virtual-image display enables the display of a relatively-opaque virtual object in this area in a person's field of view, while maintaining a relatively-clear view of the environment in the rest of the person's field of view.

In an example, a subset of reflective elements (e.g. micromirrors) in this array, grid, mesh, or matrix can be changed (e.g. moved) from their first configurations to their second configurations while the rest of the reflective elements remain in their first configurations. In an example, a subset of reflective elements can be selected so that their location and collective perimeter overlaps the location and collective perimeter of a virtual object displayed in a person's field of view. This provides a person with both display of a relatively opaque virtual object in their field of view and a relatively clear view of their environment.

In an example, an individual reflective element (e.g. micromirror) can be changed between a first configuration and a second configuration by one or more mechanisms selected from the group consisting of: creation of an electromagnetic (or magnetic) field by transmission of electrical energy through one or more nearby (e.g. adjacent) conductive components; changing the orientation of an electromagnetic (or magnetic) field by transmission of electrical energy through one or more nearby (e.g. adjacent) conductive components; lateral shifting and/or sliding of one or more planar components to which the rotatable reflective element is flexibly connected); and rotation and/or pivoting of the rotatable reflective element by an electromagnetic actuator. Example variations discussed elsewhere in this disclosure or in priority-linked disclosures can also be applied to this example where relevant.

Figure 36:
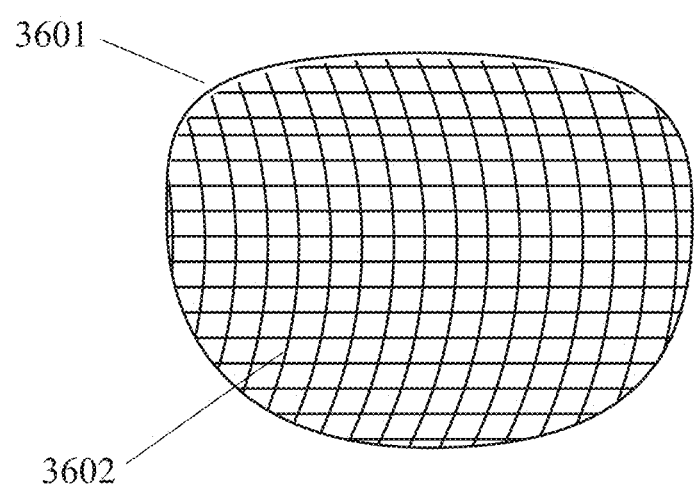
FIG. 36 shows an optical structure with reflective elements in a grid with straight horizontal rows and concave vertical columns.

FIG. 36 shows a frontal view of a near-eye optical structure 3601 for use in augmented reality (and/or mixed reality) eyewear wherein reflective elements (e.g. micromirrors) 3602 in an array, grid, mesh, or matrix are configured along straight horizontal rows and concave vertical columns. In an example, concave vertical columns can have conic-section (e.g. parabolic) shapes. In an example, concave vertical columns can have side-facing (e.g. right or left facing) openings. In an example, the side-facing openings of concave vertical columns can face toward a virtual-object display. In an example, vertical columns that are closer to the virtual-object display can be more concave than vertical columns which are farther from the virtual-object display.

In an example, individual reflective elements (e.g. micromirrors) in this array, grid, mesh, or matrix can be selectively and individually changed (e.g. moved) between a first configuration and a second configuration. In an example, a reflective element in the first configuration allows environmental light to pass through an area to a person's eye. In an example, a reflective element in the second configuration blocks (or reduces) environmental light from passing through the area to the person's eye and also reflects light from a virtual-image display via this area toward the person's eye. This combination of blocking environmental light and reflecting light from a virtual-image display enables the display of a relatively-opaque virtual object in this area in a person's field of view, while maintaining a relatively-clear view of the environment in the rest of the person's field of view.

In an example, a subset of reflective elements (e.g. micromirrors) in this array, grid, mesh, or matrix can be changed (e.g. moved) from their first configurations to their second configurations while the rest of the reflective elements remain in their first configurations. In an example, a subset of reflective elements can be selected so that their location and collective perimeter overlaps the location and collective perimeter of a virtual object displayed in a person's field of view. This provides a person with both display of a relatively opaque virtual object in their field of view and a relatively clear view of their environment.

In an example, an individual reflective element (e.g. micromirror) can be changed between a first configuration and a second configuration by one or more mechanisms selected from the group consisting of: creation of an electromagnetic (or magnetic) field by transmission of electrical energy through one or more nearby (e.g. adjacent) conductive components; changing the orientation of an electromagnetic (or magnetic) field by transmission of electrical energy through one or more nearby (e.g. adjacent) conductive components; lateral shifting and/or sliding of one or more planar components to which the rotatable reflective element is flexibly connected); and rotation and/or pivoting of the rotatable reflective element by an electromagnetic actuator. Example variations discussed elsewhere in this disclosure or in priority-linked disclosures can also be applied to this example where relevant.

Figure 37:
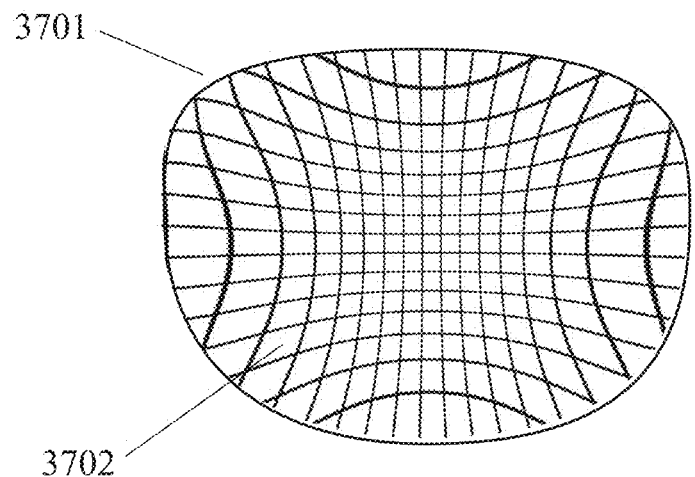
FIG. 37 shows an optical structure with reflective elements in a centrally-pinched grid.

FIG. 37 shows a frontal view of a near-eye optical structure 3701 for use in augmented reality (and/or mixed reality) eyewear wherein reflective elements (e.g. micromirrors) 3702 are configured in an centrally-pinched array, grid, mesh, or matrix, wherein reflective elements which are closer to the center of the optical structure (and/or the person's field of view) are smaller and/or closer together than reflective elements which are farther from this center. In an example, a centrally-pinched array can be designed by starting with an orthogonal array and then pinching and/or shrinking a central portion of the array.

In an example, individual reflective elements (e.g. micromirrors) in this array, grid, mesh, or matrix can be selectively and individually changed (e.g. moved) between a first configuration and a second configuration. In an example, a reflective element in the first configuration allows environmental light to pass through an area to a person's eye. In an example, a reflective element in the second configuration blocks (or reduces) environmental light from passing through the area to the person's eye and also reflects light from a virtual-image display via this area toward the person's eye. This combination of blocking environmental light and reflecting light from a virtual-image display enables the display of a relatively-opaque virtual object in this area in a person's field of view, while maintaining a relatively-clear view of the environment in the rest of the person's field of view.

In an example, a subset of reflective elements (e.g. micromirrors) in this array, grid, mesh, or matrix can be changed (e.g. moved) from their first configurations to their second configurations while the rest of the reflective elements remain in their first configurations. In an example, a subset of reflective elements can be selected so that their location and collective perimeter overlaps the location and collective perimeter of a virtual object displayed in a person's field of view. This provides a person with both display of a relatively opaque virtual object in their field of view and a relatively clear view of their environment.

In an example, an individual reflective element (e.g. micromirror) can be changed between a first configuration and a second configuration by one or more mechanisms selected from the group consisting of: creation of an electromagnetic (or magnetic) field by transmission of electrical energy through one or more nearby (e.g. adjacent) conductive components; changing the orientation of an electromagnetic (or magnetic) field by transmission of electrical energy through one or more nearby (e.g. adjacent) conductive components; lateral shifting and/or sliding of one or more planar components to which the rotatable reflective element is flexibly connected); and rotation and/or pivoting of the rotatable reflective element by an electromagnetic actuator. Example variations discussed elsewhere in this disclosure or in priority-linked disclosures can also be applied to this example where relevant.

Figure 38:
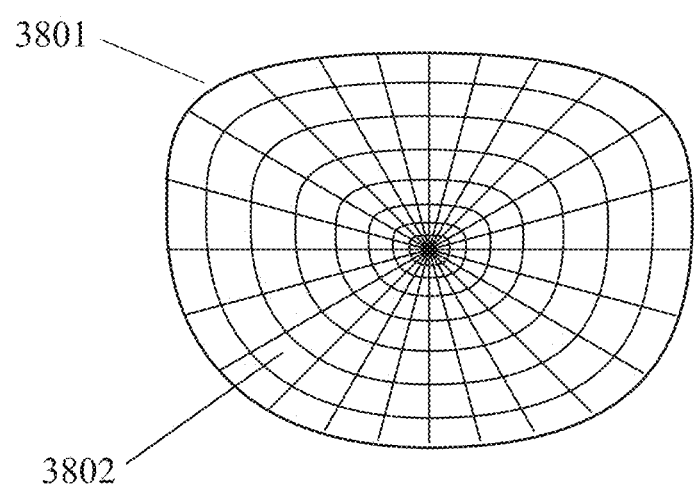
FIG. 38 shows an optical structure with reflective elements in a polar coordinate, hub and spokes, radial lines and rings, and/or spider web grid.

FIG. 38 shows a frontal view of a near-eye optical structure 3801 for use in augmented reality (and/or mixed reality) eyewear wherein reflective elements (e.g. micromirrors) 3802 are configured in an polar coordinate, hub and spokes, radial lines and rings, and/or spider web array, grid, mesh, or matrix.

In an example, individual reflective elements (e.g. micromirrors) in this array, grid, mesh, or matrix can be selectively and individually changed (e.g. moved) between a first configuration and a second configuration. In an example, a reflective element in the first configuration allows environmental light to pass through an area to a person's eye. In an example, a reflective element in the second configuration blocks (or reduces) environmental light from passing through the area to the person's eye and also reflects light from a virtual-image display via this area toward the person's eye. This combination of blocking environmental light and reflecting light from a virtual-image display enables the display of a relatively-opaque virtual object in this area in a person's field of view, while maintaining a relatively-clear view of the environment in the rest of the person's field of view.

In an example, a subset of reflective elements (e.g. micromirrors) in this array, grid, mesh, or matrix can be changed (e.g. moved) from their first configurations to their second configurations while the rest of the reflective elements remain in their first configurations. In an example, a subset of reflective elements can be selected so that their location and collective perimeter overlaps the location and collective perimeter of a virtual object displayed in a person's field of view. This provides a person with both display of a relatively opaque virtual object in their field of view and a relatively clear view of their environment.

In an example, an individual reflective element (e.g. micromirror) can be changed between a first configuration and a second configuration by one or more mechanisms selected from the group consisting of: creation of an electromagnetic (or magnetic) field by transmission of electrical energy through one or more nearby (e.g. adjacent) conductive components; changing the orientation of an electromagnetic (or magnetic) field by transmission of electrical energy through one or more nearby (e.g. adjacent) conductive components; lateral shifting and/or sliding of one or more planar components to which the rotatable reflective element is flexibly connected); and rotation and/or pivoting of the rotatable reflective element by an electromagnetic actuator. Example variations discussed elsewhere in this disclosure or in priority-linked disclosures can also be applied to this example where relevant.

Figure 39:
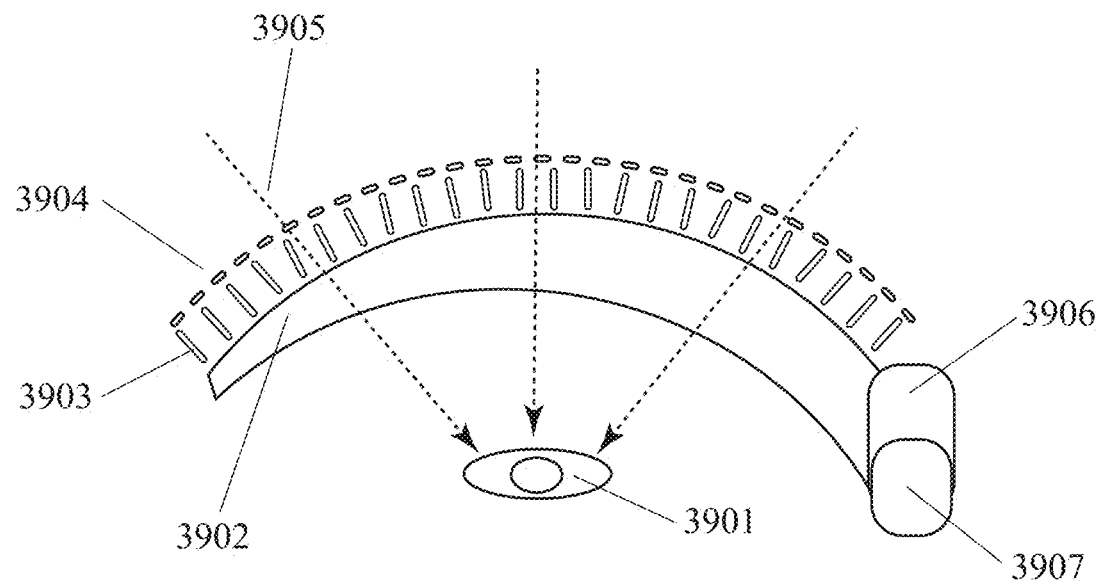
FIGS. 39 and 40 show an optical structure with an electroconductive layer, a selectively-reflective layer comprising reflective elements, a waveguide, a virtual-object display, and an optical coupler.
Figure 40:
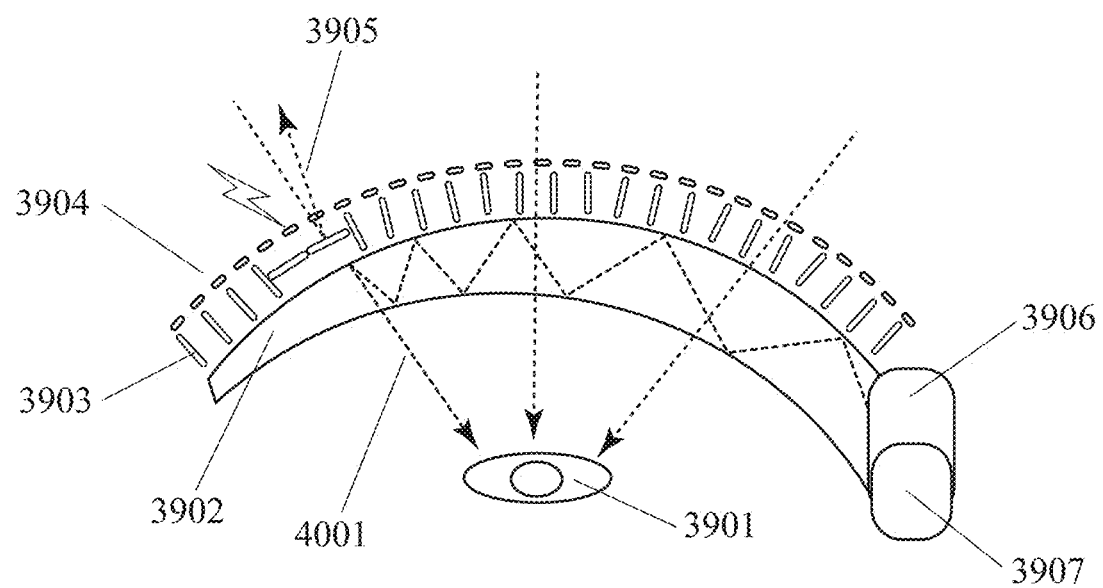

FIGS. 39 and 40 show two (top-down, cross-sectional) views, at two different times, of an optical structure for use in augmented reality (and/or mixed reality) eyewear comprising: an electroconductive component (or layer) 3904 which further comprises a plurality of transparent (or translucent) electroconductive pathways (e.g. microwires); a selectively-reflective component (or layer) 3903 which further comprises a plurality (e.g. array, grid, mesh, or matrix) of reflective elements (e.g. micromirrors), wherein a selected subset of individual reflective elements (e.g. micromirrors) is moved (e.g. rotated or pivoted) between a first configuration and a second configuration, wherein the first configuration allows a first amount of light from the environment 3905 to pass through a selected area of the selectively-reflective component to a person's eye 3901, wherein the second configuration allows a second amount of light from the environment to pass through the selected area of the selectively-reflective component to the person's eye, wherein the second amount is less than the first amount, and wherein individual reflective elements (e.g. micromirrors) are moved (e.g. rotated or pivoted) between the first configuration and the second configuration by the transmission of electrical energy through the electroconductive component; a waveguide 3902; a virtual-object display 3907; and an optical coupler 3906 which guides (e.g. incouples) light from the virtual-object display 4001 into the waveguide.

FIG. 39 shows this structure at a first time when all of the reflective elements (e.g. micromirrors) are in their first configurations, thereby allowing the greatest amount of light from the environment to pass through the selectively-reflective component (or layer) to the person's eye. FIG. 40 shows this structure at a second time when a selected subset of reflective elements (e.g. micromirrors) are in their second configurations, thereby blocking (or reducing) the transmission of light from the environment through a selected area of the selectively-reflective component (or layer) to the person's eye. In an example, this area is where a virtual object is displayed in the person's field of view. Example variations discussed elsewhere in this disclosure or in priority-linked disclosures can also be applied to this example where relevant.

Figure 41:
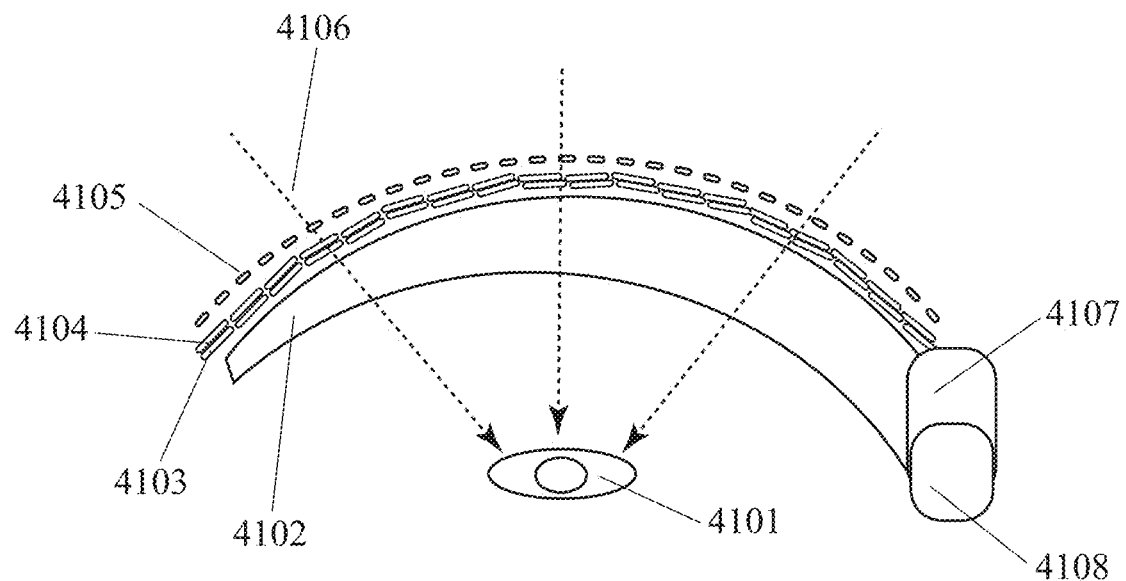
FIGS. 41 and 42 show an optical structure with an electroconductive layer, a selectively-transparent layer with multiple reflective elements spanning a width, a waveguide, a virtual-object display, and an optical coupler.
Figure 42:
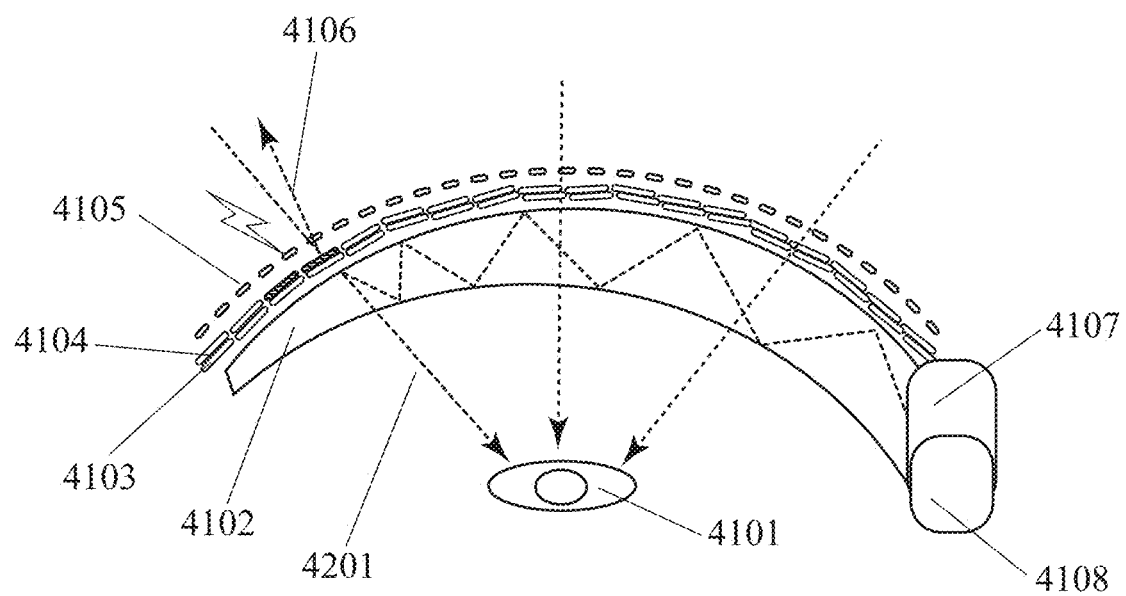

FIGS. 41 and 42 show two (top-down, cross-sectional) views, at two different times, of an optical structure for use in augmented reality (and/or mixed reality) eyewear comprising: an electroconductive component (or layer) 4105 which further comprises a plurality of transparent (or translucent) electroconductive pathways (e.g. microwires); a distal selectively-reflective component (or layer) 4104 which further comprises a plurality (e.g. array, grid, mesh, or matrix) of reflective elements (e.g. micromirrors); a proximal selectively-reflective component (or layer) 4103 which further comprises a plurality (e.g. array, grid, mesh, or matrix) of reflective elements (e.g. micromirrors), wherein a selected subset of reflective elements (e.g. micromirrors) is moved (e.g. rotated or pivoted) between a first configuration and a second configuration, wherein the first configuration allows a first amount of light from the environment 4106 to pass through a selected area of the selectively-reflective component to a person's eye 4101, wherein the second configuration allows a second amount of light from the environment to pass through the selected area of the selectively-reflective component to the person's eye, wherein the second amount is less than the first amount, and wherein individual reflective elements (e.g. micromirrors) are moved (e.g. rotated or pivoted) between the first configuration and the second configuration by the transmission of electrical energy through the electroconductive component; a waveguide 4102; a virtual-object display 4108; and an optical coupler 4107 which guides (e.g. incouples) light from the virtual-object display 4201 into the waveguide.

FIG. 41 shows this structure at a first time when all of the reflective elements (e.g. micromirrors) are in their first configurations, thereby allowing the greatest amount of light from the environment to pass through the selectively-reflective component (or layer) to the person's eye. FIG. 42 shows this structure at a second time when a selected subset of reflective elements (e.g. micromirrors) are in their second configurations, thereby blocking (or reducing) the transmission of light from the environment through a selected area of the selectively-reflective component (or layer) to the person's eye. In an example, this area is where a virtual object is displayed in the person's field of view. Example variations discussed elsewhere in this disclosure or in priority-linked disclosures can also be applied to this example where relevant.

Figure 43:
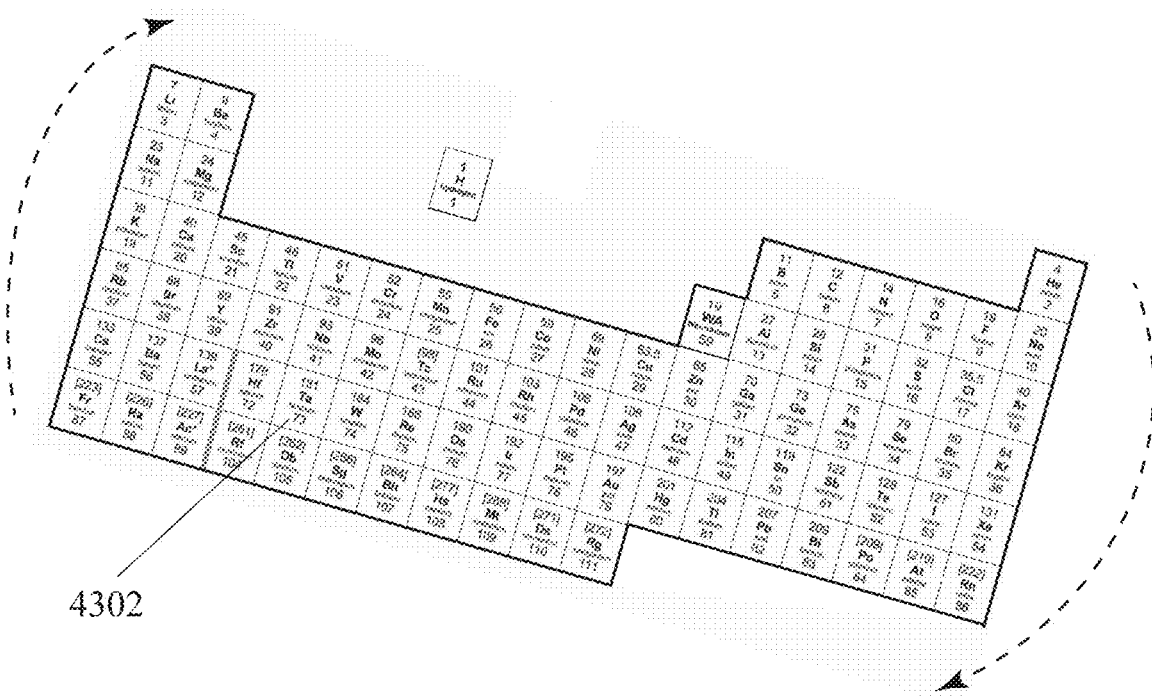
FIG. 43 shows a system with a plurality of rotating elements and a waveguide.
Figure 43:
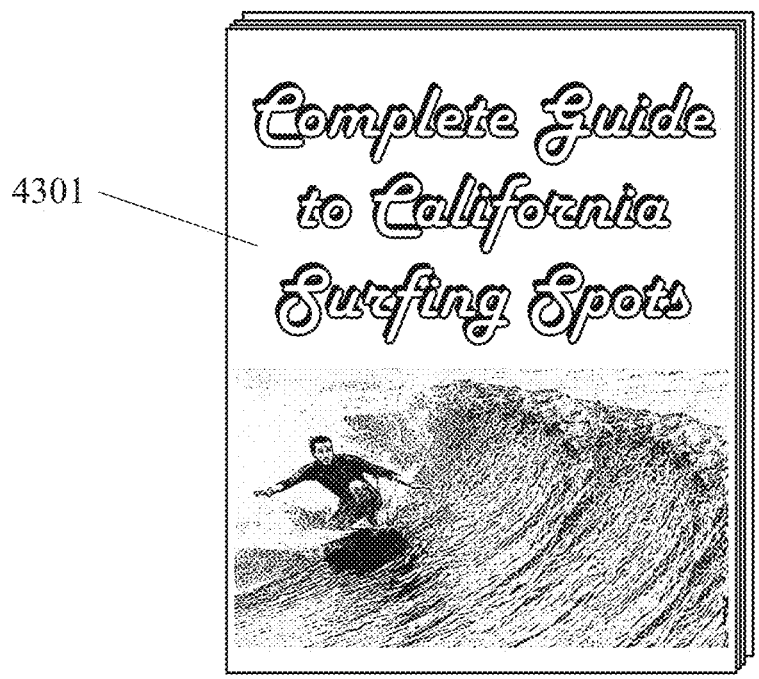

FIG. 43 shows a system comprising: a plurality of rotating and/or pivoting elements 4302; and a waveguide 4301. In an example, close inspection of this system can provide greater insight into (and appreciation for) Weird Al's amazingly-creative talent and musical genius.

Figure 44:
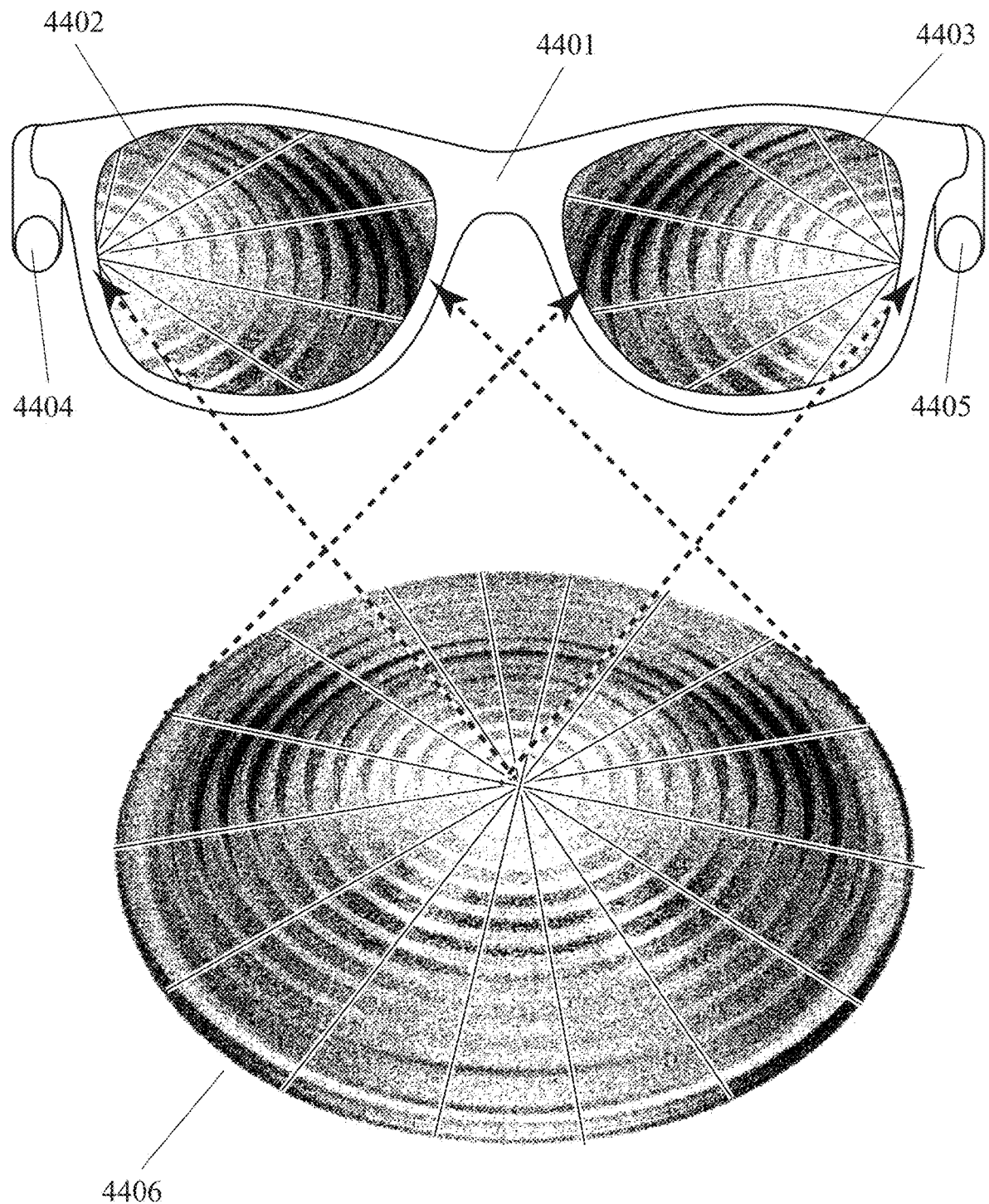
FIGS. 44 through 46 show bilateral optical structures with portions of a Fresnel reflector.
Figure 45:
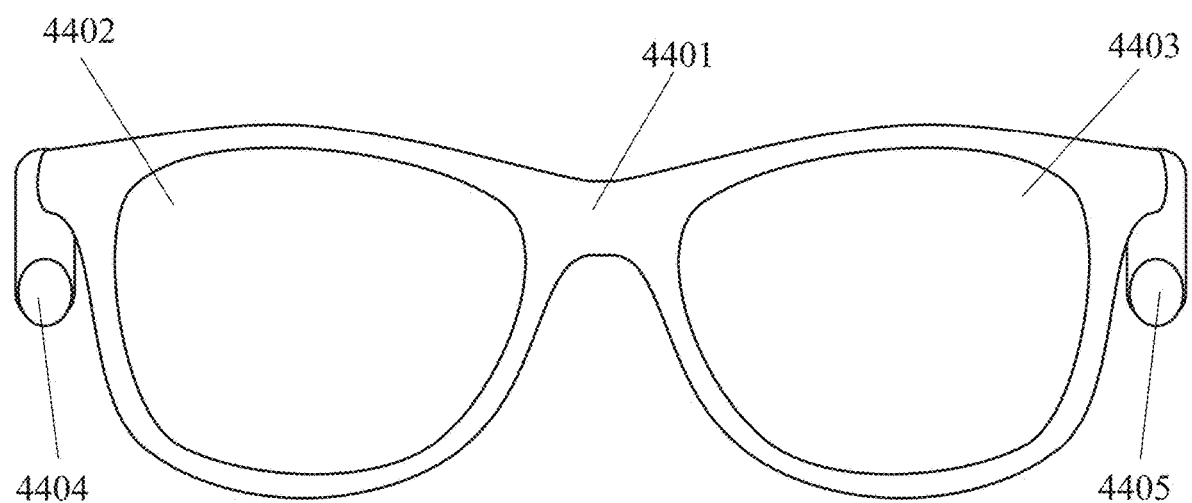
Figure 46:
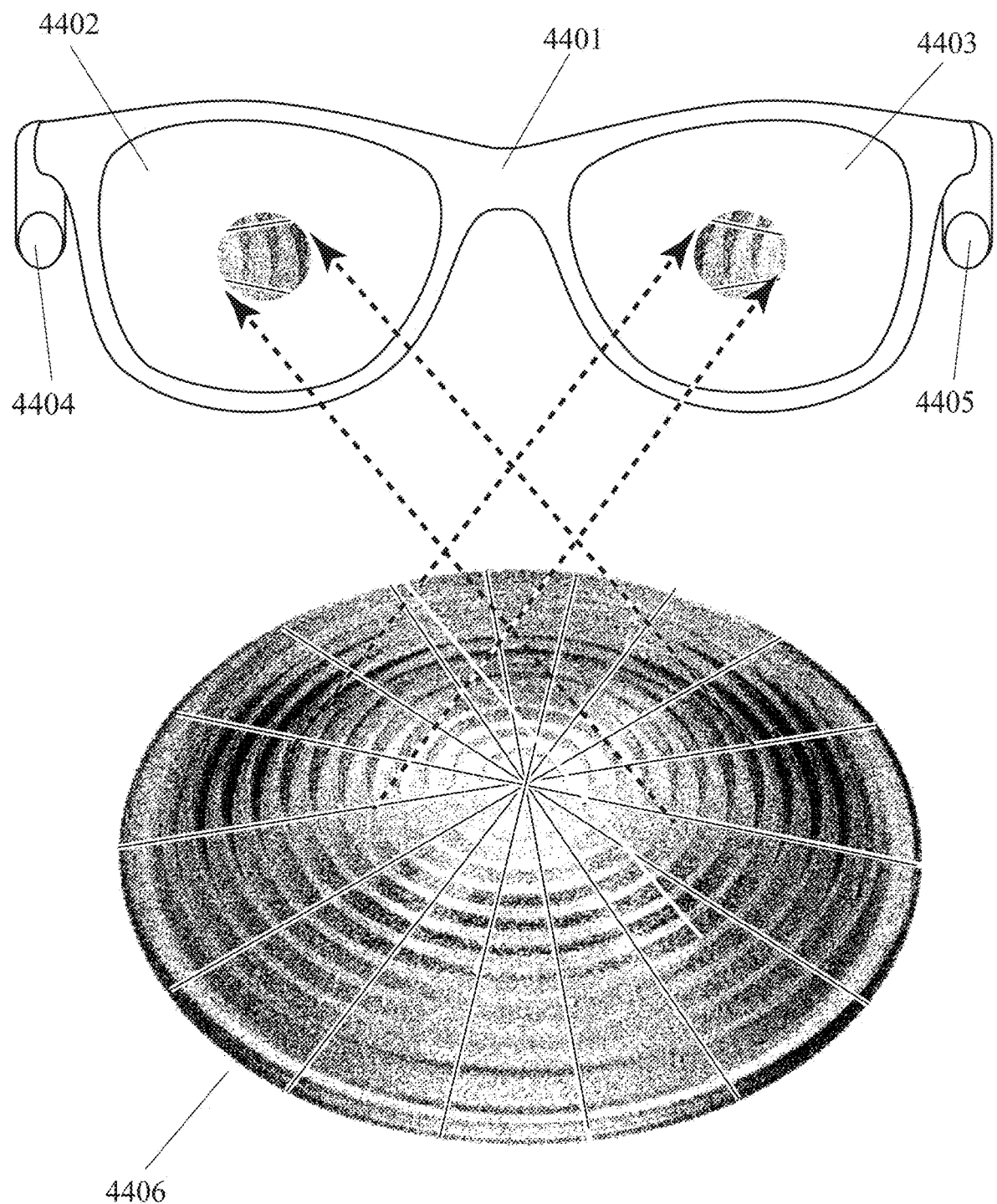

FIGS. 44 through 46 shows three (frontal and expanded) views, at three different times, of bilateral (e.g. right-eye and left-eye) optical structures for use in augmented reality (and/or mixed reality) eyewear. These bilateral optical structures comprise right-eye and left-eye arrays of reflective elements (e.g. micromirrors) in an eyewear frame which allow environmental light through to a person's eyes in their first configurations and form portions of a Fresnel reflector in their second configurations. In this example, reflective elements (e.g. micromirrors) in the right-eye optical structure collectively form a portion of the left-side of a Fresnel reflector when they are in their second configurations and reflective elements (e.g. micromirrors) in the left-eye optical structure collectively form a portion of the right-side of the Fresnel reflector when they are in their second configurations.

In order to more-clearly introduce the relationship between these optical structures and a Fresnel reflector, while maintaining consistent terminology with previous figures, FIGS. 44 through 46 show the configurations of reflective elements in reverse order. These figures first show reflective elements in their second configurations and then show them in their first configurations.

FIG. 44 shows bilateral (e.g. right-eye and left-eye) optical structures when the reflective elements within them are all in their second configurations, collectively forming portions of a Fresnel reflector. The upper portion of this figure shows the right-eye and left-eye optical structures within an eyewear frame. The lower portion of this figure shows an oblique view of the entire corresponding Fresnel reflector. The right-eye and left-eye side optical structures form (e.g. correspond to) portions of the left and right sides of the Fresnel reflector. Please note the reversal of sides. The right-eye optical structure corresponds to a portion of the left side of the Fresnel reflector and the left-eye optical structure corresponds to a portion of the right side of the Fresnel reflector. This reversal enables reflective elements to reflect light from virtual-object displays on eyewear sidepieces (e.g. temples) toward the person's eyes when these reflective elements are in their second configurations.

FIG. 45 shows the bilateral (e.g. right-eye and left-eye) optical structures when the reflective elements are all in their first configurations, allowing the most environmental light through to reach the person's eye. At this time, these reflective elements do not form portions of a Fresnel reflector. In an example, the longitudinal axes of these reflective elements in their first configurations can be substantially-parallel to radial vectors extending out from the person's eye. In another example, the longitudinal axes of these reflective elements in their first configurations can be substantially-orthogonal to the outer envelope of the optical structures. This is why the optical structures are shown as conceptually "blank" (e.g. no reflection) in this figure and the Fresnel reflector is not shown in the lower portion of the figure.

FIG. 46 shows these bilateral (e.g. right-eye and left-eye) optical structures at another time when selected right-side and left-side subsets of reflective elements in these optical structures have been changed into their second configurations and the rest of the reflective elements remain in their first configurations. In this example, selected subsets of reflective elements in their second configurations block (or reduce) the transmission of environmental light to the person's eye in selected (right-side and left-side) areas and reflect light from virtual-object displays from these selected areas toward the person's eyes. In an example, these selected areas can correspond with (e.g. overlap or align with) the bilateral areas where a virtual object is displayed in the person's field of view. This allows bilateral display of a relatively-opaque virtual object in the person's field of view, while providing the person with a relatively-clear view of the environment in the rest of the person's field of view.

With respect to specific components, FIGS. 44 through 46 show an example of bilateral (e.g. right-eye and left-eye) optical structures for use in augmented reality (and/or mixed reality) eyewear comprising: an eyewear front piece 4401; a right-side virtual-object display 4404; a left-side virtual-object display 4405; a right-side optical structure 4402 which held by the eyewear front piece in front of a person's right eye, wherein the right-side optical structure further comprises an right-side array of reflective elements (e.g. micromirrors), wherein reflective elements in the right-side array each have a first configuration and a second configuration, wherein reflective elements in the right-side array are rotated and/or pivoted between their first configurations and second configurations, wherein reflective elements in their first configurations allow the most transmission of environmental light through the optical structure to the person's eye, wherein reflective elements in their second configurations block (or reduce) the transmission of environmental light through the optical structure to the person's eye, wherein reflective elements in their second configurations reflect light from a virtual-object display toward the person's eye, and wherein right-side reflective elements in their second configurations collectively form a portion of the left-side of a Fresnel reflector; and a left-side optical structure 4403 which held by the eyewear front piece in front of a person's left eye, wherein the left-side optical structure further comprises an left-side array of reflective elements (e.g. micromirrors), wherein reflective elements in the left-side array each have a first configuration and a second configuration, wherein reflective elements in the left-side array are rotated and/or pivoted between their first configurations and second configurations, wherein reflective elements in their first configurations allow the most transmission of environmental light through the optical structure to the person's eye, wherein reflective elements in their second configurations block (or reduce) the transmission of environmental light through the optical structure to the person's eye, wherein reflective elements in their second configurations reflect light from a virtual-object display toward the person's eye, and wherein left-side reflective elements in their second configurations collectively form a portion of the right-side of a Fresnel reflector. FIGS. 44 through 46 also show a Fresnel reflector 4406 which is not itself part of the eyewear, but illustrates how the bilateral optical structures correspond portions of the right and left sides of a Fresnel reflector.

In an example, when reflective elements (e.g. micromirrors) are in their first configurations, they allow the most environmental light to pass through an optical structure. In an example, when reflective elements (e.g. micro mirrors) are in their second configurations, they block (or reduce) the transmission of environmental light and reflect light from a virtual-object display back toward a person's eye. In an example, reflective elements can be changed between their first and second configurations by being moved (e.g. rotated and/or pivoted). In an example, reflective elements can be moved (e.g. rotated and/or pivoted) by the creation (or modification) of an electromagnetic field.

In an example, a selected subset of reflective elements can be selectively rotated and/or pivoted from their first configurations to their second configurations while the rest of the reflective elements remain in their first configurations. In an example, the location and collective perimeter of this subset of reflective elements can be selected to align with (e.g. overlap) the location and perimeter of a virtual object which is displayed in a person's field of view. This enables the display of a relatively-opaque virtual object in an area of the person's field of view, while also providing the person with a relatively-clear view of the environment in the rest of the person's field of view. Example variations discussed elsewhere in this disclosure or in priority-linked disclosures can also be applied to this example where relevant.

Figure 47:
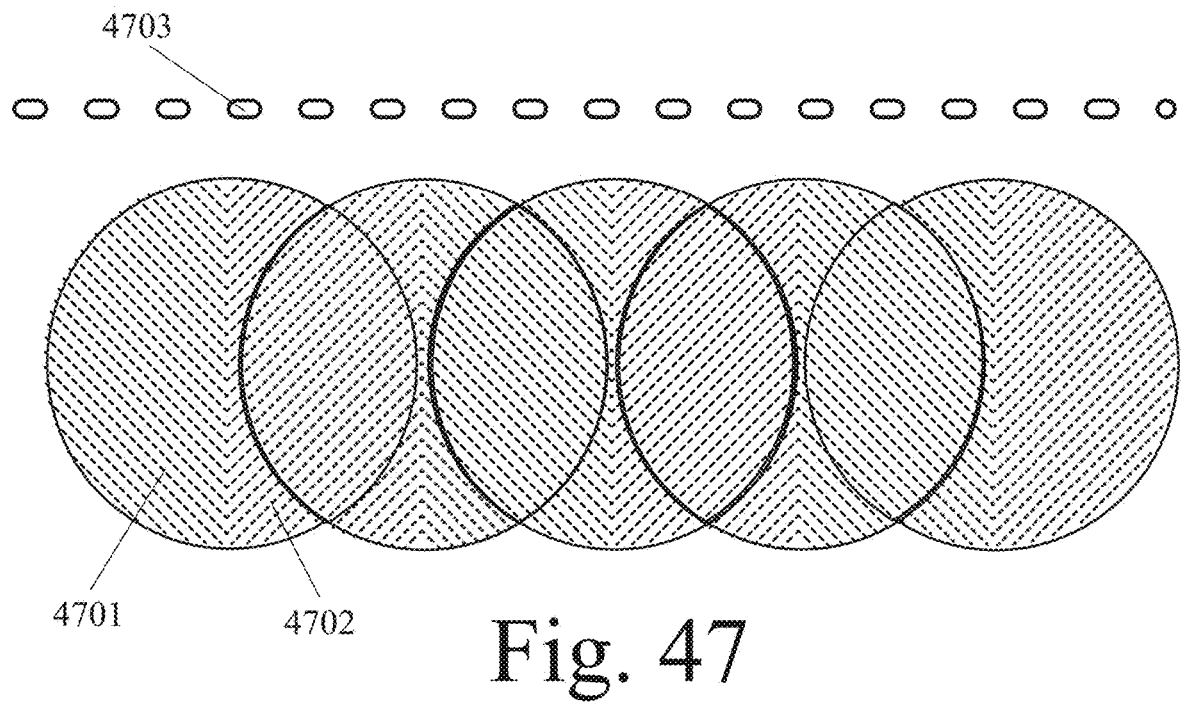
FIGS. 47 and 48 show an opacity-varying mechanism with overlapping rotatable light-polarizing optical elements.
Figure 48:
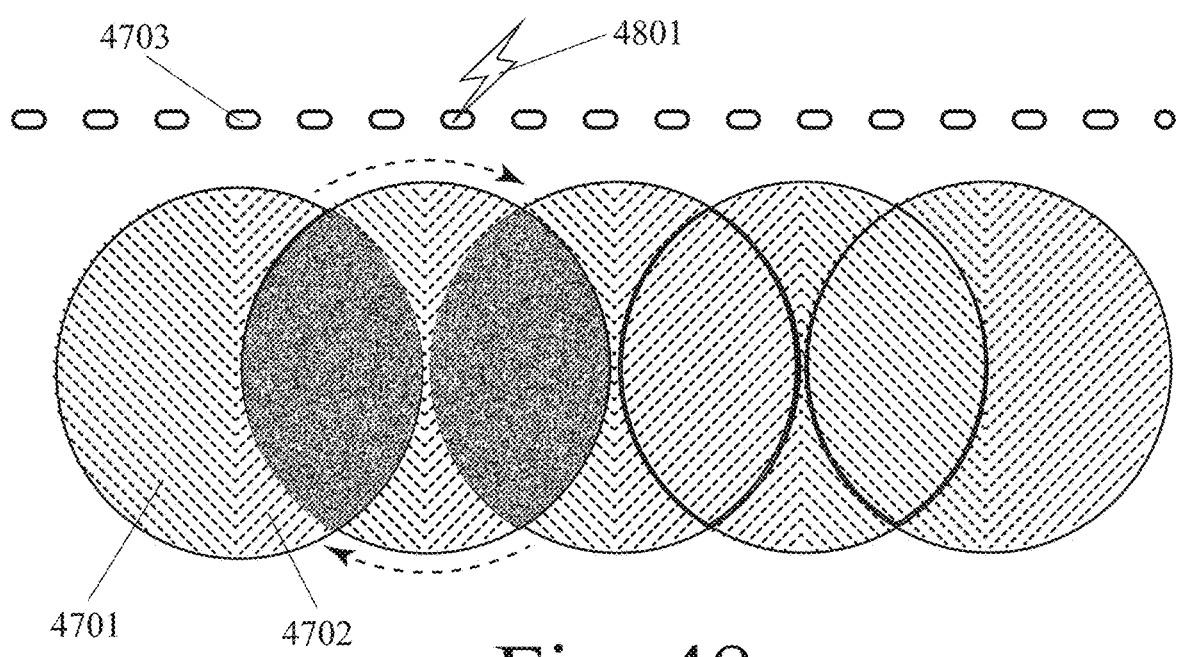

FIGS. 47 and 48 show two cross-sectional views, at two different times, of a mechanism to change the opacity and/or reflectivity of a selected area of an optical structure for use in augmented reality eyewear. This mechanism comprises an array of overlapping rotatable light-polarizing optical elements. Areas where overlapping portions of optical elements have different polarization orientations have increased opacity and/or reflectivity. FIG. 47 shows this array in a first configuration wherein overlapping areas do not involve optical element areas with different polarization orientations. FIG. 48 shows this array in a second configuration, wherein a subset of overlapping areas involve element portions with different polarization orientations, causing increased opacity and/or reflectivity in these areas.

In an example, individual optical elements can have convex (e.g. circular) perimeters. In an example, an optical element can have a first portion (e.g. a first half) with a first polarization orientation and a second portion (e.g. a second half) with a second polarization orientation. In an example, when a first portion of a first optical element overlaps with a second portion of a second optical element, then the resulting overlap area has increased opacity and/or reflectivity. In an example, a subset of optical elements can have a first configuration in which areas of overlap between them have the same polarization orientations (and, thus, lower opacity and/or reflectivity) and a second configuration in which areas of overlap between them have different polarization orientations (and, thus, greater opacity and/or reflectivity).

In an example, a subset of optical elements can be changed between its first and second configurations by the selective rotation and/or pivoting of optical elements in this subset. In an example, optical elements can be rotated and/or pivoted by a magnetic field which is created or modified by the transmission of electrical energy through a nearby electroconductive component (e.g. layer). In an example, a electroconductive component (e.g. layer) can further comprise an array, grid, mesh, or matrix of transparent or translucent electroconductive pathways (e.g. microwires).

With respect to specific components, FIGS. 47 and 48 show a mechanism to change the opacity and/or reflectivity of a selected area of an optical structure comprising: an array of overlapping rotatable light-polarizing optical elements, wherein each optical element has a first portion 4701 with a first polarization orientation and a second portion 4702 with a second polarization orientation, and wherein areas where portions of optical elements with different polarization orientations overlap have increased opacity and/or reflectivity; and an electroconductive component (e.g. layer) 4703, wherein transmission of electrical energy 4801 through the electroconductive component rotates and/or pivots a subset of the optical elements, and wherein this rotation and/or pivoting of optical elements creates overlapping areas with increased opacity and/or reflectivity. Example variations discussed elsewhere in this disclosure or in priority-linked disclosures can also be applied to this example where relevant.

Figure 49:
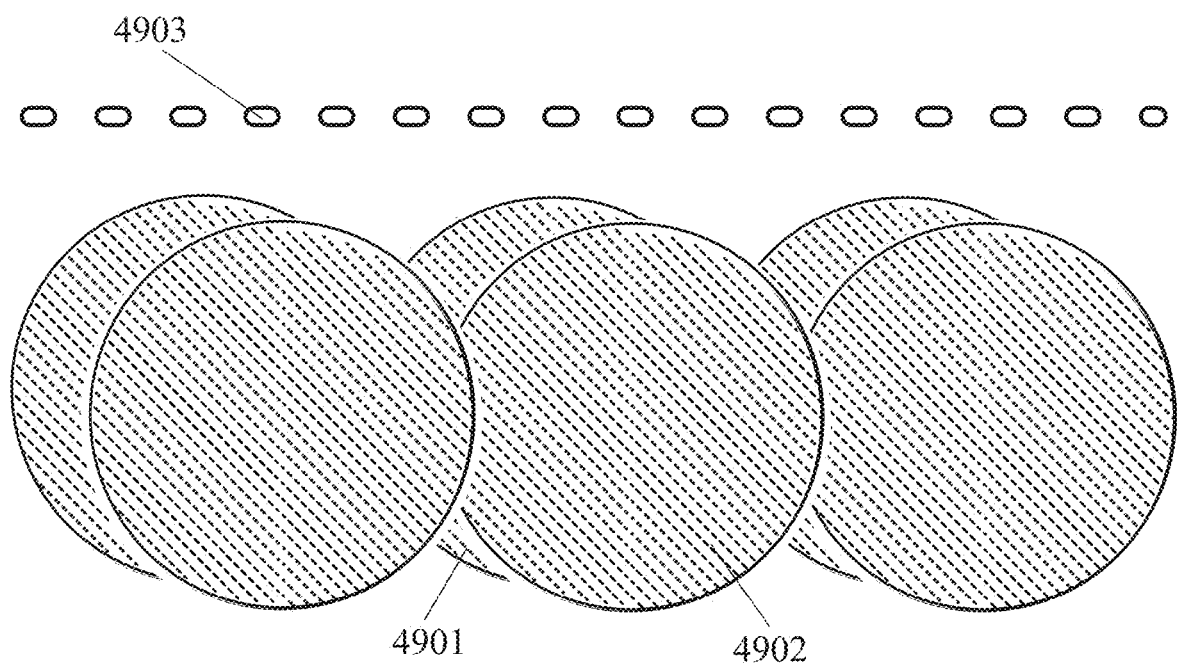
FIGS. 49 and 50 show an opacity-varying mechanism wherein rotating an optical element changes its polarization orientation.
Figure 50:
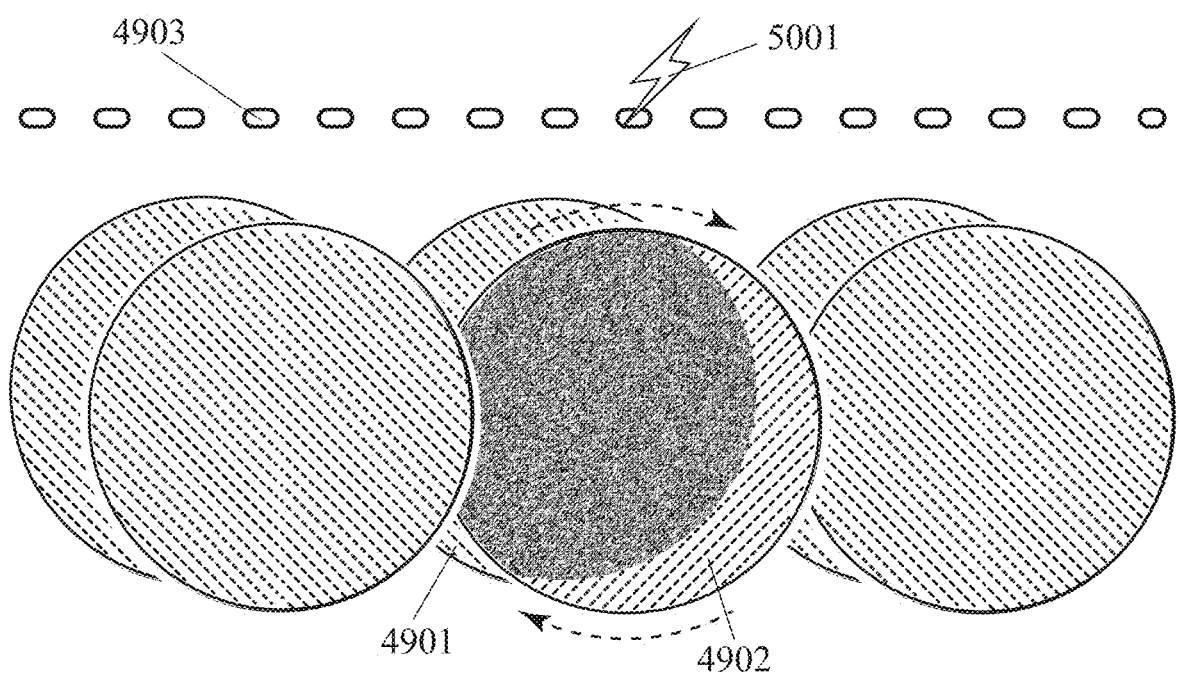

FIGS. 49 and 50 show two cross-sectional views, at two different times, of a mechanism to change the opacity and/or reflectivity of a selected area of an optical structure for use in augmented reality eyewear. This mechanism comprises an array of overlapping rotatable light-polarizing optical elements. Rotation and/or pivoting of an optical element changes the orientation of its polarization. Areas where optical elements with different polarization orientations overlap have increased opacity and/or reflectivity. FIG. 49 shows this array in a first configuration, wherein overlapping optical elements have the same polarization orientations. FIG. 50 shows this array in a second configuration, wherein rotation and/or pivoting of a subset of optical elements creates areas of overlap with different polarization orientations and increased opacity and/or reflectivity.

In an example, a subset of optical elements can be changed between their first and second configurations by being rotated and/or pivoted. In an example, optical elements can be rotated and/or pivoted by a magnetic field which is created or modified by the transmission of electrical energy through a nearby electroconductive component (e.g. layer). In an example, a electroconductive component (e.g. layer) can further comprise an array, grid, mesh, or matrix of transparent or translucent electroconductive pathways (e.g. microwires).

With respect to specific components, FIGS. 49 and 50 show a mechanism to change the opacity and/or reflectivity of a selected area of an optical structure comprising: an electroconductive component (e.g. layer) 4903, wherein transmission of electrical energy 5001 through the electroconductive component creates or modifies an electromagnetic field; and an array of overlapping rotatable light-polarizing optical elements, wherein a first optical element 4901 in the array has a first configuration with a first polarization orientation, wherein a second optical element 4902 in the array has a first configuration with the first polarization orientation, wherein first optical element and the second optical element overlap, wherein the second optical element has a second configuration with a second polarization orientation, wherein the second optical element is rotated and/or pivoted from its first configuration to its second configuration by the creation or modification of the electromagnetic field, thereby increasing the opacity and/or reflectivity of the area where the first optical element and the second optical element overlap. Example variations discussed elsewhere in this disclosure or in priority-linked disclosures can also be applied to this example where relevant.

Figure 51:
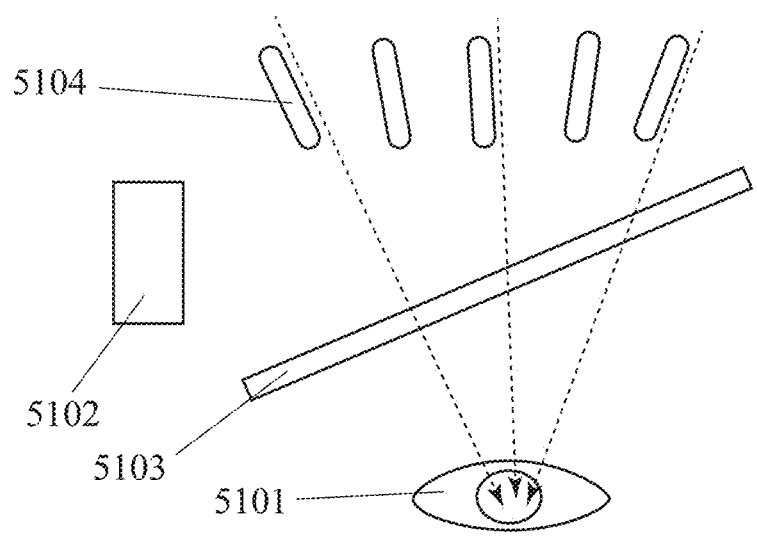
FIGS. 51 through 53 show an optical structure comprising a virtual-object display, a beam splitter, and a distal array of movable reflective elements.
Figure 52:
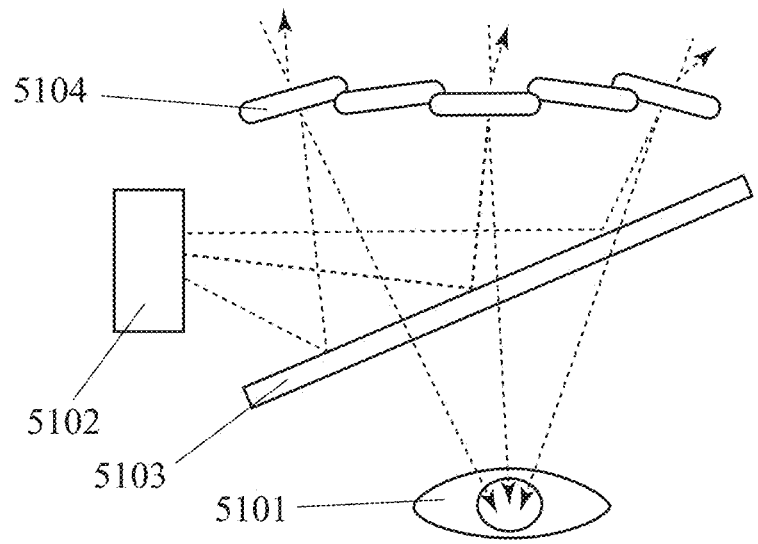
Figure 53:
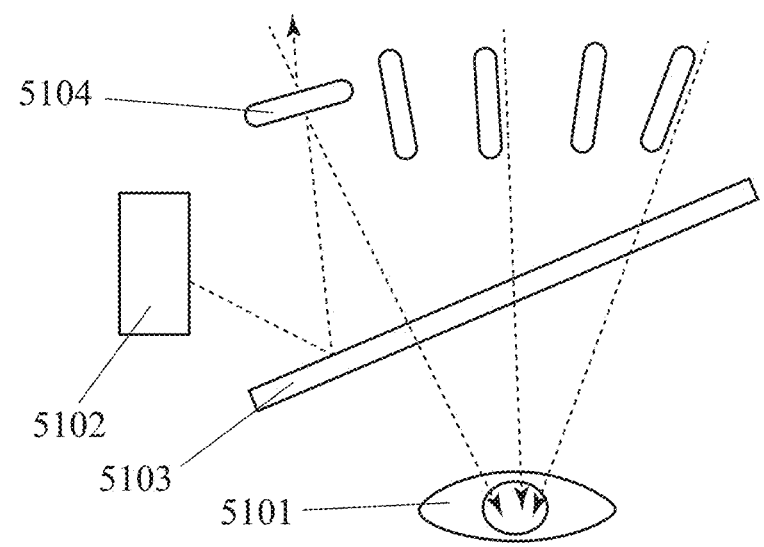

FIGS. 51 through 53 show three (top-down, cross-sectional) views, at three different times, of an optical structure for use in augmented reality (and/or mixed reality) eyewear comprising: a virtual-object display 5102; a beam splitter (e.g. transflective mirror) 5103; and an array of movable reflective elements (e.g. micromirrors) 5104, wherein reflective elements in the array each have a first configuration in which they allow transmission of environment light to a person's eye 5101, wherein reflective elements in the array each have a second configuration in which they block (or reduce) transmission of environment light to the person's eye, wherein light from the virtual-object display is reflected by the beam splitter (or transflective mirror) in a distal direction toward the array of rotatable reflective elements, wherein reflective elements in the array in their second configurations reflect the light in a proximal direction through the beam splitter (or transflective mirror) to the person's eye, wherein a selected subset of reflective elements in a selected area of the person's field of view are changed (e.g. rotated or pivoted) from their first configurations to their second configurations in order to display a virtual object in that area of the person's field of view.

FIG. 51 shows this optical structure at a first time, when all of the reflective elements (e.g. micromirrors) are in their first configurations and allow the most environmental light to pass through to the person's eye. FIG. 52 shows this optical structure at a second time, when all of the reflective elements (e.g. micromirrors) are in their second configurations and block (or reduce) environmental light from passing through to the person's eye. In their second configurations, reflective elements also reflect light from the virtual-object display in a proximal direction to the person's eye. FIG. 53 shows this optical structure at a third time, when a selected subset of the reflective elements (e.g. micromirrors) are in their second configurations (blocking environmental light and reflecting light from the virtual-object display to display a virtual object in a selected area of the person's field of view) and the rest of the reflective elements are in their first configurations (providing the person with relatively-clear view of their environment in other areas of their field of view).

In an example, an array of movable reflective elements (e.g. micromirrors) can be distal relative to a beam splitter (e.g. transflective mirror). In an example, a virtual-object display can be distal relative to a beam splitter (e.g. transflective mirror). In an example, an array of movable reflective elements can be arcuate. In an example, an array of movable reflective elements can have a concave shape which opens in a proximal direction. In an example, an array of movable reflective elements can have a shape which is a portion of a sphere. In an example, an array of movable reflective elements can have a conic-section shape. In an example, an array of movable reflective elements can have a parabolic shape. In an example, an array of movable reflective elements can have a Fresnel lens shape.

In an example, reflective elements (e.g. micromirrors) can be individually and independently changed (e.g. rotated and/or pivoted) from first configurations to second configurations, or vice versa. In an example, a selected subset of these reflective elements can be changed (e.g. rotated and/or pivoted) from first configurations to second configurations, while the rest of the reflective elements remain in their first configurations.

In an example, a selected subset of reflective elements (e.g. micromirrors) can collectively align with the location and shape of a virtual object displayed in a person's field of view. In an example, the combined location and perimeter of a selected subset of reflective elements can align with the location and perimeter of a virtual object which is displayed in a person's field of view. In an example, different subsets of reflective elements can be moved (e.g. rotated or pivoted) to their second configurations corresponding to the display of virtual objects in different areas of a person's field of view. In an example, subsets of reflective elements with different locations and perimeter shapes can be selected to match virtual objects with different locations and perimeter shapes.

In an example, a subset of individual reflective elements (e.g. micromirrors) can be selected and moved (e.g. rotated or pivoted) to display relatively-opaque virtual objects in a person's field of view by reflecting light rays from a virtual-object display to the person's eye and to selectively block (or reduce) environmental light rays from reaching the person's eye in the area where the virtual object is displayed. In an example, environmental light can be reflected away from a person's eye by the distal side of a reflective element when that element is in its second configuration.

In an example, a reflective element can be rotated or pivoted by an acute angle between its first configuration and its second configuration. In an example, a reflective element can pivot around an axle or joints. In an example, a reflective element can be responsive to an electromagnetic field, wherein it rotates and/or pivots when exposed to the creation (or modification) of an electromagnetic field. In an example, the angles by which reflective elements are rotated or pivoted from their first configurations to their second configurations can vary with increased distance from a virtual-object display. In an example, the angles by which reflective elements are rotated or pivoted from their first configurations to their second configurations can decrease with increased distance from a virtual-object display. In an example, an optical structure can further comprise an array of joints around which individual reflective elements (e.g. micromirrors) rotate and/or pivot.

In an example, both sides of a reflective element can reflect light. In an example, a reflective element can be transflective. In an example, a reflective element in its first configuration allows light from the environment to pass through a selected area and the reflective element in its second configuration blocks (or reduces) light transmission of light from the environment through this selected area. In an example, this area can be the space through which a reflective element passes as it rotates and/or pivots between its first and second configurations.

In an example, individual reflective elements can have flat reflective sides. In an example, one side of a reflective element can be more reflective than the other side. In an example, a proximal side of a reflective element can be more reflective than a distal side of the reflective element. In an example, individual reflective elements can have curved reflective sides. In an example, a reflective element can be magnetic. In an example, individual reflective elements can align with the application of an electromagnetic field.

In an example, individual reflective elements which are closer to the center of an optical structure can be closer together than elements which are farther from this center. In an example, reflective elements (e.g. micromirrors) can overlap each other in their second configurations. In an example, reflective elements can be rotated around their centroids. In an example, a reflective element can be magnetic, wherein it rotates or pivots to become aligned with an electromagnetic field which is created by transmission of electrical energy through proximal and/or distal electroconductive components. In an example, the angles by which reflective elements are rotated from their first configurations to their second configurations can be a quadratic function of their distance from a virtual-object display.

In an example, individual reflective elements which are closer to the center of an optical structure can be smaller than elements which are farther from this center. In an example, individual reflective elements which are farther from the center of an optical structure can be farther apart than elements which are closer to this center. In an example, a selected subset of reflective elements can be changed from their first configurations to their second configurations in order to block the transmission of environmental light through a selected area of an optical structure which they collectively span.

In an example, a selected subset of reflective elements can be changed from their first configurations to their second configurations, thereby blocking the transmission of environmental light through an area of an optical structure which they collectively span, wherein the location and perimeter of this area corresponds to the location and perimeter of a virtual object which is displayed in a person's field of view. In an example, individual reflective elements which are father from the center of an optical structure can be larger than elements which are closer to this center. In an example, (the perimeter of) an optical structure can have a conic section shape.

In an example, a reflective element can reflect a portion (e.g. one or more pixels) of a virtual object from the virtual-object display to the person's eye when the element is in its second configuration. In an example, reflective elements can be suspended in a fluid (e.g. liquid). In an example, (the perimeter of) an optical structure can have an arcuate shape. In an example, reflective elements can be rotated around their central axes. In an example, (the perimeter of) an optical structure can have a shape which is a section of a sphere or ellipsoid.

In an example, a reflective element in its first configuration allows a first amount of light from the environment to pass through a selected area of the array and the reflective element in its second configuration allows a second amount of light from the environment to pass through the selected area of the array, wherein the second amount is less than the first amount. In an example, a reflective element in its first configuration allows a first amount of light from the environment to pass through a selected area of the array and the reflective element in its second configuration allows a second amount of light from the environment to pass through the selected area of the array, wherein the second amount is less than half of the first amount.

In an example, a reflective element can be pivoted around one end of its longitudinal axis. In an example, a reflective element in its first configuration allows a first amount of light from the environment to pass through a selected area of the array and the reflective element in its second configuration allows a second amount of light from the environment to pass through the selected area of the array, wherein the second amount is less than 75% of the first amount.

In an example, a longitudinal axis of a reflective element (e.g. micromirror) in its first configuration can be substantially-parallel to a radial vector which extends out from a person's eye (e.g. from the center of the eye pupil). In an example, a reflective element can be a one-way mirror. In an example, a subset of individual reflective elements (e.g. micromirrors) can be selectively rotated (e.g. rotated or pivoted) between first and second configurations. In an example, an optical structure can further comprise an array of axles around which individual reflective elements (e.g. micromirrors) rotate. In an example, these axles can be vertical. In an example, these axles can be horizontal. In an example, some of these axles can be vertical and some of these axles can be horizontal.

In an example, reflective elements in their second configurations can collectively form a portion of a Fresnel reflector. In an example, a first vector extends from (the center of) a reflective element to (the center of) a person's eye and a second vector extends from (the center of) the reflective element to (the center of) a virtual-object display, wherein a longitudinal axis of the reflective element (in its second configuration) is substantially-orthogonal to a third vector which is (midway) between the first and second vectors. In an example, a selected subset of individual reflective elements (e.g. micromirrors) can be selectively rotated (e.g. rotated or pivoted) from their first configurations to their second configurations.

In an example, a first vector extends from (the center of) a reflective element to (the center of) a person's eye and a second vector extends from (the center of) the reflective element to (the center of) a virtual-object display, wherein a longitudinal axis of the reflective element (in its second configuration) can be substantially-orthogonal to a third vector which bisects the angle between the first and second vectors. In an example, a selected subset of individual reflective elements (e.g. micromirrors) can be selectively rotated (e.g. rotated or pivoted) from their first configurations to their second configurations, wherein in their second configurations the selected subset of reflective elements can have a combined perimeter which overlaps the perimeter of a displayed virtual object. In an example, reflective elements can rotate and/or pivot around axles.

In an example, the angles by which reflective elements are rotated from their first configurations to their second configurations can be a linear function of their distances from a virtual-object display. In an example, a reflective element can be a partial mirror. In an example, a reflective element in its first configuration allows a first amount of light from the environment to pass through a selected area of the array and the reflective element in its second configuration allows a second amount of light from the environment to pass through the selected area of the array, wherein the second amount is less than 25% of the first amount.

In an example, individual reflective elements in an optical structure can be evenly-distributed (e.g. equidistant) across the array. In an example, the angles by which reflective elements are rotated from their first configurations to their second configurations can increase with increased distance from a virtual-object display. In an example, a first vector extends from (the longitudinal center of) a reflective element to (the center of) a person's eye and a second vector extends from (the longitudinal center of) the reflective element to (the center of) a virtual-object display, wherein a longitudinal axis of the reflective element (in its second configuration) can be substantially-orthogonal to a third vector which is (midway) between the first and second vectors.

In an example, a selected subset of individual reflective elements (e.g. micromirrors) can be rotated (e.g. rotated or pivoted) from their first configurations to their second configurations, wherein in their second configurations the selected subset of reflective elements have a collective perimeter which matches the perimeter of a displayed virtual object. In an example, individual reflective elements in an optical structure can all be the same size. In an example, the angles by which reflective elements are rotated from their first configurations to their second configurations can be a function of their distances from a virtual-object display.

In an example, a virtual-object display can comprise an array, grid, mesh, or matrix of light emitters. In an example, a virtual-object display can comprise an array of Light Emitting Diodes (LEDs). In an example, a virtual-object display can comprise an array of micro Light Emitting Diodes (uLEDs). In an example, a virtual-object display can comprise an array of Organic Light Emitting Diodes (OLEDs). In an example, a virtual-object display can comprise an array of laser diodes. In an example one or more light emitters in a virtual-object display can be selected from the group consisting of: Light Emitting Diode (LED); Laser Diode; Liquid Crystal Virtual-object display (LCD); Liquid-Crystal-On-Silicon (LCoS) virtual-object display; Micro Light-Emitting Diode (Micro-LED); Organic Light-Emitting Diode (OLED); and Vertical Cavity Surface Emitting Laser (VCSEL).

In an example, a virtual-object display be selected from the group consisting of: active-matrix organic light-emitting diode array, projector, or display; collimated light projector or display; digital micro-mirror array, projector, or display; diode laser array, projector, or display; ferroelectric liquid crystal on silicon array, projector, or display; holographic projector or display. In an example, a display can be selected from the group consisting of: light emitting diode array, projector, or display; liquid crystal display array, projector, or display; liquid crystal on silicon array, projector, or display; low-power (e.g. nano-watt) laser projector or display; and display and/or microprojector. In an example, a display can comprise a scanning laser.

In an example, a virtual-object display can be located on a right or left sidepiece ("temple") of an eyewear frame. In an example, a virtual-object display can be located along the inside (body-facing) surface of a sidepiece ("temple") of an eyewear frame. In an example, a virtual-object display can be located on a portion of a front piece of an eyewear frame on the perimeter of a lens. In an example, a virtual object virtual-object display can be located on the portion of a front piece of an eyewear frame which is to the right or left of an eye.

This optical structure can be part of an overall near-eye wearable device (e.g. eyewear and/or eyeglasses) or system. In an example, there can be symmetric (right and left) versions of this optical structure which are positioned in front of a person's (right and left) eyes. In an example, this optical structure can be part of an overall near-eye wearable device (e.g. eyewear and/or eyeglasses) or multi-device system.

In an example, this device or system can further comprise one or more components selected from the group consisting of: (wireless) data receiver; (wireless) data transmitter; acoustic speaker; beam splitter; camera; concave lens; convex lens; curved mirror; data processor; EEG sensor; electrical actuator; electrochromic layer; eyewear (e.g. eyeglasses) front piece; eyewear (e.g. eyeglasses) sidepieces (e.g. temples); in-coupler; infrared light detector; infrared light emitter; laser scanner; lens; liquid crystal diode; liquid lens; microlens array; microphone; motion sensor; out-coupler; planoconcave lens; power source (e.g. battery); prism; remote data processor; smart ring; smart watch; cell phone; spectroscopic sensor; spherical lens; touch screen; lens with adjustable focal length; vibrating element; and waveguide. Example variations discussed elsewhere in this disclosure or in priority-linked disclosures can also be applied to this example where relevant.

I claim:

1. An optical structure for use in augmented reality eyewear comprising:
   an electroconductive component which further comprises a plurality of transparent or translucent electroconductive pathways;
   a selectively-reflective component which further comprises a plurality of movable reflective elements, wherein a selected subset of reflective elements can be moved from a first configuration to a second configuration, wherein the first configuration allows a first amount of light from the environment to pass through a selected area of the selectively-reflective component, wherein the second configuration allows a second amount of light from the environment to pass through the selected area of the selectively-reflective component, wherein the second amount is less than the first amount, and wherein the selected subset of individual reflective elements is moved from the first configuration to the second configuration by transmission of electrical energy through the electroconductive component; and
   a virtual-object display, wherein reflective elements in the first configuration reflect from the selected area a first amount of light from the virtual-object display toward the person's eye, wherein reflective elements in the second configuration reflect from the selected area a second amount of light from the virtual-object display toward the person's eye, wherein the second amount is greater than the first amount, and wherein reflection of light from the virtual-object display causes a virtual object to be displayed in the person's field of view.

2. The optical structure in claim 1 wherein the transparent or translucent electroconductive pathways are wires.

3. The optical structure in claim 1 wherein the plurality of transparent or translucent electroconductive pathways is an orthogonal grid, mesh, or array of electroconductive pathways.

4. The optical structure in claim 1 wherein the plurality of transparent or translucent electroconductive pathways is a polar, hub-and-spoke, and/or radial grid, mesh, or array of electroconductive pathways.

5. The optical structure in claim 1 wherein the electroconductive component is distal to the selectively-reflective component.

6. The optical structure in claim 1 wherein transmission of electrical energy through the electroconductive component creates or modifies an electromagnetic field which moves one or more reflective elements from first configurations to second configurations.

7. The optical structure in claim 1 wherein the reflective elements are mirrors.

8. The optical structure in claim 1 wherein the reflective elements are rotated and/or pivoted from first configurations to second configurations.

9. The optical structure in claim 1 wherein a longitudinal axis of a reflective element in the first configuration is parallel to a vector spanning from the reflective element to the person's eye.

10. The optical structure in claim 1 wherein a longitudinal axis of a reflective element in the second configuration is orthogonal to a third vector which bisects an angle between a first vector spanning from the reflective element to the person's eye and a second vector spanning from the reflective element to the virtual-object display.

11. The optical structure in claim 1 wherein reflective elements in the second configurations collectively comprise a portion of a Fresnel reflector.

12. The optical structure in claim 1 wherein reflective elements in front of a person's right eye collectively comprise a portion of the left side of a Fresnel reflector and reflective elements in front of a person's left eye collectively comprise a portion of the right side of a Fresnel reflector.

13. An optical structure for use in augmented reality comprising:
   a virtual-object display;
   a beam splitter; and
   an array of movable reflective elements, wherein reflective elements in the array each have a first configuration in which they allow transmission of environment light to a person's eye, wherein reflective elements in the array each have a second configuration in which they block or reduce transmission of environment light to the person's eye, wherein light from the virtual-object display is reflected by the beam splitter in a distal direction toward the array of rotatable reflective elements, wherein reflective elements in the array in their second configurations reflect the light in a proximal direction to the person's eye, and wherein a selected subset of reflective elements in a selected area of the person's field of view are moved from first configurations to second configurations in order to display a virtual object in that area of the person's field of view.

14. The optical structure in claim 13 wherein the reflective elements are mirrors.

15. The optical structure in claim 13 wherein the reflective elements are rotated and/or pivoted from first configurations to second configurations.

16. An optical structure for use in augmented reality eyewear comprising:
   an electroconductive component which further comprises a plurality of transparent or translucent electroconductive pathways;
   a selectively-reflective component which further comprises a plurality of reflective elements, wherein a selected subset of reflective elements can be moved from a first configuration to a second configuration, wherein the first configuration allows a first amount of light from the environment to pass through a selected area of the selectively-reflective component, wherein the second configuration allows a second amount of light from the environment to pass through the selected area of the selectively-reflective component, wherein the second amount is less than the first amount, and wherein the selected subset of individual reflective elements is moved from the first configuration to the second configuration by transmission of electrical energy through the electroconductive component;
   a virtual-object display;
   a waveguide; and
   an optical coupler which directs light from the virtual-object display into the waveguide.

17. The optical structure in claim 16 wherein the transparent or translucent electroconductive pathways are wires.

18. The optical structure in claim 16 wherein transmission of electrical energy through the electroconductive component creates or modifies an electromagnetic field which moves one or more reflective elements from first configurations to second configurations.

19. The optical structure in claim 16 wherein the reflective elements are mirrors.

20. The optical structure in claim 16 wherein the reflective elements are rotated and/or pivoted from first configurations to second configurations.

* * * * *